(12) United States Patent
Kaehler

(10) Patent No.: US 12,192,437 B2
(45) Date of Patent: *Jan. 7, 2025

(54) DISPLAY FOR THREE-DIMENSIONAL IMAGE

(71) Applicant: Magic Leap, Inc., Plantation, FL (US)

(72) Inventor: Adrian Kaehler, Los Angeles, CA (US)

(73) Assignee: Magic Leap, Inc., Plantation, FL (US)

(*) Notice: Subject to any disclaimer, the term of this patent is extended or adjusted under 35 U.S.C. 154(b) by 91 days.

This patent is subject to a terminal disclaimer.

(21) Appl. No.: 17/508,798

(22) Filed: Oct. 22, 2021

(65) Prior Publication Data

US 2022/0046227 A1 Feb. 10, 2022

Related U.S. Application Data

(60) Continuation of application No. 16/694,606, filed on Nov. 25, 2019, now Pat. No. 11,159,783, which is a
(Continued)

(51) Int. Cl.
*H04N 13/393* (2018.01)
*G02B 30/27* (2020.01)
(Continued)

(52) U.S. Cl.
CPC ........... *H04N 13/393* (2018.05); *G02B 30/27* (2020.01); *G02B 30/54* (2020.01); *G02B 30/56* (2020.01);
(Continued)

(58) Field of Classification Search
CPC ........ G02B 30/27; G02B 30/54; G02B 30/56; G09G 3/005; H04N 13/302; H04N 13/307;
(Continued)

(56) References Cited

U.S. PATENT DOCUMENTS 5,082,422 A 1/1992 Wang
5,291,560 A 3/1994 Daugman
(Continued)

FOREIGN PATENT DOCUMENTS

CN 103336532 A 10/2013
CN 203806889 U 9/2014
(Continued)

OTHER PUBLICATIONS

3D Hologram No Glass No Cd case—YouTube, accessed Jul. 18, 2017, in 3 pages URL: https://www.youtube.com/watch?v=dwfYIRA8h-4.
(Continued)

*Primary Examiner* — Dakshesh D Parikh
(74) *Attorney, Agent, or Firm* — Zi Wong; Via LLP

(57) ABSTRACT

Apparatuses and methods for displaying a 3-D representation of an object are described. Apparatuses can include a rotatable structure, motor, and multiple light field sub-displays disposed on the rotatable structure. The apparatuses can store a light field image to be displayed, the light field image providing multiple different views of the object at different viewing directions. A processor can drive the motor to rotate the rotatable structure and map the light field image to each of the light field sub-displays based in part on the rotation angle, and illuminate the light field sub-displays based in part on the mapped light field image. The apparatuses can include a display panel configured to be viewed from a fiducial viewing direction, where the display panel is curved out of a plane that is perpendicular to the fiducial viewing direction, and a plurality of light field sub-displays disposed on the display panel.

12 Claims, 32 Drawing Sheets

Related U.S. Application Data division of application No. 15/410,455, filed on Jan. 19, 2017, now Pat. No. 10,536,690.

(60) Provisional application No. 62/343,767, filed on May 31, 2016, provisional application No. 62/343,722, filed on May 31, 2016, provisional application No. 62/288,680, filed on Jan. 29, 2016.

(51) Int. Cl.

| | |
|---|---|
| *G02B 30/54* | (2020.01) |
| *G02B 30/56* | (2020.01) |
| *G09G 3/00* | (2006.01) |
| *H04N 13/307* | (2018.01) |
| *H04N 13/32* | (2018.01) |
| *H04N 13/324* | (2018.01) |
| *H04N 13/398* | (2018.01) |

(52) U.S. Cl.
CPC ........... *G09G 3/005* (2013.01); *H04N 13/307* (2018.05); *H04N 13/32* (2018.05); *H04N 13/324* (2018.05); *H04N 13/398* (2018.05); *H04N 2213/001* (2013.01)

(58) Field of Classification Search
CPC .... H04N 13/32; H04N 13/324; H04N 13/393; H04N 13/398; H04N 2213/001
See application file for complete search history.

(56) References Cited

U.S. PATENT DOCUMENTS

| | | | |
|---|---|---|---|
| 5,825,443 A | 10/1998 | Kawasaki et al. | |
| 6,037,876 A | 3/2000 | Crouch | |
| 6,594,630 B1 | 7/2003 | Zlokarnik et al. | |
| 6,850,221 B1 | 2/2005 | Tickle | |
| D514,570 S | 2/2006 | Ohta | |
| 8,950,867 B2 | 2/2015 | Macnamara | |
| 9,081,426 B2 | 7/2015 | Armstrong | |
| 9,215,293 B2 | 12/2015 | Miller | |
| 9,224,366 B1* | 12/2015 | Park | H04N 13/398 |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 6/2016 | Kujawski et al. | |
| 9,383,587 B2 | 7/2016 | Balogh | |
| 9,398,357 B2 | 7/2016 | Berkman et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao et al. | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 9,874,749 B2 | 1/2018 | Bradski et al. | |
| 10,283,093 B2 | 5/2019 | Zhou et al. | |
| 10,536,690 B2 | 1/2020 | Kaehler et al. | |
| 2004/0192430 A1 | 9/2004 | Burak et al. | |
| 2005/0117294 A1 | 6/2005 | Hsieh | |
| 2005/0230641 A1 | 10/2005 | Chun et al. | |
| 2006/0028436 A1 | 2/2006 | Armstrong | |
| 2006/0109200 A1 | 5/2006 | Alden | |
| 2006/0132497 A1 | 6/2006 | Biegelsen | |
| 2006/0170644 A1* | 8/2006 | Ioki | H04N 13/366 345/102 |
| 2007/0009222 A1* | 1/2007 | Koo | H04N 13/395 348/E13.057 |
| 2007/0081123 A1 | 4/2007 | Lewis | |
| 2007/0109787 A1 | 5/2007 | Wu | |
| 2007/0247832 A1 | 10/2007 | Barker | |
| 2010/0097448 A1 | 4/2010 | Gilbert et al. | |
| 2011/0157168 A1* | 6/2011 | Bennett | H04N 21/235 345/419 |
| 2012/0127062 A1 | 5/2012 | Bar-Zeev et al. | |
| 2012/0162549 A1 | 6/2012 | Gao et al. | |
| 2013/0082922 A1 | 4/2013 | Miller et al. | |
| 2013/0117377 A1 | 5/2013 | Miller | |
| 2013/0125027 A1 | 5/2013 | Abovitz et al. | |
| 2013/0155052 A1* | 6/2013 | Ko | H04N 13/122 345/419 |
| 2013/0208234 A1 | 8/2013 | Lewis | |
| 2013/0242262 A1 | 9/2013 | Lewis et al. | |
| 2013/0321394 A1 | 12/2013 | Fisher et al. | |
| 2014/0071539 A1 | 3/2014 | Gao et al. | |
| 2014/0152672 A1 | 6/2014 | Seder et al. | |
| 2014/0168783 A1 | 6/2014 | Luebke et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2014/0306866 A1 | 10/2014 | Miller et al. | |
| 2015/0016777 A1 | 1/2015 | Abovitz et al. | |
| 2015/0049390 A1 | 2/2015 | Lanman et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt et al. | |
| 2015/0222883 A1 | 8/2015 | Welch et al. | |
| 2015/0222884 A1 | 8/2015 | Cheng et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | Tekolste et al. | |
| 2015/0346495 A1 | 12/2015 | Welch et al. | |
| 2015/0379770 A1 | 12/2015 | Haley, Jr. et al. | |
| 2016/0011419 A1 | 1/2016 | Gao et al. | |
| 2016/0026253 A1 | 1/2016 | Bradski et al. | |
| 2016/0270656 A1 | 9/2016 | Samec et al. | |
| 2017/0134721 A1* | 5/2017 | Byrne | H04N 13/393 |
| 2017/0140571 A1* | 5/2017 | Peterson | H04N 13/373 |
| 2017/0184863 A1 | 6/2017 | Balachandreswaran et al. | |
| 2017/0223344 A1 | 8/2017 | Kaehler et al. | |
| 2017/0235134 A1 | 8/2017 | Border et al. | |
| 2017/0266676 A1 | 9/2017 | Fateh | |
| 2017/0310956 A1* | 10/2017 | Perdices-Gonzalez | G09G 3/2092 |
| 2018/0036703 A1 | 2/2018 | Mercer et al. | |
| 2018/0136703 A1 | 5/2018 | Woods et al. | |
| 2018/0348534 A1* | 12/2018 | Chen | G02B 27/1086 |
| 2019/0035317 A1 | 1/2019 | Rohena et al. | |
| 2020/0033921 A1 | 1/2020 | Rohena et al. | |
| 2020/0092538 A1 | 3/2020 | Kaehler | |
| 2020/0383240 A1 | 12/2020 | Rohena et al. | |
| 2022/0046227 A1 | 2/2022 | Kaehler | |

FOREIGN PATENT DOCUMENTS

| | | |
|---|---|---|
| CN | 104469344 A | 3/2015 |
| CN | 204945946 U | 1/2016 |
| CN | 207609586 U | 7/2018 |
| CN | 108885352 A | 11/2018 |
| JP | 09-230321 A | 9/1997 |
| JP | 2003216071 A | 7/2003 |
| JP | 2004177709 A | 6/2004 |
| JP | 2005308980 A | 11/2005 |
| JP | 2007071922 A | 3/2007 |
| JP | 2007226013 A | 9/2007 |
| JP | 2013064996 A | 4/2013 |
| JP | 2013161035 A | 8/2013 |
| JP | 2015-501951 A | 1/2015 |
| JP | 6289320 B2 | 3/2018 |
| WO | 2011012913 A1 | 2/2011 |
| WO | 2013086046 A1 | 6/2013 |
| WO | 2015140578 A1 | 9/2015 |

(56) References Cited

FOREIGN PATENT DOCUMENTS

| WO | 2017132050 A1 | 8/2017 |
| WO | 2019023489 A1 | 1/2019 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu f azuma/ARpresence.pdf.

Azuma, "Predictive Tracking for Augmented Realty," TR95-007, Department of Computer Science, UNC—Chapel Hill, NC, Feb. 1995.

Bimber, et al., "Spatial Augmented Reality—Merging Real and Virtual Worlds," 2005 https://web.media.mit.edu f raskar/book/BimberRaskarAugmentedRealityBook.pdf.

European Extended Search Report, re EP Application No. 17744712.5, dated Aug. 19, 2019.

European Extended Search Report, re EP Application No. 21205442.3, dated Feb. 21, 2022.

International Preliminary Report on Patentability for PCT Application No. PCT/US2017/014166, dated Jul. 31, 2018.

International Search Report and Written Opinion for PCT Application No. PCT/US17/14166, dated Apr. 4, 2017.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Kinomo: "Kino-mo Holo Displays—the new holograms", Kino-mo, printed Jan. 27, 2016, in 4 pages. URL: http://kinomo.com/displays.

Lanman, D. et al., "Near-Eye Light Field Displays", Nvidia Research, Jul. 2013, in 10 pages.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

EP21205442.3 Examination Report dated Aug. 31, 2023.

KR2018-7024797 Office Action dated Sep. 7, 2023.

Office Action received for Chinese Patent Application No. 202111360771.8, mailed on Mar. 27, 2024, 17 pages (7 pages of English Translation and 10 pages of Original Document).

\* cited by examiner

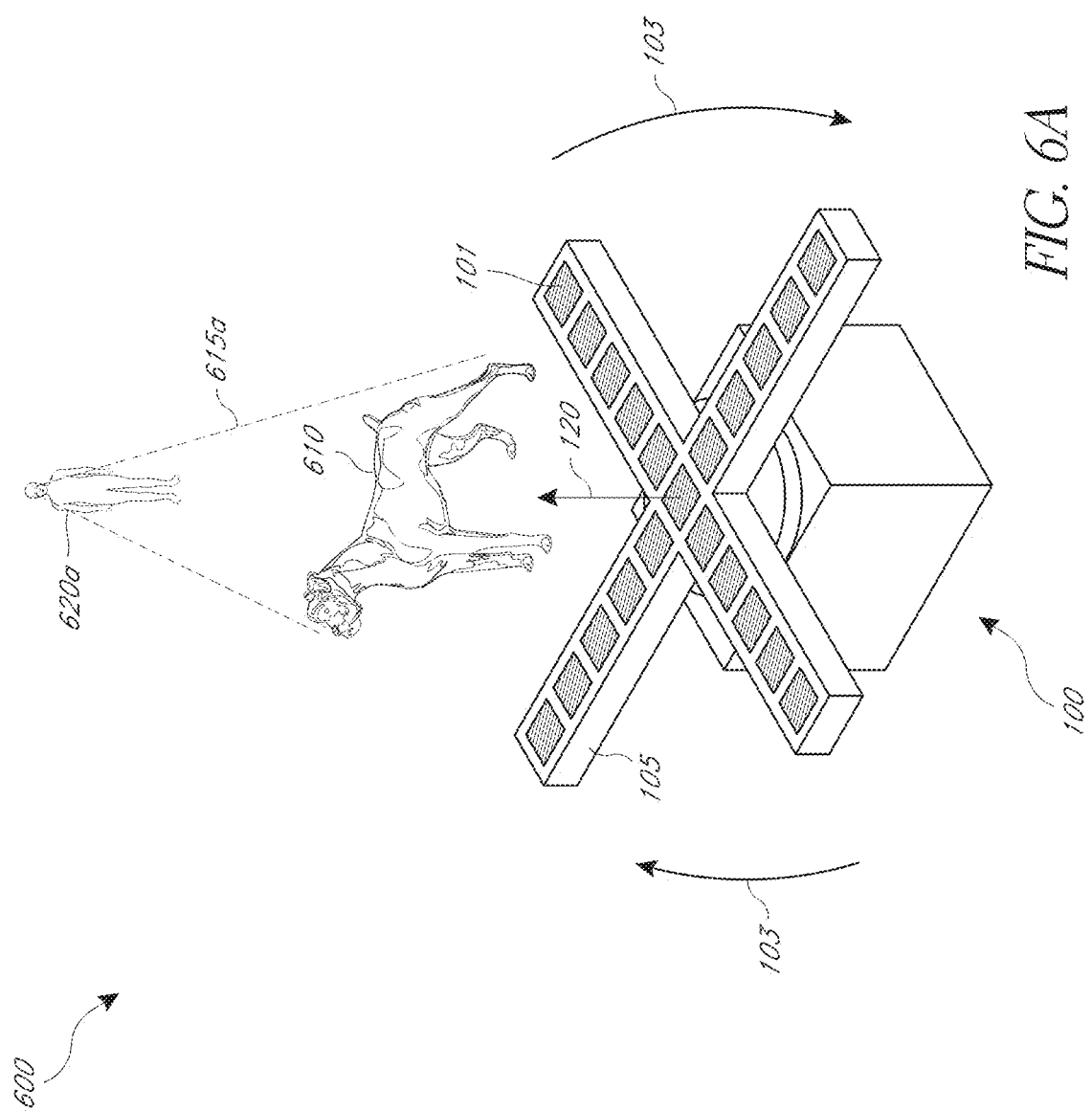

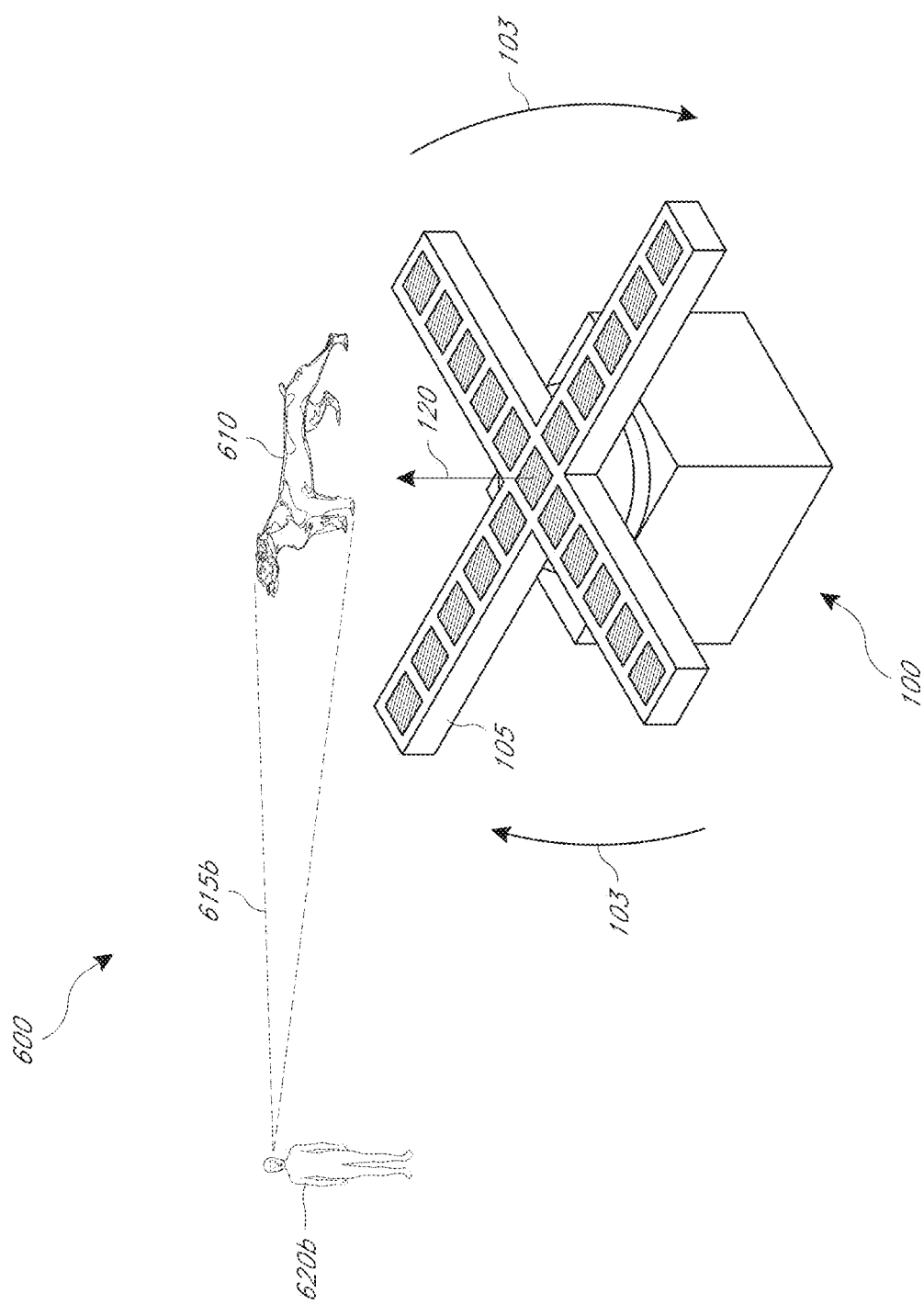

DISPLAY FOR THREE-DIMENSIONAL IMAGE

CROSS-REFERENCE TO RELATED APPLICATIONS

This application is a continuation of U.S. patent application Ser. No. 16/694,606 filed Nov. 25, 2019, entitled "DISPLAY FOR THREE-DIMENSIONAL IMAGE," which is a division of U.S. patent application Ser. No. 15/410,455 filed Jan. 19, 2017, entitled "DISPLAY FOR THREE-DIMENSIONAL IMAGE," which claims the benefit of priority under 35 U.S.C. § 119(e) to U.S. Provisional Patent Application No. 62/288,680 filed Jan. 29, 2016, entitled "HOLOGRAPHIC PROPELLER," U.S. Provisional Patent Application No. 62/343,722 filed May 31, 2016, entitled "DISPLAY FOR THREE-DIMENSIONAL IMAGE," and U.S. Provisional Patent Application No. 62/343,767 filed May 31, 2016, entitled "CURVED DISPLAY FOR THREE-DIMENSIONAL IMAGE." The disclosures of all of these prior applications are considered part of, and are hereby incorporated by reference herein in their entireties.

FIELD

The present disclosure relates to apparatus and methods for displaying a three-dimensional representation of an object and more particularly to displaying a light field of an object to portray a three-dimensional representation of said object.

BACKGROUND

Light from natural objects, when it encounters the human eye, has a particular content in terms of rays of light, with magnitude and direction, at each point in space. This structure is known as a light field. Conventional two-dimensional (2-D) displays (paintings, photographs, computer monitors, televisions, etc.) emit light isotropically (e.g., light is uniformly emitted from the display). As a result, these 2-D displays may only approximate the light field of the objects they represent.

SUMMARY

Accordingly, it is desirable to build displays that reproduce, or attempt to reproduce, the exact or approximate light field that would be created by a natural object. Such displays create a more compelling image that appears to be three-dimensional (3-D) and may be capable of being mistaken for a natural object. These feats are unachievable by traditional 2-D displays.

In some embodiments, display apparatuses and methods for displaying a 3-D representation of an object are disclosed. In one implementation, the display apparatus may include a rotatable structure; a motor configured to rotate the rotatable structure; multiple light field sub-displays disposed on the rotatable structure; a non-transitory memory configured to store a light field image to be displayed by the display apparatus, the light field image providing different views of the object at different viewing directions; and a processor operably coupled to the non-transitory memory, the motor, and the light field sub-displays. The processor may be programed with executable instructions to drive the motor to rotate the rotatable structure about a rotation axis, the rotatable structure positioned at a rotation angle as a function of time; access the light field image; map the light field image to each of the light field sub-displays based at least in part on the rotation angle; and illuminate the plurality of light field sub-displays based at least in part on the mapped light field image.

In some embodiments, display apparatuses and methods for displaying a 3-D representation of an object are disclosed. The method may include driving a motor to rotate a rotatable structure that includes multiple light field sub-displays about a rotation axis, the rotatable structure positioned at a rotation angle as a function of time. The method may also include accessing a light field image to be displayed by the display apparatus, the light field image providing different views of the object at different viewing directions; mapping the light field image to each of light field sub-displays based at least in part on the rotation angle; and illuminating the light field sub-displays based at least in part on the mapped light field image.

In some embodiments, display apparatuses and methods for displaying a 3-D representation of an object are disclosed. In one implementation, the display apparatus may include a light field sub-display configured to be rotated, the light field sub-display having multiple displaying positions; a non-transitory memory configured to store a light field image to be displayed by the display apparatus, the light field image providing different views of the object at different viewing directions; and a processor operably coupled to the non-transitory memory and the light field sub-display. The processor may be programmed with executable instructions to rotate the light field sub-display about a rotation axis, where the displaying positions are based on a rotation angle as a function of time; access the light field image; map the light field image to the displaying positions based at least in part on the rotation angle; and illuminate the light field sub-display based at least in part on the mapped light field image.

In some embodiments, display apparatuses and methods for displaying a 3-D representation of an object are disclosed. In one implementation, the display apparatus may include one or more light field sub-displays, each of the one or more light field sub-displays having multiple displaying positions, where the one or more light field sub-displays are configured to rotate about one or more rotation axes; a non-transitory memory configured to store a light field image to be displayed by the display apparatus, the light field image providing different views of the object at different viewing directions; and a processor operably coupled to the non-transitory memory and the one or more light field sub-displays. The processor may be programmed with executable instructions to drive a rotation of the one or more light field sub-displays about at least one of the rotation axes, where the displaying positions are based on a rotation angle as a function of time; and illuminate the one or more light field sub-displays based at least in part on the light field image and the displaying positions.

In some embodiments, display apparatuses and methods for displaying a 3-D representation of an object are disclosed. In one implementation, the display apparatus may include a display panel configured to be viewed from a fiducial viewing direction, where the display panel is curved out of a plane that is perpendicular to the fiducial viewing direction, and a plurality of light field sub-displays disposed on the display panel. The display apparatus may also include a non-transitory memory configured to store a light field image to be displayed by the display apparatus, the light field image providing multiple different views of the object at different observing directions, and a processor operably coupled to the non-transitory memory and the light field sub-displays. The processor may be programmed with executable instructions to access the light field image; map the light field image to each of the light field sub-displays based at least in part on the position of the light field sub-displays on the display pane; and illuminate the light field sub-displays based at least in part on the mapped light field image.

In some embodiments, display apparatuses and methods for displaying a 3-D representation of an object are disclosed. The method may include accessing a light field image to be displayed by the display apparatus, the light field image providing multiple different views of the object at different observing directions. The method may also include mapping the light field image to each of a plurality of light field sub-displays based at least in part on the position of the light field sub-displays on a display panel. The method may also include illuminating the plurality of light field sub-displays based at least in part on the mapped light field image.

In some embodiments, display apparatuses and methods for displaying a 3-D representation of an object are disclosed. In one implementation, the display apparatus may include a display panel configured to be viewed from a fiducial viewing direction, where the display panel is curved out of a plane that is perpendicular to the fiducial viewing direction. The display apparatus may also include one or more light field sub-displays, each of the one or more light field sub-displays having a position on the display panel. The display apparatus may also include a non-transitory memory configured to store a light field image to be displayed by the display apparatus, the light field image providing multiple different views of the object at different viewing directions, and a processor operably coupled to the non-transitory memory and the light field sub-displays. The processor may be programmed with executable instructions to access the light field image, and illuminate the one or more light field sub-displays based at least in part on the light field image and the positions of the one or more light field sub-displays on the display panel.

In some embodiments, display apparatuses and methods for displaying a 3-D representation of an object are disclosed. In one implementation, the display apparatus may include a curved panel comprising multiple light field sub-displays.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 6A and 6B are perspective views that schematically illustrate an example display apparatus that is displaying a 3-D representation of an image (a dog, in this example) viewed by multiple observers.

Figure 1:
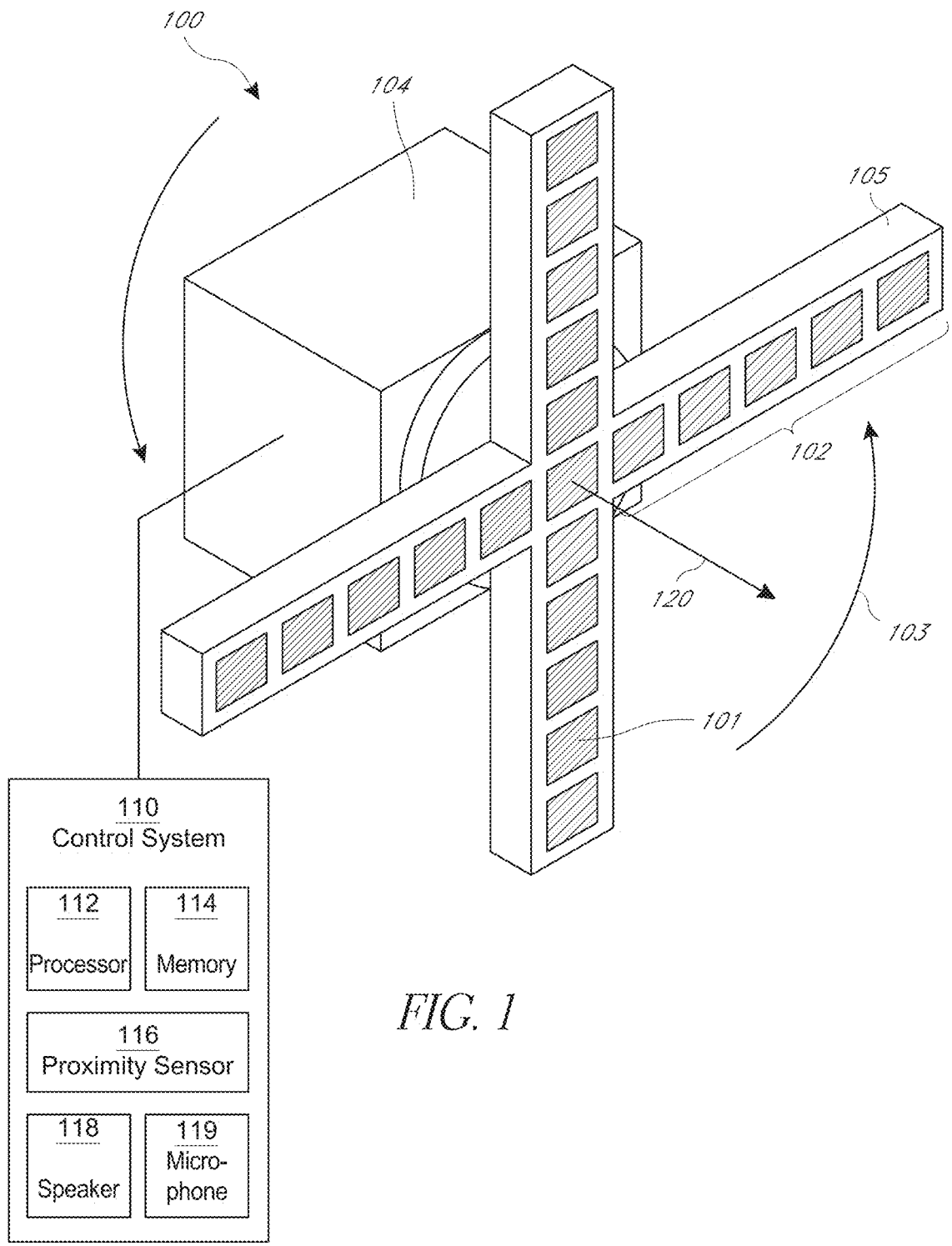
FIG. 1 schematically illustrates an example display apparatus.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Many types of light field displays at this time are costly and therefore not suitable for many applications (e.g. commercial advertising, viewing in a home, etc.). Current implementations of light field displays, for example a flat panel display, utilize numerous pixels and waveguides to mimic a 3-D representation of an object. At any single point in time, such representation requires several images to be displayed, each image rendering a different direction of viewing the object as well as varying focal depths such that the object appears to be three-dimensional. In some implementations, utilizing a flat display panel may provide an increasingly limited field of view of the 3-D representation for observers who are positioned at increasingly greater angles from normal to the flat display panel. The present disclosure describes examples of light field displays that are not prohibitively expensive, due to implementing light field sub-display technology capable of displaying multiple viewing angles or focal depths at any single instance and can be controlled to switch between multiple different views of the object being displayed in a three-dimensional representation. The present disclosure describes some examples that may be configured to provide greater fields of view of the object being displayed in a 3-D representation. Such displays may be used be used for indoor or outdoor display applications such as advertising, home viewing, interior or exterior decorating, the arts, and so forth. For example, a store front or other business may wish to attract customers by displaying objects in three-dimensions opposed to conventional two-dimensional displays. A three-dimensional representation may be more eye-catching to a passer-by or more likely to be noticed, opposed to a flat two-dimensional representation.

The present disclosure describes examples of a display apparatus comprising a rotatable structure (for example, a propeller) that combines a number of light field sub-displays, in which the individual light field sub-displays are strobed with different images depending on the current rotation state of the rotatable structure and the overall image to be projected by the display. The rate of strobing (e.g., switching the content displayed) may be at a frequency that is unperceivable to the eyes of a person viewing the object. The rotating motion of the rotatable structure causes the light field sub-displays to sweep out a particular area and, as a result, a lower cost implementation of a display providing a 3-D image to an observer is possible.

The present disclosure also describes examples of a display apparatus comprising a curved display panel that combines a number of light field sub-displays, in which the individual light field sub-displays are illuminated with different images representing different viewing direction depending on the position of the light field sub-display on the display panel and the overall image to be projected by the display apparatus. The curve of the display panel may cause the light field sub-displays to display a 3-D representation of an object that is easier to perceive by an observer at greater angles from normal to the display apparatus.

Example Display Apparatus

FIG. 1 illustrates an example of a display apparatus 100 configured to display an image observable as a 3-D representation of an object. The display apparatus 100 includes a rotatable structure 105, a motor 104, and a control system 110. The rotatable structure 105 may be coupled to the motor 104 that is configured to drive the rotatable structure 105 about a rotation axis 120 along a path 103 based on inputs from a local data processing module of the control system 110. The control system 110 may be operatively coupled to the display apparatus 100 which may be mounted in a variety of configurations, such as fixedly attached to the display apparatus 100 or located elsewhere in relation to the display apparatus 100 (e.g., in a separate part of a room or central control room). The rotatable structure 105 may include an array of light field sub-displays 101 disposed along one or more elongated elements 102. The light field sub-displays 101 may be controlled by the control system 110 to generate and display the 3-D representation of the object.

In some implementations, movement of the rotatable structure 105 causes the light field sub-displays 101 to move about path 103, which, when driven by the control system 110 to illuminate the light field sub-displays 101, displays an image that is observable by a bystander as a 3-D representation of the object to be displayed. For example, the display apparatus 100 may be placed in a store front or viewable area where a person, located at a viewable distance from the display apparatus 100, is able to view the image displayed by the display apparatus 100 by looking toward the rotatable structure 105. In some embodiments, an extended 3-D representation of the object is created as the light field sub-displays 101 are rotated about the path 103 due to rotational movement imparted onto the rotatable structure 105 by the motor 104. In some embodiments, the multiple light field sub-displays 101 may each comprise one or more pixels, as described below, which can be illuminated according to light field image data stored in the digital memory 112 (e.g., non-transitory data storage) to display a 3-D representation of the object. In some embodiments, a speaker 118 may be coupled to the display apparatus 100 for providing audio output.

Figure 5A:
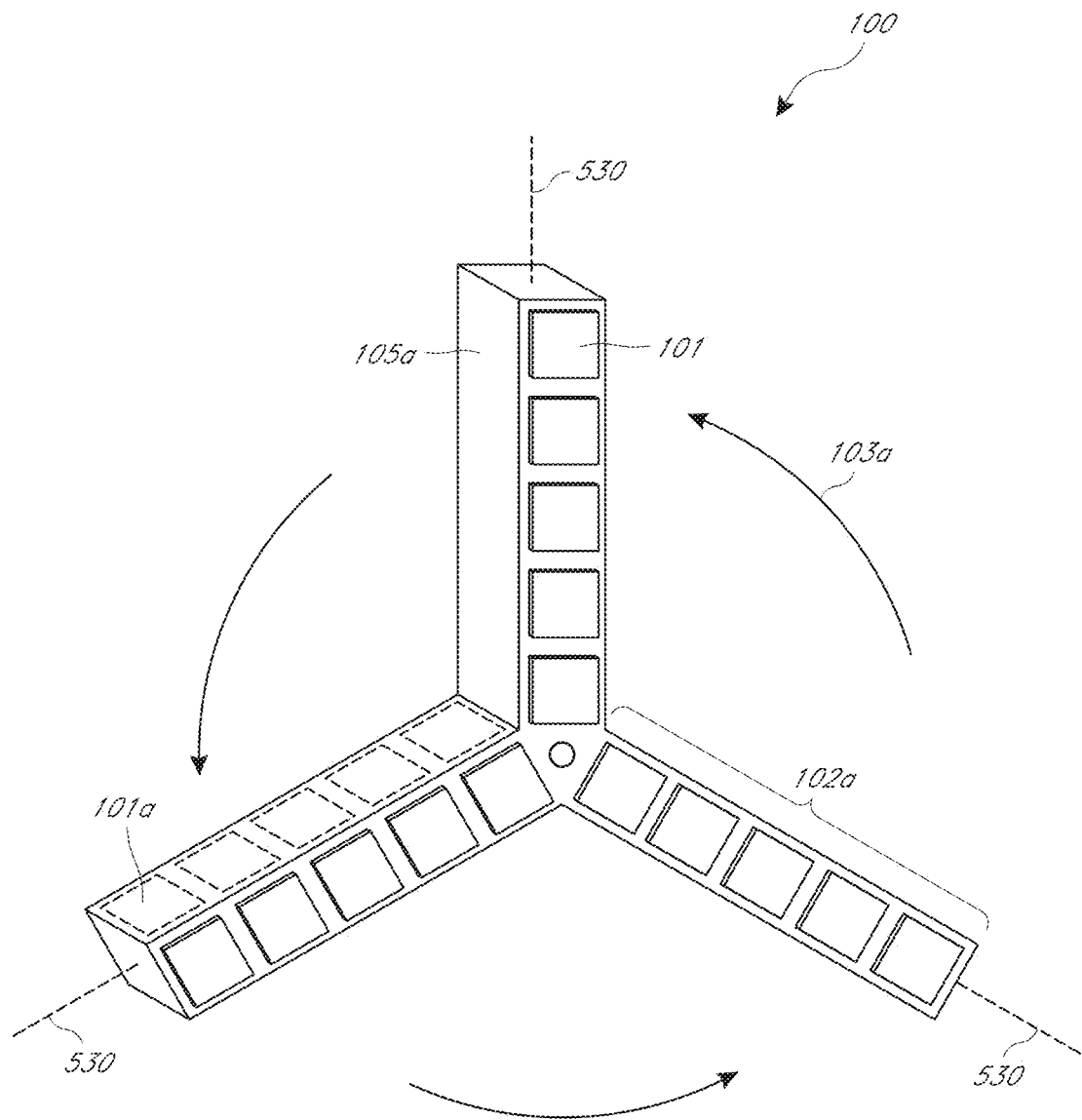
FIGS. 5A-5G schematically illustrate various examples of the display apparatus.
Figure 5B:
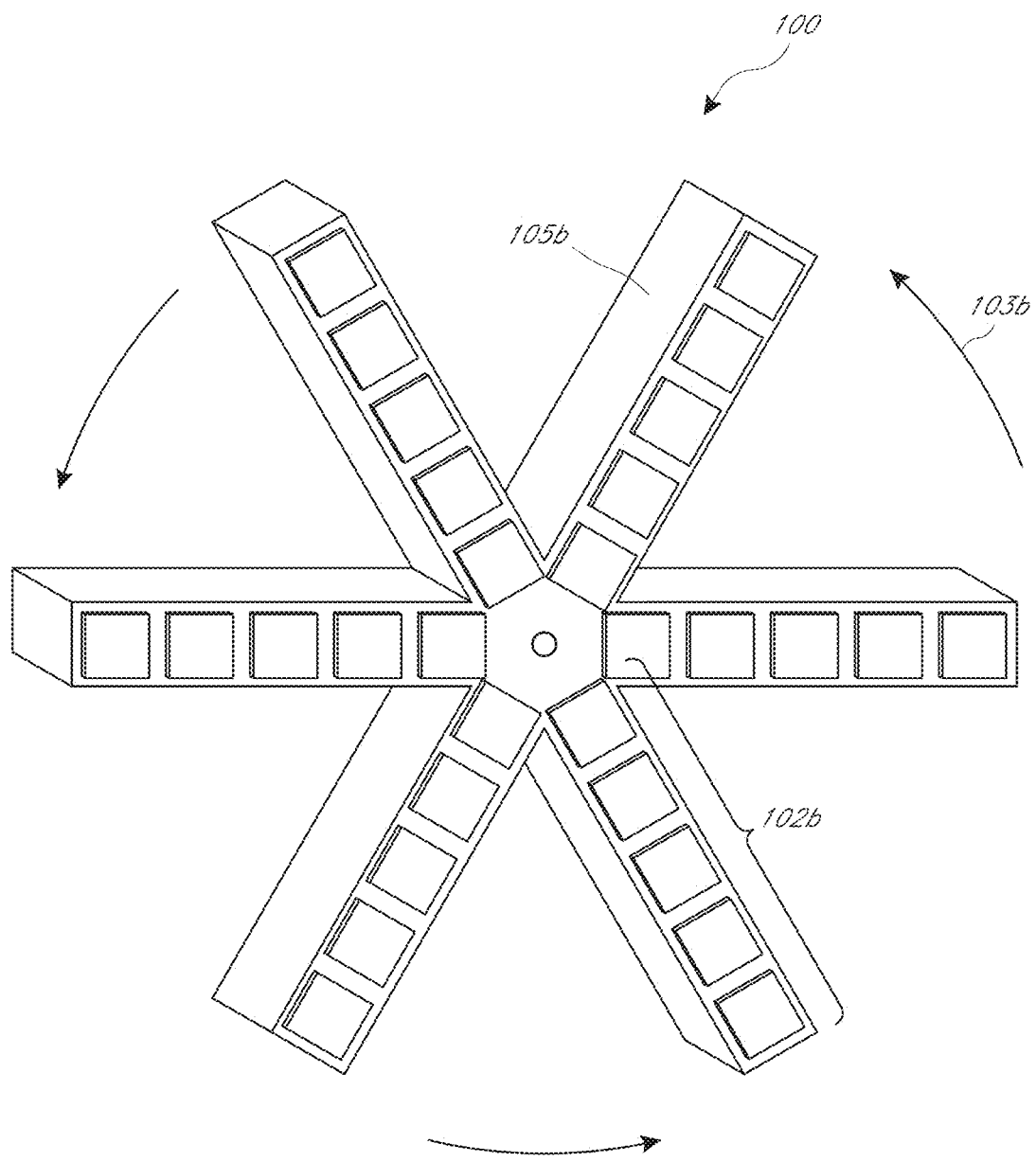
Figure 5C:
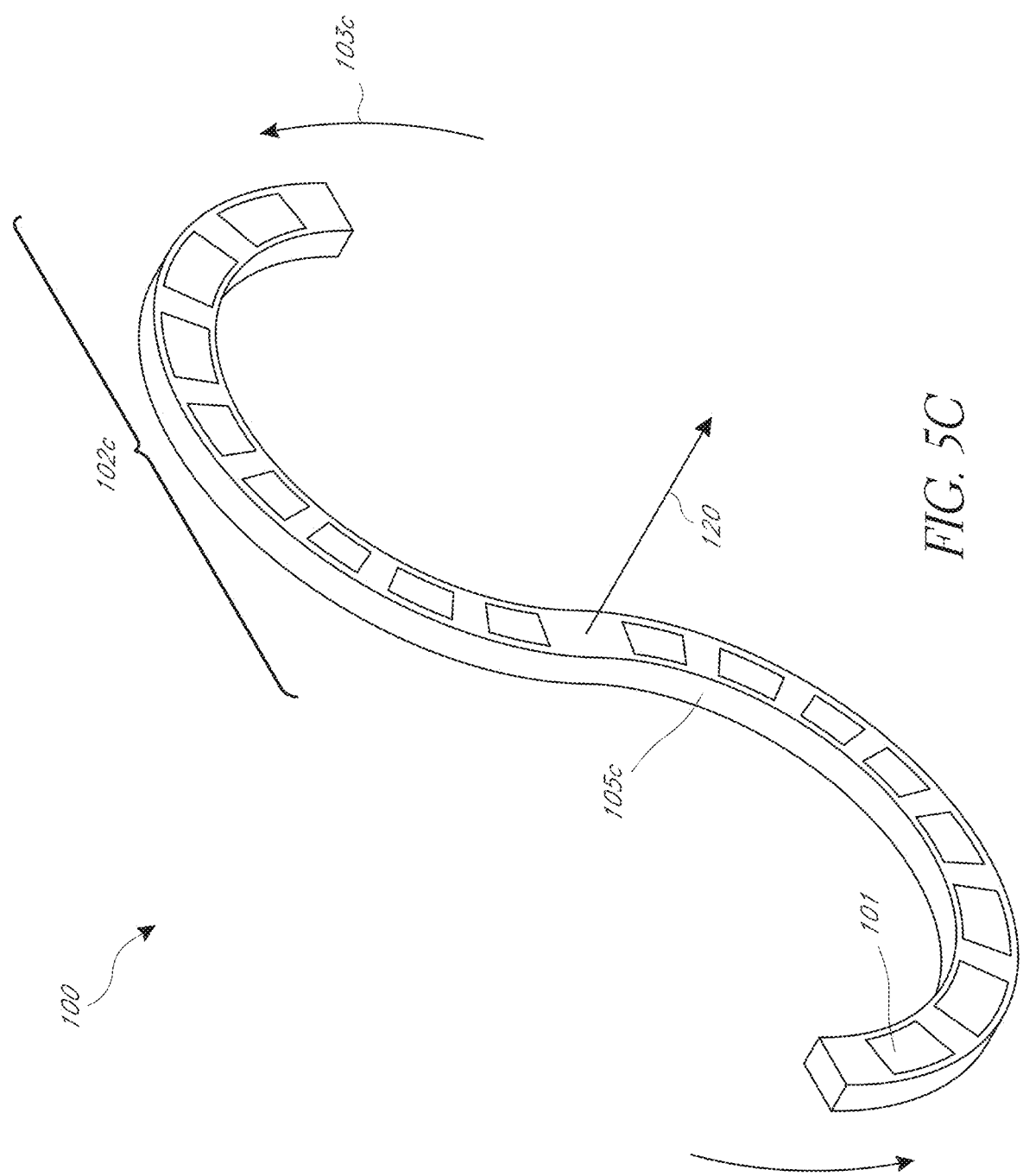

Referring again to FIG. 1, the rotatable structure 105 may be arranged similar to a propeller that rotates about the axis 120. As illustrated in FIG. 1, a rotatable structure 105 having a propeller arrangement may include multiple elongated elements 102. The elongated elements 102 may also be configured as a plurality of arms or blades of the propeller. While the display apparatus 100 in connection with FIG. 1 is shown having 4 elongated elements 102, the number, arrangement, length, width, or shape of the elongated elements 102 can be different (see, e.g., FIGS. 5A-5G). For example, the number of elongated elements 102 can be 1, 2, 3, 4, 5, 6, or more (e.g., as illustrated in FIGS. 5A and 5B). The elongated elements 102 can be straight (e.g., FIGS. 1, 5A, and 5B), curved as illustrated in FIG. 5C, or curved in or out of the plane that is perpendicular to the rotation axis 120 of the propeller (e.g., FIG. 7).

With continued reference to FIG. 1, each elongated element 102 includes an array of light field sub-displays 101 disposed along the length of the elongated element 102. Although, FIG. 1 shows five light field sub-displays 101 disposed on each elongated element 102 (and an additional optional sub-display at the center of the display, where the elongated elements cross), other embodiments are possible. For example, the number of light field sub-displays 101 can be 1, 2, 3, 4, 5, 6, or more on each elongated element 102. In another embodiment, the rotatable structure may comprise a single light-field sub-display disposed thereon. The light field sub-displays 101 may be any display configured to produce a light field. In some embodiments, the light field sub-displays 101 may comprise one or more pixels configured to emit anisotropic light (e.g., directionally emitted). For example, as will be described in more detail in connection with FIGS. 2A-3C, the light field sub-displays 101 may comprise a micro-lens array disposed adjacent to a pixel array that emits light isotropically toward the micro-lens array. The micro-lens array redirects the light from the pixel array into an array of beams that propagate at different outgoing angles to generate a light field image. In some embodiments, each micro-lens of the micro-lens array may be configured as a pixel of the light field sub-display 101. In another embodiment, the light field sub-displays 101 may include a waveguide stack assembly that produces a light field, as described below in connection with FIGS. 4A and 4B.

The display apparatus also includes a motor 104 configured to drive the rotatable structure 105. For example, the motor 104 may cause the rotatable structure 105 to rotate about the rotation axis 120 in a circular motion as illustrated by the rotation path 103. When the rotatable structure 105 is driven by the motor 104, the light field sub-displays 101 are similarly rotated about the rotation path 103. The control system 110 may be configured to control the rotation rate applied by the motor 104 to the rotatable structure 105 at a desired frequency. The frequency of rotation may be selected such that the rotatable structure 102 may not be perceivable to the viewer, who instead perceives primarily the 3-D image due to the persistence of vision of the human visual system. Such displays are sometimes generally referred to as persistence of vision (POV) displays. Other rotation frequencies are possible. The combination of the rotating light field sub-displays 101 and the illumination of each light field sub-display 101 projects a representation of an image that can be viewed by observers. The image can include objects, graphics, text, and so forth. The image may be part of a series of image frames that project an object or thing that appears to be moving or changing, as in a video. The representation may appear to be 3-D and might be mistaken by the observers to be a natural object rather than a projection. The motor 104 and the control system 110 can be disposed so that they are not apparent to a viewer (e.g., below the propeller and connected to it via suitable gearing). Because the arms of the propeller are not visible (when the propeller is rotated sufficiently quickly), the image may appear to hover in mid-air and thereby attract attention from passers-by. Accordingly, the display apparatus 100 can advantageously be used in advertising, marketing, or sales, for presentations, or to otherwise generate interest or convey information to viewers.

The local data processing module of computerized control system 110 may comprise a hardware processor 112 and a digital memory 114. In some embodiments, the digital memory 114 may be non-volatile memory (e.g., flash memory) or any non-transitory computer readable media. The digital memory 114 may be configured to store data defining instructions for the hardware processor 112. These instructions configure the hardware processor 112 to perform functions of the display apparatus 100. For example, the hardware processor 112 and the digital memory 114 may both be utilized to assist in the processing, caching, and storage of light field data. The data may include data related to a) a light field image of the object to be displayed, b) the light field sub-display positions as a function of time, or c) a mapping of the light field image to the light field sub-display positions. In some embodiments, the light field image comprises multiple rendered frames of the object where each rendered frame is a 2-D representation of the object at a viewing direction (e.g., a direction that an observer may be relative to the display apparatus 100). Each rendered frame may comprise multiple pixels, referred to hereinafter as rendered pixels, which are combined to represent the image of the object to be displayed. Each rendered pixel may be associated with a position on a rendered frame (e.g., a rendered pixel position). The multiple rendered frames and the rendered pixel positions may be stored in the digital memory 114 for access and use by the control system 110. The light field image may include imaging parameters (e.g., color and intensity of light to display the rendered frame), where the imaging parameters are associated with the viewing direction of the rendered frame. In some embodiments, the light field sub-display positions are defined by positions of the light field sub-display 101 along the elongated elements 102 as a function of time and rotation angle based on the rotation rate of the rotatable structure 105. The light field sub-display positions may also include the positions of the components (e.g., micro-lenses described below) of each light field sub-display as a function of time.

In some embodiments, the hardware processor 112 may be operatively coupled to the digital memory 114 and configured to analyze and process the data in the digital memory 114. The hardware processor 112 may also be operatively coupled to the motor 104 and configured to drive the motor 104 at a rate of rotation. In some embodiments, the rate of rotation may be preselected based on the light field image, the number of light field sub-displays 101, or the number of elongated elements 102. The hardware processor 112 may also be operably coupled to each light field sub-display 101 and configured to drive each light field sub-display 101 (e.g., the pixels of each light field sub-display 101 as described below) based on the light field image stored in the digital memory 114. For example, while the rotatable structure 105 is rotated based on instructions executed by the hardware processor 112, the rotation is imparted on to the light field sub-displays 101 causing them to sweep out a series of concentric circular arcs along the rotation path 103 about the rotation axis 120. The hardware processor 112 may also drive each light field sub-display 101 (e.g., the pixels described below) to emit light as the light field sub-displays 101 (or the pixels therein) reach a position associated with a rendered pixel position and image parameters stored in the digital memory 112. The rotation rate of the rotatable structure 105 can be sufficiently high so that an observer does not perceive the elongated elements 102 of the rotatable structure 105 as they rotate (e.g., the rotatable structure 105 in effect appears transparent) and instead sees the illumination from the light field sub-displays 101 thereby displaying a 3-D representation of the object.

One possible manner in which displaying a 3-D representation of an object can be accomplished is that a multiplicity of points of view may be rendered in advance by the control system 110 or another rendering engine. For any given orientation (e.g., rotation angle) of the rotatable structure 105, a mapping may be generated or retrieved that maps a position (z) of a pixel of the light field sub-display 101 at a time (t) (e.g., based on the rotation of the rotatable structure 105) to a rendered pixel (u) of a rendered frame (k). This mapping may be accomplished by the processor 112, which may include a microprocessor or microcontroller, a graphics processing unit (GPU), or special purpose hardware (e.g., a floating point gate array (FPGA) or an application specific integrated circuit (ASIC)).

In one embodiment, the control system 110 can be configured to map the rendered pixels of the rendered frame. For example, the rendered frame k can be associated with a viewing direction of the object to be displayed and the rendered pixel (u) can have a position (e.g., represented by coordinates, for example, an X and a Y coordinate or a positional coordinate) within the rendered frame (k). This mapping may be constant and independent of the object to be displayed and thus may be pre-computed and stored (e.g., in the digital memory 114) in a data structure (e.g., in a lookup table (LUT)).

In one embodiment, the control system 110 may also be configured to map the rendered pixel positions to positions of the light field sub-displays 101. For example, each pixel of the light field sub-displays 101 can be located at a different position at different times based on the rate of rotation of rotatable structure 105. The rotation rate may, but need not, be constant in time. In addition, because the light field sub-displays 101 are rotated with time, the rendered pixel position for the light emitted by a pixel of a light field sub-display 101 may be translated for this overall rotation. Accordingly, each rendered pixel position (u) of the rendered frame (k) can be associated with a given position of a pixel of the light field sub-display 101 based on the position (z) of the pixel along the elongated element 102 as a function of time (t) as the pixel sweeps out along the path 103. Thus, the corresponding rendered pixels of each rendered frame can be collected together and mapped to the pixels of the light field sub-displays 101. The mapping is configured such that the rendered pixel positions are translated to pixels of the light field sub-display 101 so that light emitted from the light field sub-displays 101 is anisotropically directed based on the viewing direction of the rendered frame. This may also be pre-computed and stored (e.g., in the digital memory 114) in a data structure (e.g., in a lookup table (LUT)) that may be the same data structure as described above or a different data structure. In some embodiments, the pixels of light field sub-display 101 may be strobed (e.g., alternated or switched between different rendered frames of the light field image) based on the mapped translated image parameters of the rendered frame as the rotatable structure 105 rotates.

In some embodiments, since some light field sub-displays 101 are farther from the rotation axis 120, some light field sub-displays 101 sweep out larger circular areas as compared with light field sub-displays 101 that are closer to or on the rotation axis 120. In some instances, the apparent intensity of light, as viewed by the observer of a displayed object, from the light field sub-displays 101 away from the rotation axis 120 may tend to be lower than the intensity of light emitted from light field sub-displays 101 that are closer to the rotation axis 120, because the amount of illumination per area decreases for light field sub-displays 101 farther from the rotation axis 120. Thus, in some implementations, to keep the apparent intensity of the image across the rotatable structure 105 relatively constant, the brightness of the illumination, the duration of the strobe, or both, can be scaled linearly with the radius for a particular light field sub-display 101 based on the distance from the rotation axis 120. In other implementations, the light field sub-displays 101 at larger radii have increased size, increased number of pixels, or both (compared to the light field sub-displays 101 closer to the rotation axis). In yet other implementations, more light field sub-displays 101 may be used at larger radii, e.g., by decreasing a spacing between adjacent light field sub-displays 101 or having the elongated elements 102 branch out into sub-elements as distance from the rotation axis increases.

The control system 110 can include a connection to a network, for example, to receive images or image display instructions that are to be displayed by the display apparatus 100. The display apparatus 100 can include audio capability. For example, the display apparatus 100 may include or be connected to a speaker system 118 to project audio in combination with the projected image. In some implementations, the display apparatus 100 can include a microphone 119 and voice recognition technology to enable the display apparatus 100 to receive and process audio commands or comments from viewers. For example, the display apparatus 100 may be configured to recognize comments from interested viewers and take action to modify the display apparatus 100 in response to the comments (e.g., by changing the color of the projected image, changing the projected image, outputting an audio response to the comments, etc.). As an example, in a retail store environment, the display may show an image of a product for sale, and in response to a question as to the price of the product, the display may output the price audibly (e.g., "The product is on sale today for two dollars.") or by a change in the displayed image (e.g., text or graphics showing the price).

The display apparatus 100 may include a proximity sensor 116 to detect whether an object is nearby and the control system 110 can take an appropriate action such as displaying an audible or visual warning or shutting off or slowing the rotation of the propeller. Such implementations may provide safety advantages if a viewer were to attempt to touch the 3-D visible object, not knowing about the rapidly rotating propeller arms.

While examples of devices for producing a light field are described herein, it will be understood that no single light field sub-display type is necessary for displaying a 3-D representation of an object in the display apparatuses. Other light field displays are envisioned, such that a plurality of light field sub-displays is disposed on the rotatable structure to produce a 3-D representation of an object. For example, any of the light field sub-displays, assemblies, or arrangements described in U.S. Patent Application No. 62/288,680, filed Jan. 29, 2016, entitled "Holographic Propeller," which is incorporated by reference herein in its entirety for all it discloses, can be implemented for displaying a 3-D representation of an object. One non-limiting advantage of some of the embodiments disclosed herein is that by attaching an array of light field sub-displays along the elongated element that is rotated, the display apparatus may utilize a reduced number of light field sub-displays to display the 3-D representation as compared to a single non-rotating display covered by pixels. Another non-limiting advantage of the present embodiments is that fewer display elements or light field sub-displays need be illuminated at any one time as compared to a single display that illuminates the entire display to generate an image. In some embodiments, the control system 110 may be configured to control the actuation of each light field sub-display 101 (e.g., the timing, intensity, and color of illumination of each light field sub-display) based on a desired image to be projected by display apparatus 100.

Example Light Field Sub-Display Comprising a Micro-Lens Array Assembly

Figure 2A:
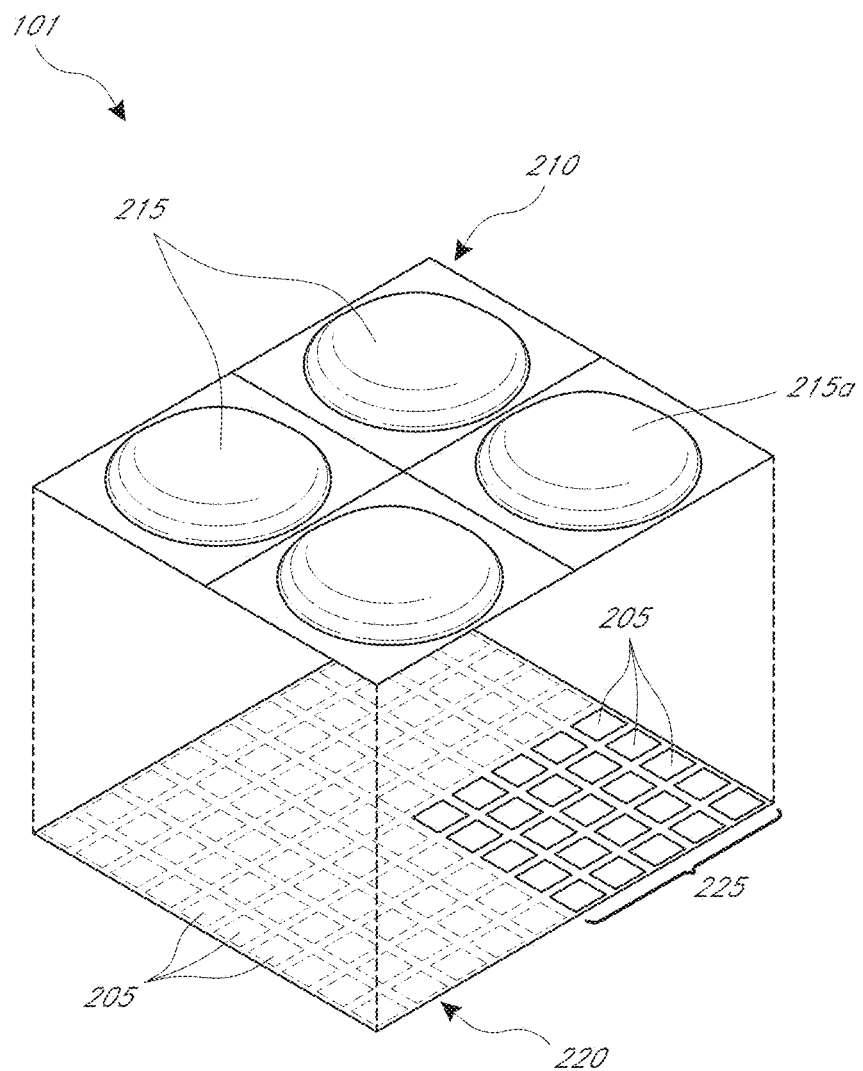
FIGS. 2A and 2B are perspective (FIG. 2A) and top (FIG. 2B) views that schematically illustrate an example of a light field sub-display for outputting light field image information.
Figure 2B:
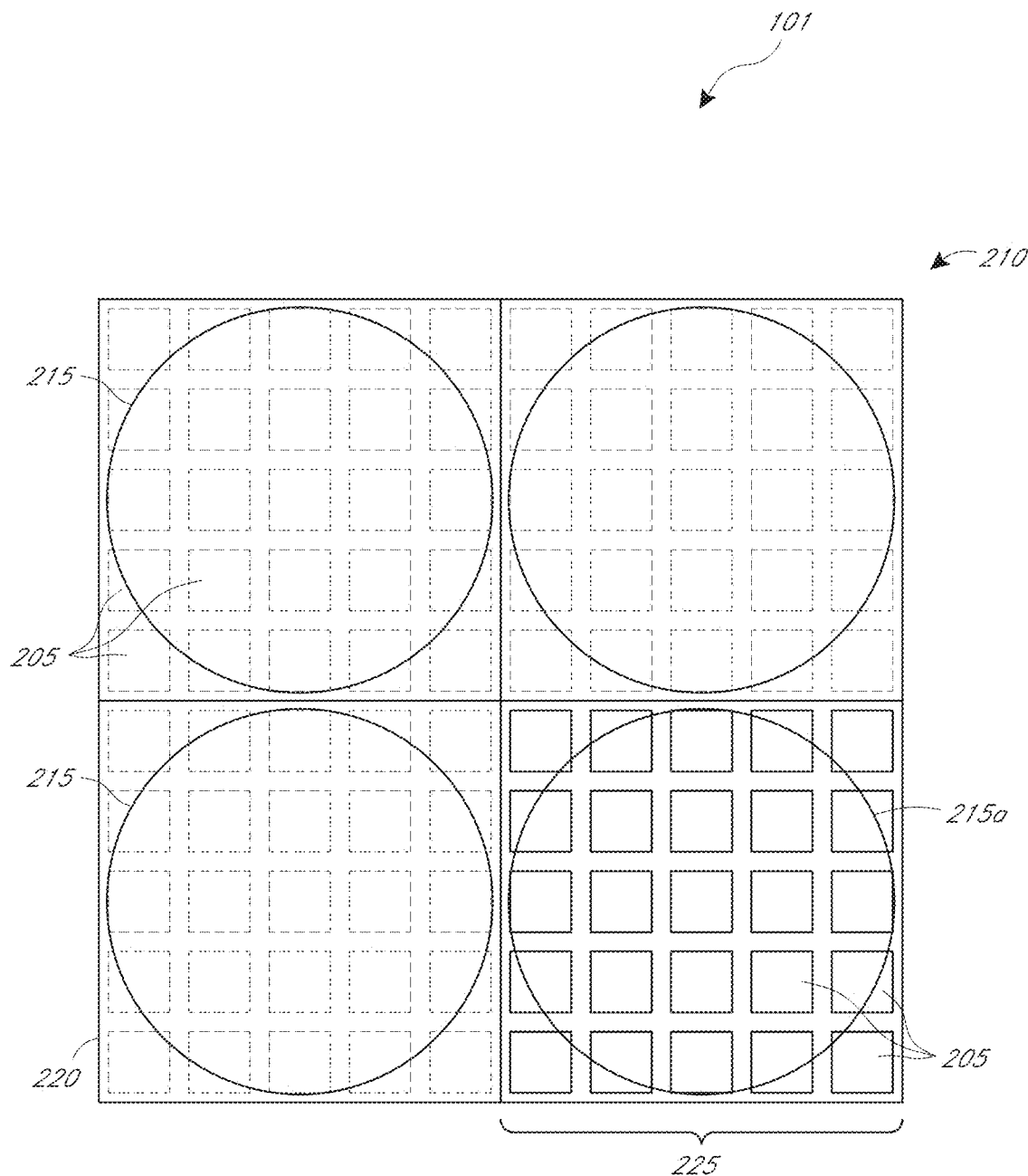

FIGS. 2A-2B illustrate an example of a light field sub-display 101 that may be disposed along the rotatable structure 105 of FIG. 1. In some embodiments, the light filed sub-display 1010 may be disposed on a display panel 1305 of FIG. 13A or 14A-14E, as described below. FIG. 2A is an exploded perspective view of a portion of a light field sub-display 101 having a micro-lens array 210 spaced apart from a pixel array 220 comprising a plurality of pixels 205. The micro-lens array 210 includes a plurality of micro-lenses 215. FIG. 2B is a top view of the portion of the light field display 101 shown in FIG. 2A. The pixels 205 of the pixel array 220 can be liquid crystal (LC), light emitting diodes (LEDs), organic LEDs (OLEDs), or any other type of pixel structure configured to emit light for rendering an image. Generally the pixels 205 of the pixel array 220 emit light substantially isotropically, at least in the direction above the pixel array 220 and toward the micro-lens array 210. FIGS. 2A-2B, and the other figures illustrated herein, may not be to scale, but are for illustrative purposes only. Further, these figures schematically illustrate a portion of the light field sub-display 101, which may include more than the four micro-lenses 215 and more than 100 pixels 205.

FIGS. 2A and 2B illustrate that the light field sub-display 101 includes the micro-lens array 220 having multiple micro-lenses 215. The micro-lens array 210 shown in FIGS. 2A and 2B includes a 2×2 array of micro-lenses 215. Each micro-lens 215 is associated with a subset of pixels 205 of pixel array 220. For example, the micro-lens 215a is used to redirect light from the subset 225 of pixels 205 of pixels array 220 disposed below the micro-lens 215a into a variety of angular directions. Redirection of the light by the micro-lens 215a will be described with reference to FIGS. 3A-3C.

The resolution of a display apparatus 100 employing the light field sub-display 101 of FIG. 2A-2B may depend on, e.g., the number of micro-lenses 215 included in the micro-lens array 210 and the number of pixels in the subset 225 associated with each micro-lens. In some embodiments, each micro-lens 215 may be configured as a pixel of a light field sub-display 101. For example, the pixel array 220 illustrated in FIG. 2A includes an array of 10×10 pixels (shown with dashed lines). Each micro-lens 215 may be associated with a subset 225 of pixels 205, for example, as illustrated in FIGS. 2A and 2B, the micro-lens 215a is associated with the 5×5 subset 225 of pixels 205 (shown with solid lines). The micro-lens array 210 and the pixel array 220 are intended to be illustrative, and in other embodiments, the arrangement, numbers, shapes, etc. of the micro-lenses and pixels can be different than illustrated. For example, the pixel array 220 may include 100×100 pixels covered by an array of micro-lenses 210 such that each micro-lens 215 covers a 10×10 array of pixels on the pixel array 220.

In the example shown in FIGS. 2A-2B, the cross-sectional shapes of the micro-lenses 215 are depicted as circular, however they may be rectangular or any other shape. In some embodiments, the shape or spacing of the individual micro-lenses 215 can vary across the micro-lens array 210. Also, although FIGS. 2A and 2B depict a 2×2 micro-lens array disposed over a 10×10 pixel array, it will be understood that this is for illustration purpose and any other number or dimension n×m (n, m=1, 2, 3, 4, 5, 10, 20, 30, 64, 100, 512, 768, 1024, 1280, 1920, 3840, or any other integer) for either the micro-lens array 210 or the pixel array 220 can be used.

One non-limiting advantage of utilizing a micro-lens array 210, is that the each micro-lens array 210 of a single light field sub-display 101 may be configured as a light field display capable of providing a light field to observers of the display apparatus. Light field displays are capable of controlling the direction of light emitted along with the color and intensity. In contrast, conventional displays emit light isotopically in all directions. For example, micro-lens 215a may be associated with the subset 225 of the pixels 205. The subset 225 of pixels 205 may emit light that is isotropic, but when the light passes through the micro-lens 215a, the light is directed toward an observer mimicking or simulating a ray of light that originates from a point in space at a focal plane at which the observer is focusing.

Figure 3A:
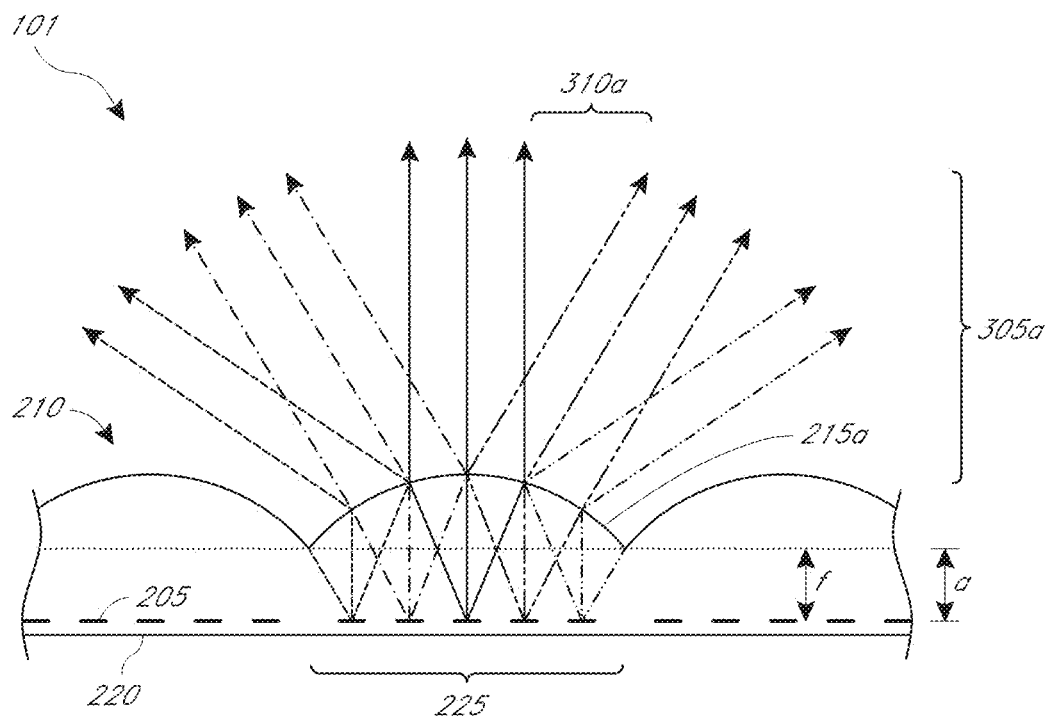
FIGS. 3A-3C are cross-section side views schematically depicting a portion of embodiments of light field sub-displays of FIGS. 2A and 2B.
Figure 3B:
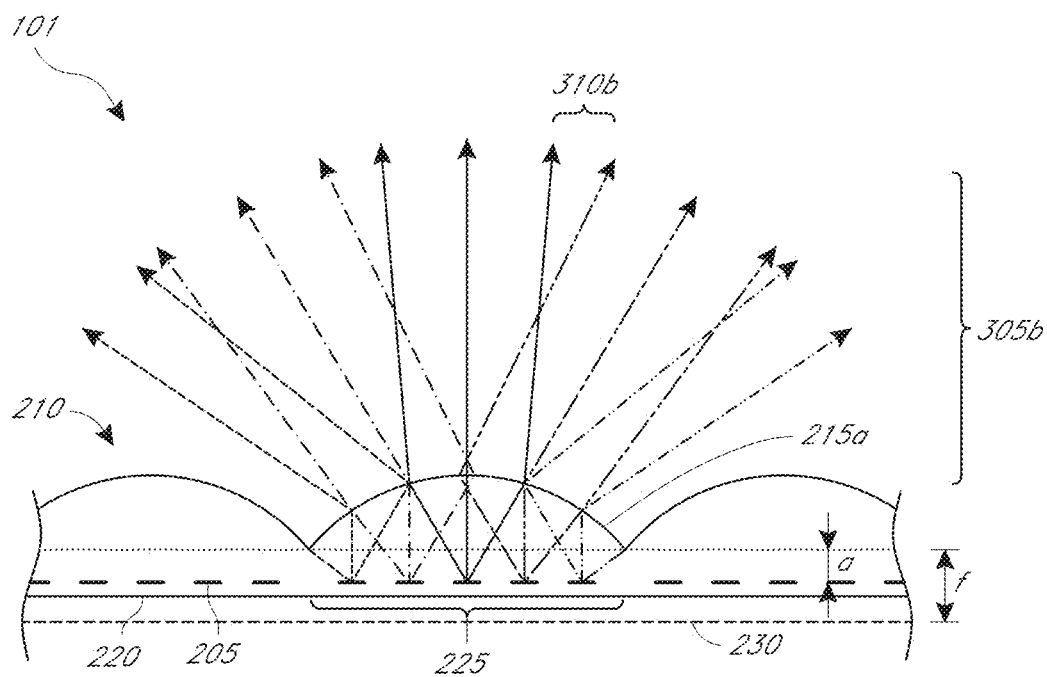
Figure 3C:
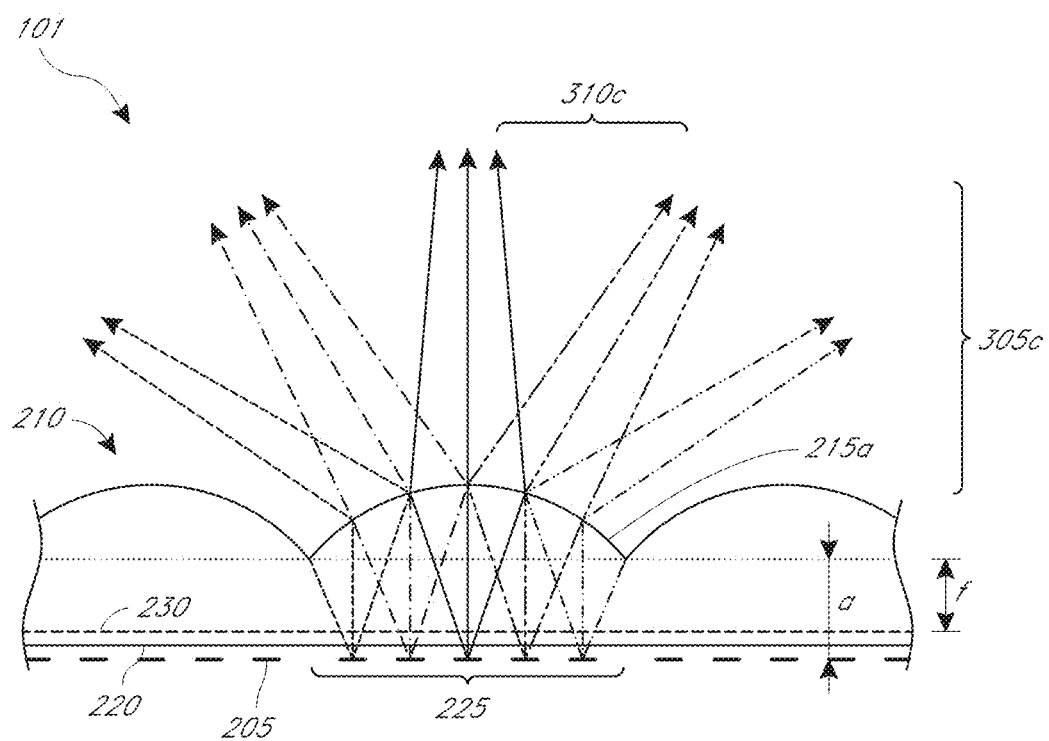

FIGS. 3A-3C are partial side views of the light field sub-display 101 including an illustrative representation of ray traces for multiple arrangements of the pixel array 220 and micro-lens array 210. FIG. 3A illustrates a partial cross-sectional side view of light field sub-display 101 including rays of light emitted from the subset 225 of pixels 205 of pixel array 220. The pixels 205 of the pixel array 220 are positioned at a distance of a from the micro-lens array 210. In some embodiments, the hardware processor is configured to drive each pixel 205 of the pixel array 220 to emit light based on the image data stored in the digital memory 114. Light emitted from each of the individual pixels 205 interacts with the micro-lens array 210 such that the spatial extent of the light emitted from the subset 225 of pixels 205 under the associated micro-lens 215a generates an array of light beams 305a that propagate at different outgoing angles.

In the embodiment illustrated in FIG. 3A, the distance a between the micro-lens array 210 and the individual pixels 205 is approximately equal to the focal length (f) of the micro-lens 215 in the micro-lens array 210. When the distance a is equal to the focal length (f), the light emitted from individual pixels 205 of the pixel array 220 interacts with the micro-lens array 210 such that the spatial extent of the light emitted from the subset 225 of pixels 205 generate an array of substantially collimated beams of light 305a at different outgoing angles. The different line types for the light rays (e.g., solid line, dotted lines, etc.) do not refer to the color or intensity of light, but are merely illustrative to depict the geometry of the rays of light emitted by different pixels.

In some embodiments, the number of pixels in the subset 225 of pixels 205 disposed under each individual micro-lens 215 can be selected based on the number of beams of light 305a designed to be emitted from each micro-lens in the micro-lens array 210. For example, an n×m subset 225 of pixels 205 underneath a micro-lens 215a can produce an n×m array of light beams perceivable by observers, thus representing n×m different viewing directions of the object represented by the display apparatus 100. In various implementations n and m (which may be different from each other, and different in each subset 225 of pixels 205) can be integers such as, e.g., 1, 2, 3, 4, 5, 10, 16, 32, 64, 100, 256, or more. For example, the micro-lens 215a of FIG. 2A having a 5×5 subset 225 of pixels 205, may emit a light at 25 different directions. Each direction may be associated with a viewing direction of the image to be displayed by the display apparatus 100.

In the embodiment illustrated in FIG. 3A, the individual pixels 205 are positioned at the focal length (f) of the micro-lens array 210, such that light emitted from individual pixels 205 will be fully or partially collimated by the micro-lenses 215 and redirected to an outgoing angle such that the subset 225 of pixels 205 underneath the micro-lens 215 effectively creates a multiplicity of beams of light 305a, each corresponding to a particular angle of the overall light field generated by the display. In some implementations, if relatively few pixels are in the subset 225 of pixels 205, there may be gaps 310a between the individual collimated beams of light 305a. The gaps 310a may be perceivable by an observer viewing the image at an angle associated with the gap 310a and may distract from the appearance of the image if the angular extent of the gap 310a is too large. The gap 310a may be observed as a fading of intensity of the light 305a directed to the observer at that angle. If the gaps 310a are too large in angular extent, the observer may perceive the brightness of the displayed image as modulating when the observer moves her head or eyes or slightly changes her position relative to the display, which may be distracting. In one embodiment, the gap 310a may be reduced by increasing the number of pixels in the subset 225 of pixels 205 so that the angular extent of the gaps 310a is sufficiently small. Ray tracing software can be used to model the distribution of light from the light field sub-display 101 and to determine the number, spacing, spatial distribution, etc. of the pixels and micro-lenses, based on factors such as a typical distance that observers view the display, an amount of modulation that is acceptable, etc.

In another embodiment, alternatively or in combination with the embodiments described herein, the pixels in the subset 225 of pixels 205 can be placed at a distance a from the micro-lens array 210 that is slightly larger or smaller than the focal plane 230 of micro-lenses 215 (see, e.g., FIGS. 3B and 3C) of the microlenses. This may result in some divergence of the individual beams so that there are fewer, reduced, or no gaps in the light field at the far-field from the light field sub-display 101. For example, FIG. 3B illustrates a scenario where the distance a is smaller than the focal length f, thus the beams of light 305b diverge outward, thereby reducing the angular extent of the gaps 310b. FIG. 3C illustrates a scenario where the distance a is greater than the focal length f, so that the beams may diverge toward a central beam, which in some embodiments may result in larger gaps 310c.

Light Field Sub-Display Comprising Waveguide Stack Assembly

While FIGS. 2A-3C show examples light field sub-displays 101 comprising a micro-lens array 210 for use in a display apparatus 100, this is for illustration and not limitation. It will be understood that the various advantages of the embodiments disclosed herein may be achieved by any variation and type of display capable of producing a light field used as one or more of the light field sub-displays 101. For example, any of the light field displays, stacked waveguide assemblies, or other optical emitters described in U.S. patent application Ser. No. 14/555,585, filed Nov. 27, 2014, entitled "Virtual and Augmented Reality Systems and Methods," published as U.S. Patent Publication No. 2015/0205126, which is hereby incorporated by reference herein in its entirety for all it discloses, can be implemented as one or more of the light field sub-displays 101 of the display 100 of FIG. 1 or as one or more of the light field sub-displays 1101 of the display 1100 of FIG. 11 described below. Furthermore, the stacked waveguide assemblies may be implemented in the alternative or in combination with the light field sub-displays comprising the micro-lens array of FIGS. 2A and 2B.

Figure 4A:
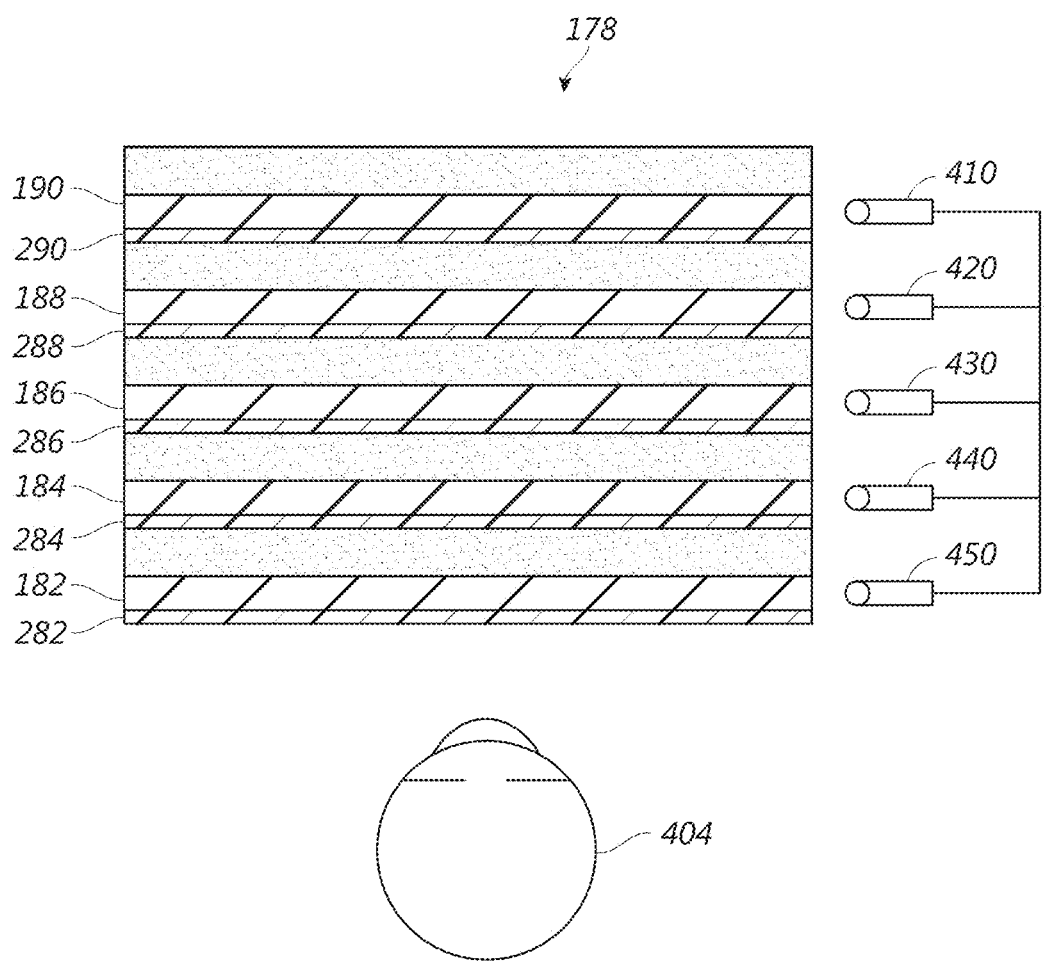
FIGS. 4A and 4B schematically illustrate an example of a waveguide stack for outputting light field image information to a user.
Figure 4B:
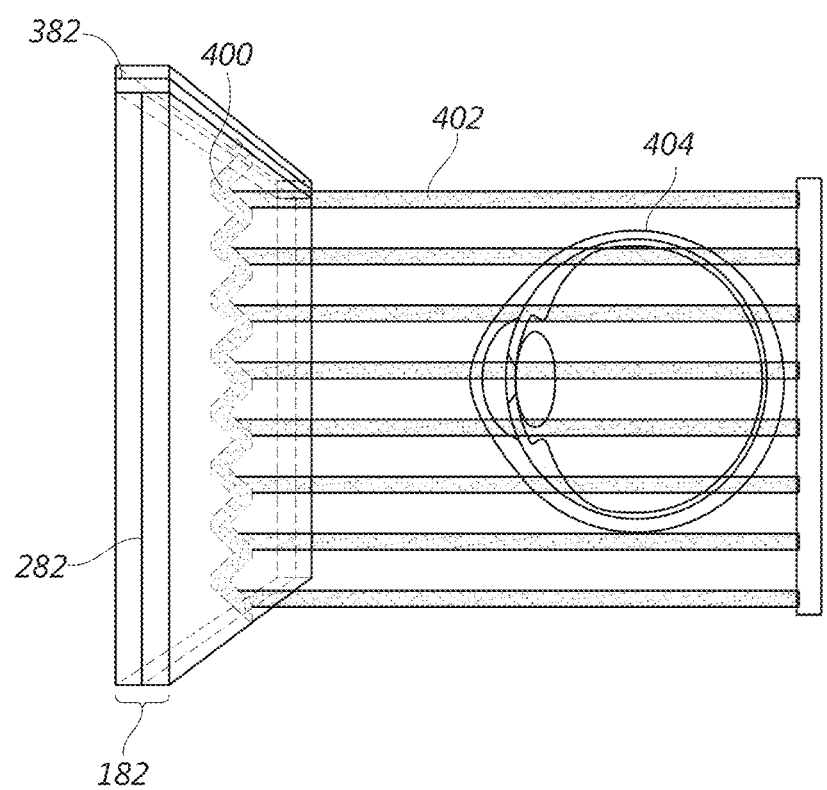

FIGS. 4A and 4B illustrate one such embodiment of a stacked waveguide assembly 178 that may be implemented as a light field sub-display 101. For example, FIGS. 4A and 4B illustrate aspects of an approach for simulating three-dimensional imagery using multiple depth planes. The optics illustrated in FIGS. 4A and 4B correspond to a stacked waveguide assembly of transmissive beamsplitter substrates, each of which is configured to project light at a different focal plane.

With reference to FIG. 4A, objects at various distances from eye 404 (which may be a single eye or two eyes) are accommodated by the eye 404 so that those objects are in focus. Consequently, a particular accommodated state may be said to be associated with a particular depth planes, with has an associated focal distance, such that objects or parts of objects in a particular depth plane are in focus when the eye is in the accommodated state for that depth plane. In some embodiments, three-dimensional imagery may be simulated by providing different presentations (e.g., different rendered frames) of an image for each eye 404, and also by providing different presentations of the image corresponding to each of the depth planes or different viewing angles. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

FIG. 4A illustrates an example of a stacked waveguide assembly 178 for outputting image information to a user. The stacked waveguide assembly, or stack of waveguides, 178 that may be utilized to provide three-dimensional perception to the eye/brain using a plurality of waveguides 182, 184, 186, 188, 190. In some embodiments, the waveguide assembly 178 may correspond to a light field sub-display 101 of FIG. 1.

With continued reference to FIG. 4A, the stacked waveguide assembly 178 may also include a plurality of features 198, 196, 194, 192 between the waveguides. In some embodiments, the features 198, 196, 194, 192 may be lenses. The waveguides 182, 184, 186, 188, 190 or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 410, 420, 430, 440, 450 may be utilized to inject rendered frame image information (as describe d above) into the waveguides 182, 184, 186, 188, 190, each of which may be configured to distribute incoming light across each respective waveguide, for output toward the eye 404. In some embodiments, a single beam of light (e.g., a collimated beam) may be injected into each waveguide to output an entire field of cloned collimated beams that are directed toward the eye 404 at particular angles (and amounts of divergence) corresponding to the depth plane of the rendered frame and associated with a particular waveguide.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 404. An extracted beam of light is outputted by the waveguide at locations at which the light propagating in the waveguide strikes a light redirecting element. The light extracting optical elements 282, 284, 286, 288, 290 may, for example, be reflective or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top or bottom major surfaces, or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface or in the interior of that piece of material.

With continued reference to FIG. 4A, as discussed herein, each waveguide 182, 184, 186, 188, 190 is configured to output light to form a rendered frame or presentation based on a particular depth plane or viewing direction. For example, the waveguide 182 nearest the eye may be configured to deliver collimated light, as injected into such waveguide 182, to the eye 404. The collimated light may be representative of the optical infinity focal plane. The next waveguide up 184 may be configured to send out collimated light which passes through the first lens 192 (e.g., a negative lens) before it can reach the eye 404. First lens 192 may be configured to create a slight convex wavefront curvature so that the eye/brain interprets light coming from that next waveguide up 184 as coming from a first focal plane or viewed direction closer inward toward the eye 404 from optical infinity. Similarly, the third up waveguide 186 passes its output light through both the first lens 192 and second lens 194 before reaching the eye 404. The combined optical power of the first and second lenses 192 and 194 may be configured to create another incremental amount of wavefront curvature so that the eye/brain interprets light coming from the third waveguide 186 as coming from a second focal plane or viewing direction that is even closer inward toward the person from optical infinity than was light from the next waveguide up 184. Accordingly, one or more waveguides of the waveguide stack may be configured, individually or in combination with the other waveguides, as one or more pixels of the light field sub-display.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4A, the light extracting optical elements 282, 284, 286, 288, 290 may be configured to both redirect light out of their respective waveguides and to output this light with the appropriate amount of divergence or collimation for a particular depth plane (or viewing direction) associated with the waveguide. As a result, waveguides having different associated depth planes (or viewing direction) may have different configurations of light extracting optical elements, which output light with a different amount of divergence depending on the associated depth plane (or viewing direction). In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, or diffraction gratings. In other embodiments, they may simply be spacers (e.g., cladding layers or structures for forming air gaps).

FIG. 4B shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the light extracting optical element 282, a portion of the light exits the waveguide as exit beams 402. The exit beams 402 are illustrated as substantially parallel but they may also be redirected to propagate to the eye 404 at an angle (e.g., forming divergent exit beams), depending on the depth plane or viewing angle associated with the waveguide 182. It will be appreciated that substantially parallel exit beams may be indicative of a waveguide with light extracting optical elements that extract light to form images that appear to be set on a depth plane at a large distance (e.g., optical infinity) from the eye 404. Other waveguides or other sets of light extracting optical elements may output an exit beam pattern that is more divergent, which would require the eye 404 to accommodate to a closer distance to bring it into focus on the retina and would be interpreted by the brain as light from a distance closer to the eye 404 than optical infinity.

Alternative Embodiments for Displaying a 3-D Representation of an Object

While FIG. 1 shows an example of the display apparatus 100 comprising a rotatable structure 105 having four elongated elements 102 with light field sub-displays 101 disposed thereon, the display apparatus 100 can be configured differently in other embodiments. For example, a rotatable structure may comprise any number of elongated elements having any shape or size. Furthermore, the rotatable structure may be a single structure having one or more arrays of light field sub-displays. FIGS. 5A-5G illustrate some of the embodiments of a display apparatus 100 in accordance with the disclosure herein, however, other configurations are possible.

FIGS. 5A and 5B illustrate the display apparatus 100 with different rotatable structures 105 configured as a propeller in which the number and arrangement of the elongated elements 102 are different than illustrated in FIG. 1 (the motor 104 and the control system 110 are not shown). For example, FIG. 5A illustrates a rotatable structure 105a that comprises three elongated elements 102a. Similar to elongated elements 102 of FIG. 1, each elongated element 102a includes a plurality of light field sub-displays 101. While FIG. 5A illustrates an arrangement of three equally spaced elongated elements 102a, the elongated elements 102a need not be equally spaced, but may have any spacing therebetween. FIG. 5B illustrates another example of a rotatable structure 105b that comprises six elongated elements 102b. The elongated elements need not be equal in length or width. Furthermore, as illustrated in FIGS. 5A and 5B, the number of light field sub-displays 101 on each elongated element (102a, 102b) is the same, this need not be the case for all designs of rotatable structures. The number of light field sub-displays 101 may be varied as required by the particular application of the display apparatus 100.

In some embodiments, the elongated elements need not be straight, but may have any non-straight shape (e.g., curved, arcuate, segmented, etc.). For example, FIG. 5C illustrates another rotatable structure 105c with elongated elements 102c having an arced shape, where the arc is along the same plane that the light field sub-displays 101 are disposed thereon. For example, the elongated elements 102c are curved along a plane that is perpendicular to the rotation axis 120 of the rotatable structure 105c.

In some embodiments, the elongated elements need not have a square or rectangular cross section. For example, each elongated element may have a circular or ovular cross section. In other embodiments, the elongated elements may have a cross section of any polygon shape (e.g., cross section shape of a triangle, pentagon, hexagon, etc.). While the embodiments illustrated in FIGS. 1 and 5A-5G depict the plurality of light field sub-displays 101 being disposed along a single planar surface perpendicular to the rotation axis 120, this need not be the case. For example, with reference to FIG. 5A, light field sub-displays 101a (shown with dashed lines) optionally can be disposed on other surfaces of the elongated element.

Similarly, each elongated element may be rotated about a second rotation axis different than the rotation axis 120 of the rotatable structure. For example, referring to FIG. 5A, each elongated element 102a may have an axis 530 extending along the elongated element. The display apparatus 100 may then be configured to individually or in combination rotate one or more of the elongated elements 105a about their own axis 530.

Figure 5D:
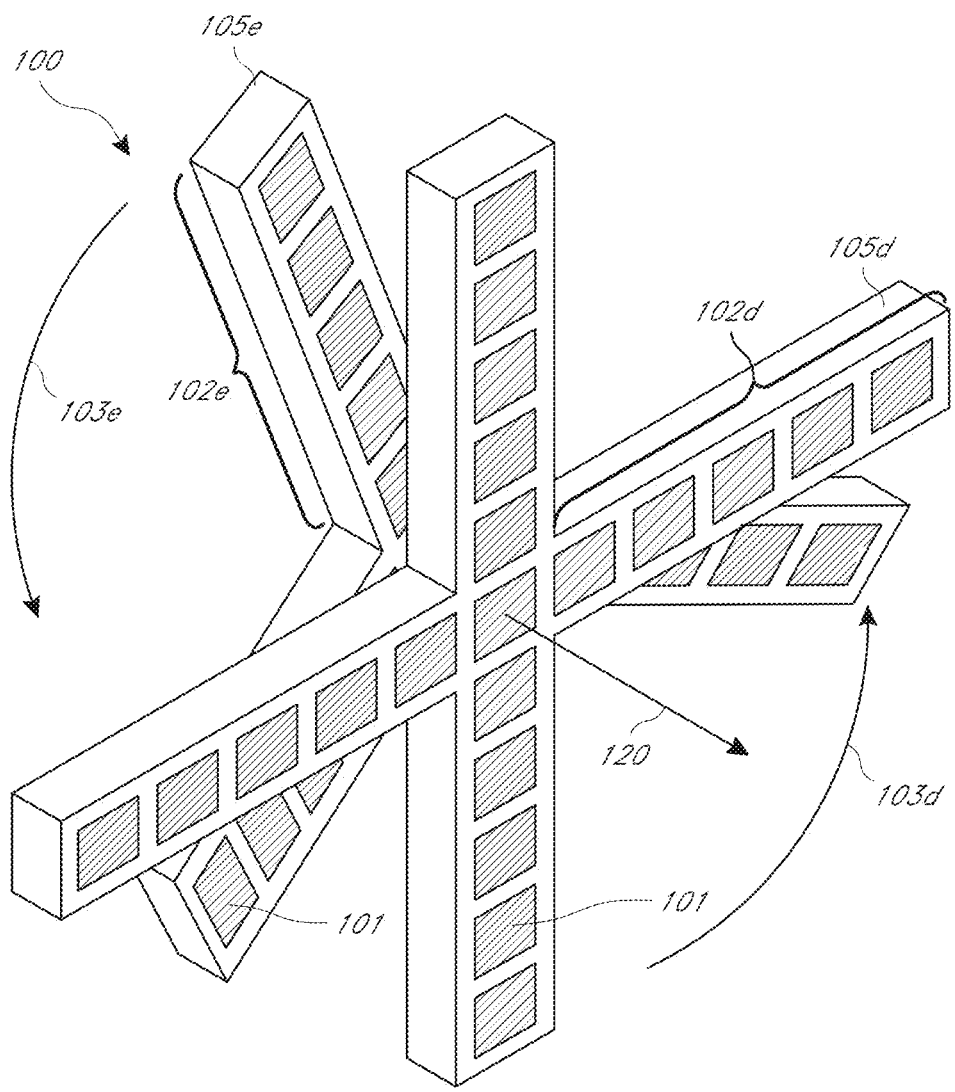

In some embodiments, the display apparatus 100 may comprise multiple rotatable structures. For example, FIG. 5D illustrates multiple rotatable structures 105d and 105e that may be rotated independent of each other about the rotation axis 120. FIG. 5D illustrates two rotatable structures (105d, 105e) but 3, 4, 5, or more rotatable structures can be utilized. As shown in FIG. 5D, the number of elongated elements 102d and 102e need not be the same on each rotatable structure, however, they may be the same in number, shape, and arrangement on the two rotatable structures. In some embodiments, the rotation rate or rotation direction of the rotatable structure 105d is the same as the rotation rate or rotation direction of the rotatable structure 105e. In another embodiment, the rotation rates or rotation directions are different for the different rotatable structures, e.g., the rotatable structures rotate in opposite directions. Furthermore, the number of light field sub-displays 101 disposed on each rotatable structure need not be the same or in the same arrangement.

Figure 5E:
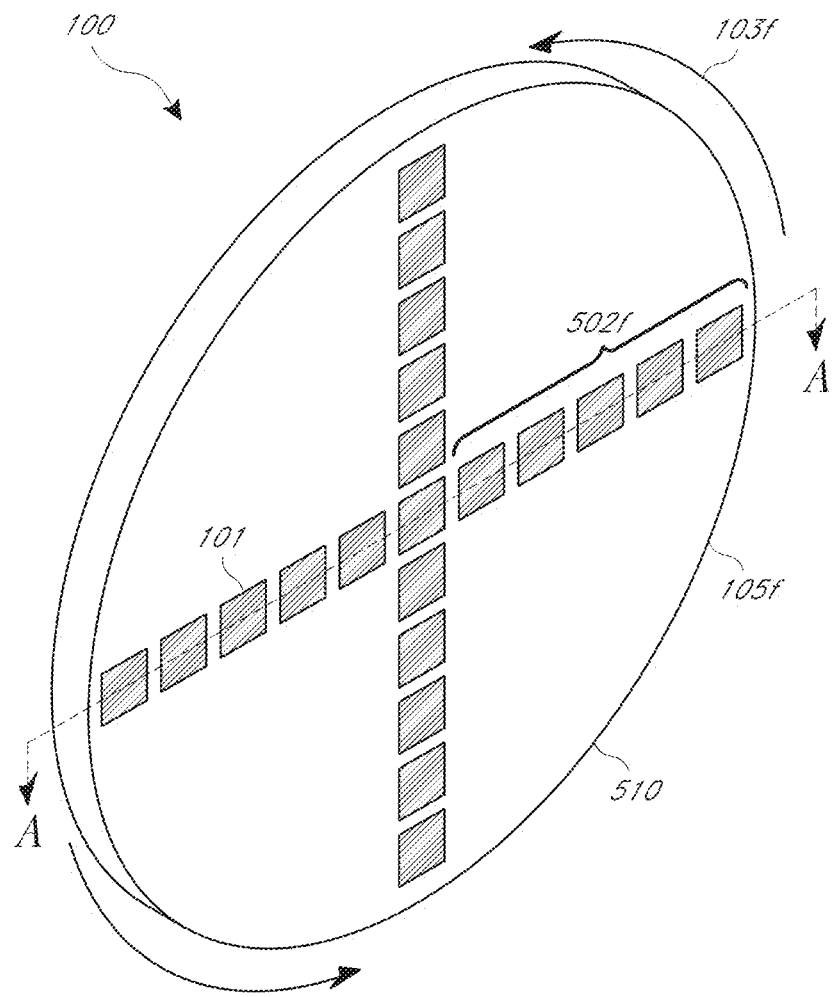
Figure 5F:
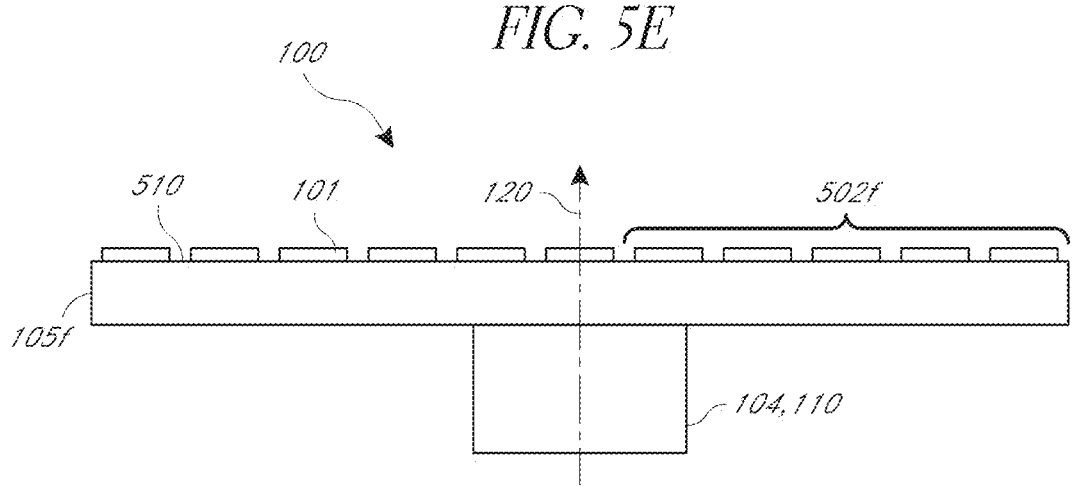

In some embodiments, additionally or alternatively to the use of a number of elongated elements, the rotatable structure 105 of the display apparatus 100 may comprise a transparent element that can be rotated by the motor 104. The transparent element can be a plexiglass disk or thin, 2-D polymer, thermoplastic, or acrylic element. For example, FIGS. 5E and 5F illustrate an example of such an arrangement. FIG. 5E is a perspective view of an example rotatable structure 105f comprising the transparent element 510. FIG. 5F is a cross sectional view of the display apparatus 100 taken along the line A-A shown in FIG. 5E. The light field sub-displays 101 can be attached to the transparent element 510 in any suitable arrangement and illuminated by the control system 110, as described above. As illustrated in FIGS. 5E and 5F, the light field sub-displays 101 may be disposed on a surface of the transparent element 510 along an elongated direction 502f so that the arrangement of the light field sub-displays 101 is analogous to the arrangement along the elongated elements 102 shown in FIGS. 1 and 5A-5C. While FIG. 5F illustrates the light field sub-displays 101 on an upper surface of the transparent element 510, the light field sub-displays 101 may be attached to a lower surface of the transparent element 510 or disposed within the transparent element 510. For example, the light field sub-displays 101 can be attached to a surface of a first transparent disk, and then a second transparent disk disposed over the first disk. Such embodiments advantageously can protect the sub-displays from being touched by observers or from environmental damage.

The material of the transparent element 510 may be selected to have no or minimal effect on the optical properties of the light transmission from each light field sub-display 101 (e.g., the material is substantially transparent in the visible). In other embodiments, the transparent element 510 may include color filtering, polarization modification, or other optical properties to be imparted onto light emitted from the light field sub-displays 101. One non-limiting advantage of the display apparatus of FIGS. 5E and 5F is that the light field sub-displays 101 are attached to or contained in a rotating disk which may minimize a risk of an external item (e.g., a hand from a person viewing the image) from being inserted between each arm of the propeller embodiments shown in FIGS. 1 and 5A-5C, thereby reducing potential for damaging the display apparatus 100 or harming the external item.

Figure 5G:
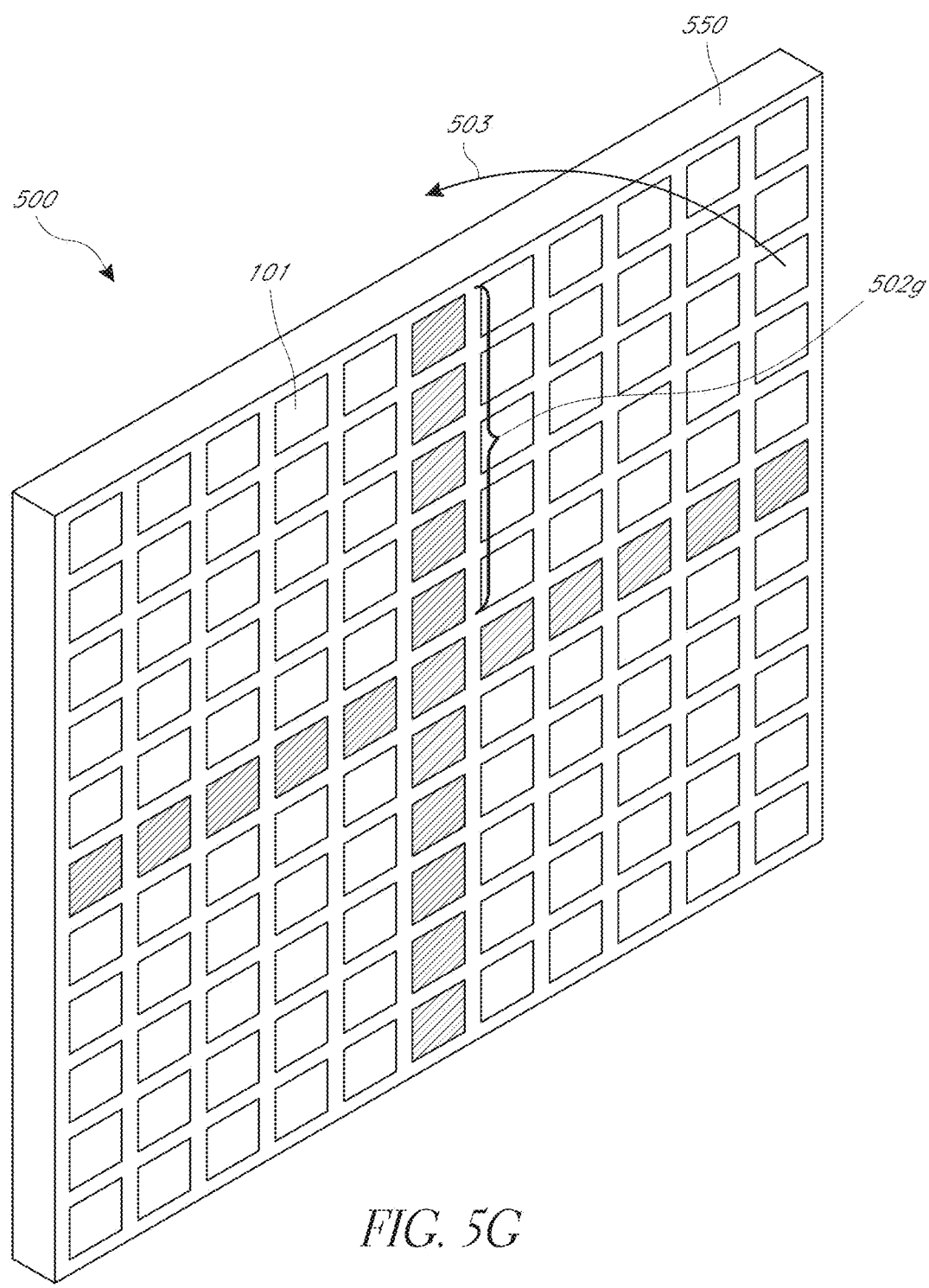

FIG. 5G illustrates an embodiment of display apparatus that is stationary. The display apparatus 500 comprises an array of light field sub-displays 101 disposed on a transparent substrate 550. FIG. 5G schematically illustrates an 11×11 array of light field sub-displays 101, however, any size n×m of a light field sub-display array may be implemented. A subset of the array of light field sub-displays 101 may form an elongated feature 502g by being illuminated by the control system 110 to generate any number or arrangement of elongated elements 502g. The subset array of light field sub-displays 101 that are illuminated may be changed at a rotation rate, such that the elongated feature 502g is electrically rotated about the display apparatus 500. In effect, by sequentially illuminating elongated features 502g of the light field sub-displays 101, the control system 110 can electronically mimic physical rotation of the arms of the propeller.

For each instance in time as the elongated feature 502g rotates, the subset array of light field sub-displays 101 that make up the elongated feature 502g changes. Accordingly, the elongated feature 502g appears to be rotating about a path 503g as result of strobing or turning the light field sub-displays 101 on and off. As the elongated feature 502g is "rotated," the light field sub-displays 101 of the subset array of light field sub-displays 101 are controlled by the controller 110 to display a 3-D representation of an image. One non-limiting advantage of the embodiment illustrated in FIG. 5G is that there are no mechanically rotating parts of the display apparatus 500, the rotation is imparted onto the light field sub-displays 101 through processing by the controller. As such, there is no rotatable structure that may cause damage or injury to surrounding areas. In the embodiment shown in FIG. 5G, no motor is used since the display apparatus 500 is stationary. However, in other embodiments, a motor can be used to rotate the substrate 550, so that the combination of physical rotation of the substrate 500 and electronic "rotation" of the light field sub-displays 101 that are illuminated provides the light field image.

Example Non-Planar Light Field Display Apparatus

FIGS. 6A and 6B are perspective views of an example of display apparatus 100 and multiple observers 620a, 620b viewing an example image 610 (of a dog) displayed by the display apparatus 100 at different viewing directions. The display apparatus 100 illustrated in FIGS. 6A and 6B may be substantially similar to the display apparatus 100 of FIGS. 1 and 5A-5G.

FIG. 6A illustrates an observer 620a positioned approximately in front of the display apparatus 100, e.g., at a small angle relative to the direction of the rotation axis 120. The field of view of the display apparatus 100 for observer 620a is illustrated as dotted lines 615a. For observer 620a, the field of view 615a is wide enough to fully view the image displayed by display apparatus 100.

In contrast, FIG. 6B illustrates an observer 620b positioned such that the observer 620b is viewing the image 610 projected by display apparatus 100 at an angle off from the rotation axis 120. As the observer 620b views the image 610 at increasingly greater angles from the rotation axis 120, the field of view 615b may become increasingly narrow. The narrow field of view 615b may result in a distorted image, a flattened image, or even an unviewable image. Is some embodiments, this may be due to the light field sub-displays 101 being viewed from increasingly large oblique angles, and the light field sub-displays 101 are unable to direct light at increasing greater angles from the rotation axis 120. Due to the 3-D light field nature of the light projected from the display apparatus 100, the observers who are off-axis (e.g., the observer 620b) will perceive a different perspective of the image 610 being projected from the display.

Figure 7:
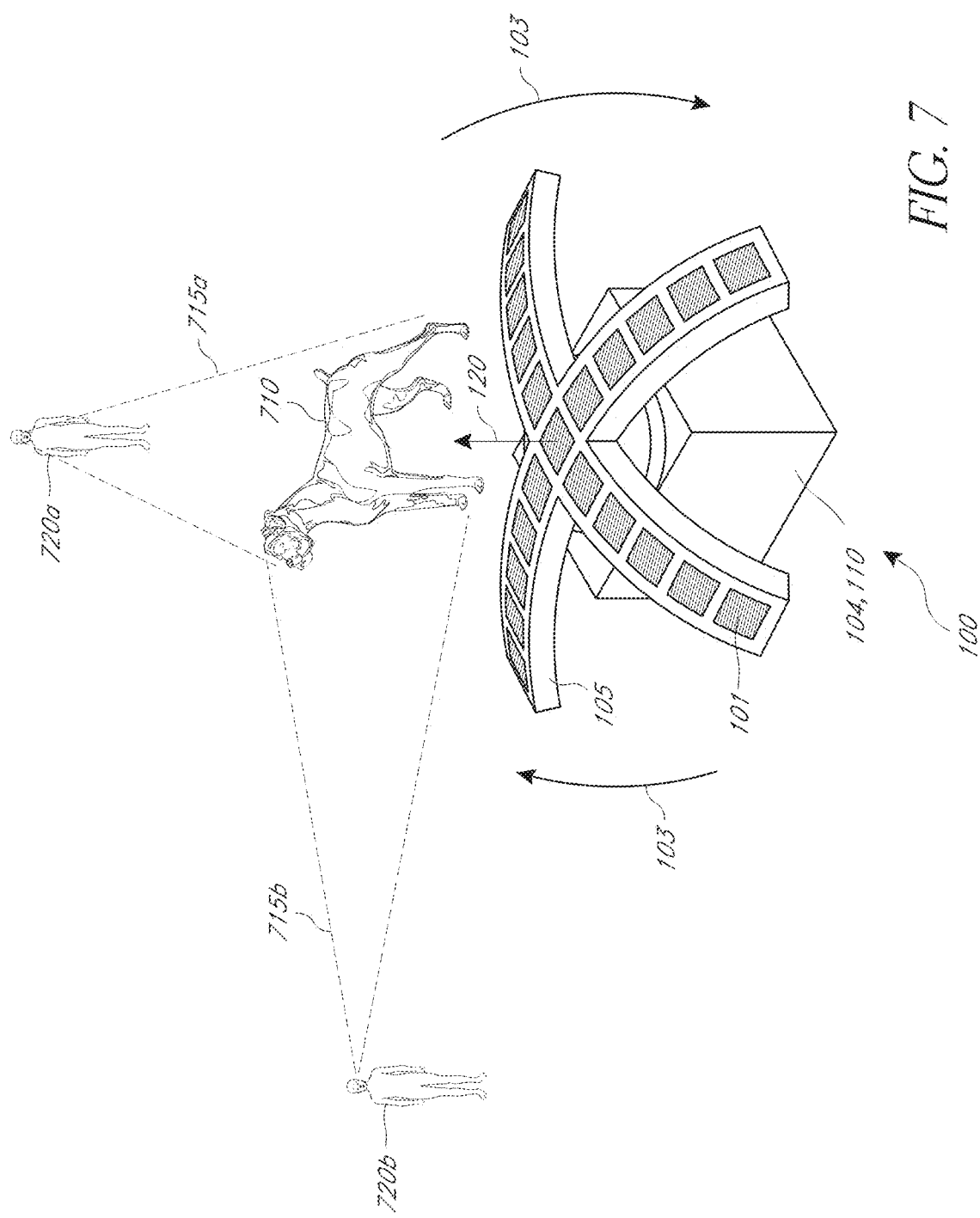
FIG. 7 is a perspective view that schematically illustrates another example display apparatus that is displaying a 3-D representation of an image viewed by multiple observers.

Accordingly, FIG. 7 illustrates an embodiment of the display apparatus 100 configured to display a 3-D representation of an object at greater angles from the rotation axis 120. FIG. 7 illustrates a perspective view of an example of the display apparatus 100 in which the rotatable structure 105 is curved so as to be convex to observers 720a, 720b.

In the embodiment illustrated in FIG. 7, the elongated elements 102 of the rotatable structure 105 are curved out of the plane that is perpendicular to the rotation axis 120 to achieve the convexity. An advantage of a display apparatus 100 having a convex rotatable structure 105 is that an observer (e.g., the observer 720b) that is not directly in front of the display apparatus (e.g., like the observer 720a) can see a substantial field of view 715b of the display apparatus 100 (e.g., an increased field of view as compared to the flat rotatable structure of FIGS. 6A and 6B).

The curvature of the elongated elements 102 can be selected to provide a desired field of view for the display apparatus 100. The curvature need not be constant along an elongated element 102 or the same for each elongated element 102. For example, each elongated element may have a different radius of curvature, or a single elongated element 102 may have a radius of curvature that depends on distance from the rotation axis or distance along the elongated element 102.

Further, while FIG. 7 illustrates a display apparatus 100 having a rotatable structure 105 similar to the rotatable structure 105 of FIG. 1, in other embodiments, the display apparatus 100 can include any rotatable structure described herein.

Example Routine for Displaying a 3-D Representation of an Object

Figure 8:
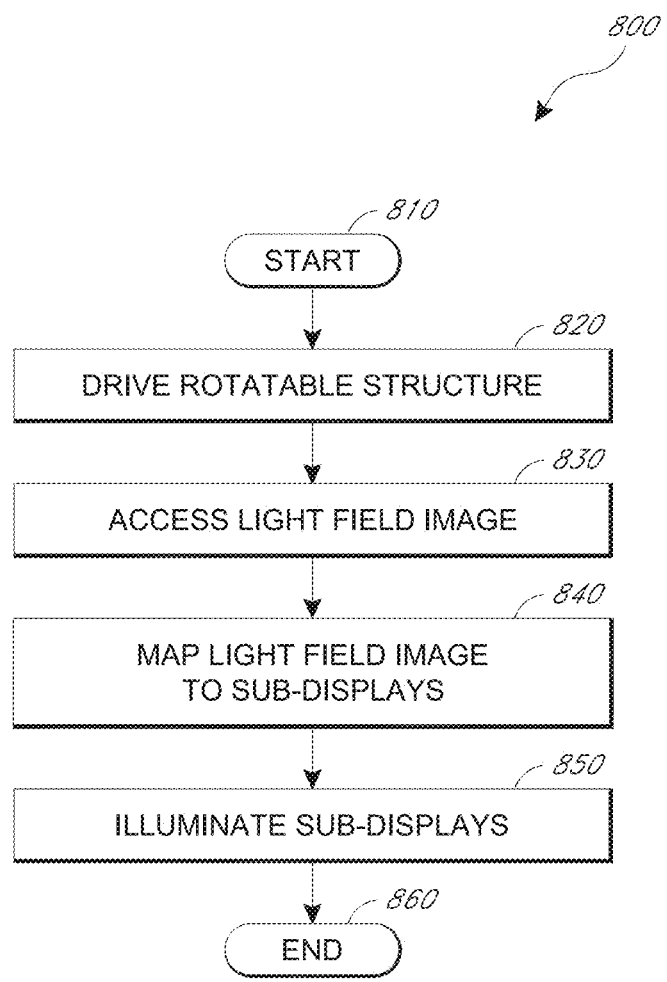
FIG. 8 is a process flow diagram of an example of a method of displaying a 3-D representation of an object using a display apparatus.

FIG. 8 is a flow diagram of an illustrative routine for displaying a 3-D representation of an object using the display apparatus described herein. The routine 800 is an example flow for processing light field image data and illuminating light field sub-displays to display a 3-D representation of an object or image. The routine 800 may be performed by the control system 110 of embodiments of the display apparatus 100.

The routine 800 starts at the block 810 and then moves to the block 820, where the control system drives the rotatable structure by the motor 104 such that the rotatable structure 105 is rotated about rotation axis 120 along the path 103 at a rotation rate. As a result of the motor 104 driving the rotatable structure 105, the light field sub-displays 101 of the rotatable structure 105 are associated with a position based on a rotation angle as a function of time. For a constant rotation rate, the rotation angle is the rotation rate multiplied by time plus an initial rotation angle (at time=0). In some embodiments the rotation rate may be based, in part, on the arrangement of the rotatable structure 105 (e.g., the number of or spatial arrangement of the elongated elements, or the sub-displays disposed on the rotatable structure). The rotation rate may also be based, in part, on the object to be displayed and the number of rendered frames of the object to be represented by the display apparatus 100. As described above, the rotation rate can be sufficiently fast that the human visual system does not perceive the elongated elements.

The routine 800 continues to the block 830, where the light field image is accessed, for example, from the memory 114 or another separate or remote storage unit. In some implementations, the image is a light field representation of an object to be displayed. The light field image may be made of multiple rendered frames. Each rendered frame may be a representation of the object to be displayed at different viewing directions. In this way, the multiple rendered frames are each associated with a viewing direction of the object. In other implementations, the images of the object may be sequenced so that the object appears to be moving in space. In this case, the accessed light field image may include multiple light field images, where each light field image is a single frame of a video.

The routine 800 continues to the block 840, wherein the light field image is mapped to the light field sub-displays. For example, the control system 110 of FIG. 1 may execute instructions to generate an association or mapping of the accessed light field image to each of the light field sub-displays 101 based, in part, on the rotation angle of the display apparatus. In some embodiments, each rendered frame of the light field image may be mapped to the pixels (e.g., a micro-lens of FIGS. 2A and 2B) of the light field sub-displays 101. The mapping may be based in part on the rotation rate or rotation angle of the rotatable structure as a function of time. The mapping of the light field image may also include determining a color and intensity of light to be emitted at the viewing direction associated with the rendered frame to be displayed by the mapped pixel (e.g., micro-lens of FIGS. 2A and 2B) of the light field sub-display. In one embodiment, the mapping of the light field image to the light field sub-displays may be performed according to a routine detailed below in connection with FIG. 9.

The routine 800 continues to the block 850, where the light field sub-displays are illuminated. For example, the light field sub-displays may be illuminated based, at least in part, on the mapped light field image. The control system 110 of FIG. 1 may execute instructions to cause the light field sub-displays 101 to be illuminate based, in part, on the mapped light field image and the rotation angle as a function of time of the rotatable structure 105. In one implementation, the light field sub-displays 101 may be modulated (e.g., turned on and off) as a function of time and based in part on the rendered frame. For example, as the position of a light field sub-display 101 is moved due to the rotation of the rotatable structure 105, the rendered frame to be represented may be changed and the light field sub-display 101 may be switched between the multiple rendered frames (e.g., strobed). In one embodiment, the illumination of the light field sub-displays 101 may be performed according to a routine detailed below in connection with FIG. 10. Thereafter, at the block 860, the routine 800 ends.

In various embodiments, the routine 800 may be performed by a hardware processor (e.g., the hardware processor 112 of control system 110 of FIG. 1) of a display apparatus 100 of FIG. 1. In other embodiments, a remote computing device (in network communication with the display apparatus) with computer-executable instructions can cause the display apparatus to perform aspects of the routine 800.

Example Routine for Mapping Light Field Image to Light Field Sub-Displays

Figure 9:
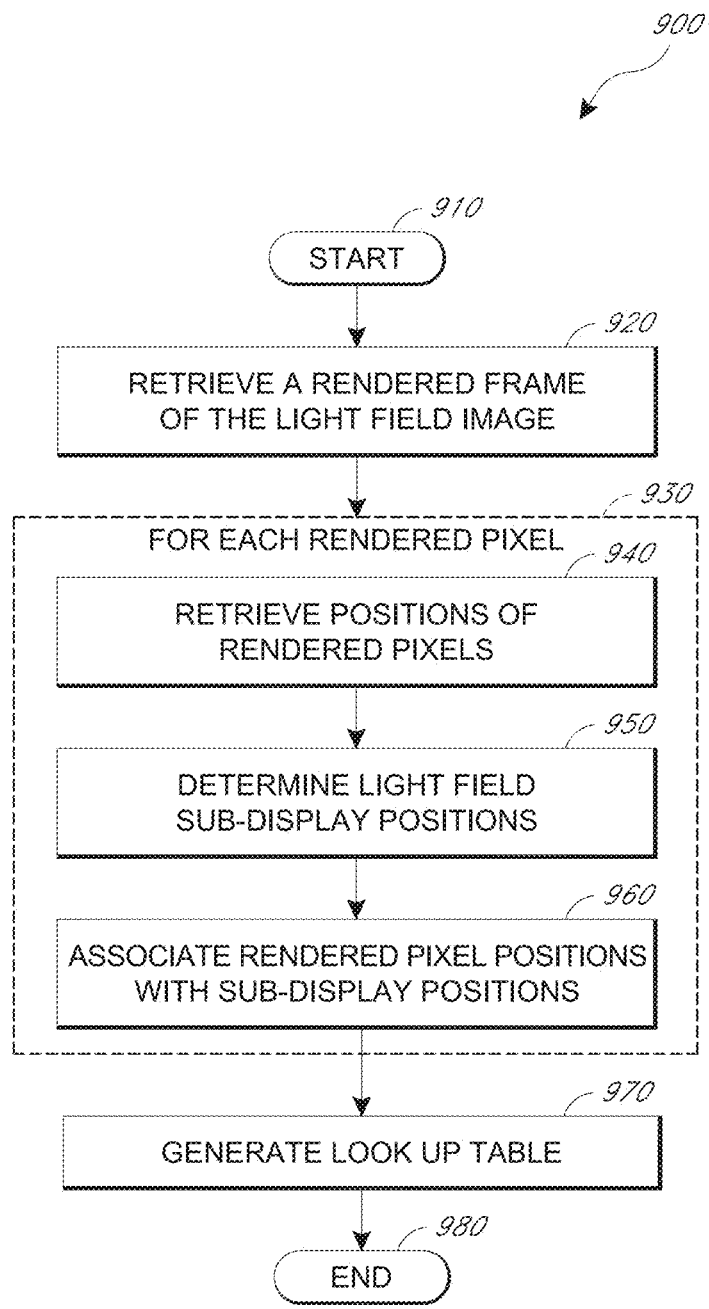
FIG. 9 is a process flow diagram of an example of a method of mapping light field image information to light field sub-displays of a display apparatus.

FIG. 9 is a flow diagram of an illustrative routine for mapping a light field image to light field sub-displays. Routine 900 may be one example of one method that hardware processor 112 of control system 110 of FIG. 1 or a remote computing device may map the light field image to each of the light field sub-displays 101 based, at least in part, on the rotation angle of rotatable structure 105.

The routine 900 starts at the block 910 and then moves to the block 920, where one or more rendered frames of the light field image are retrieved. For example, at the block 920 of routine 900 the light field image is accessed from the digital memory 114 of control system 110, where the light field image may include multiple rendered frames. Each rendered frame may be indicative of a different view of the plurality of different views of the object. Furthermore, the rendered frames may comprise multiple rendered pixels that may be combined to represent the image of the object to be displayed. The routine continues to subroutine 930 for each rendered pixel of a rendered frame.

For each rendered pixel, the subroutine 930 proceeds to the block 940, where the position of a given rendered pixel is retrieved. Each rendered pixel may have a position within the rendered frame. For example, the rendered frame may be a 2-D representation of the object for a given viewing direction, and each rendered pixel may have a coordinate (e.g., X and Y coordinates) position within that rendered frame. In some embodiments, each rendered frame of the light field image may include the same number of rendered pixels, such that the positions of rendered pixels are constant from rendered frame to rendered frame.

At the block 950, light field sub-display positions are determined as a function of time based at least partly on the rotation rate (as a function of time) of the rotatable structure.

At the block 960, each rendered pixel position of a given rendered pixel is associated with a light field sub-display position. In some embodiments, as described above, the position of a rendered pixel (u) may be associated with a light field sub-display position on the rotatable structure 105 of (z) as a function of time (t), where the position of each light field sub-display 101 is based on the rotation angle as a function of time. In some embodiments where the number and position of the rendered pixels is unchanged between rendered frames, the association may be constant for any rendered frame of the light field image. At block 970, the routine 900 can generate (and store) a data structure (e.g., a look up table (LUT)) that associates rendered pixels with light field sub-display positions. Multiple display apparatuses may be able to access the same lookup table so as to synchronize the image displayed by the multiple display apparatus located apart or physically separate from each other. At the block 980, the routine ends.

Example Routine for Illuminating the Light Field Sub-Displays

Figure 10:
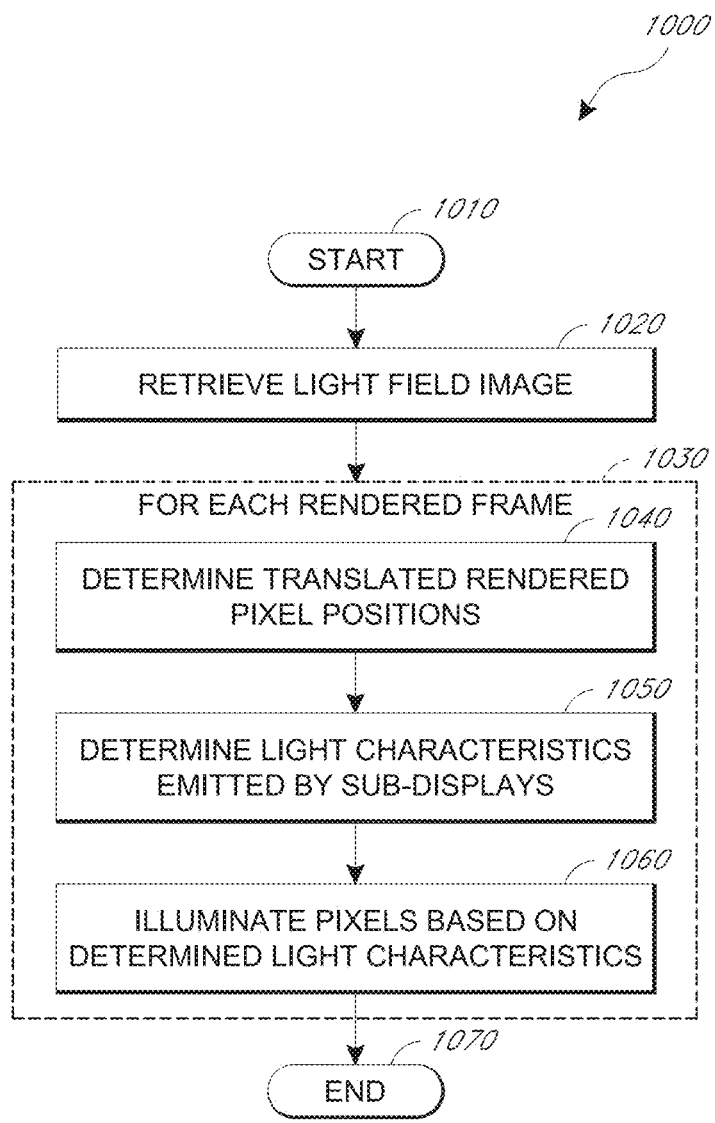
FIG. 10 is a process flow diagram of an example of a method of illuminating light field sub-displays of a display apparatus.

FIG. 10 is a flow diagram of an illustrative routine for illuminating the light field sub-displays of a display apparatus (e.g., the display apparatus 100 of FIG. 1). Routine 1000 may be one example of a method that hardware processor 112 of control system 110 of FIG. 1 or a remote computing device that can be used to illuminate the light field sub-displays 101 based at least in part on the mapped light field data.

The routine 1000 starts at the block 1010 and then moves to the block 1020, where the light field image is retrieved. As described above, the light field image may include multiple rendered frames representing different viewing directions. The multiple rendered frames may include a color and intensity (e.g., image parameters), among other optical properties for rendering an image, associated with each rendered pixel of the rendered frame so as to portray the object at a viewing direction associated with the rendered frame. The routine 1000 continues to subroutine 1030 for each rendered frame.

For each rendered frame, the subroutine 1030 proceeds to the block 1040, where translated rendered pixel positions are determined. The translated rendered pixel positions may relate to the positions of the rendered pixels translated to a position of the associated light field sub-display, for example, as determined in routine 900 of FIG. 9. In some embodiments, the determination of translated rendered pixel positions may be performed by accessing a data structure (e.g., data structure generated in the block 960 of FIG. 9).

At the block 1050, a color and intensity of light to be emitted by the light field sub-display is determined based, at least in part, on the rendered frame to be displayed. In one implementation, the color and intensity may be defined by the rendered pixel to be displayed by a light field sub-display 101. For example, with reference to FIGS. 2A and 2B, each rendered frame is associated with a viewing direction. Each pixel (e.g., pixel 205) in a pixel array 225 of a light field sub-display 101 may be associated with a direction of emitting light based on the association with a micro-lens 215a, which may be mapped to a given rendered pixel. Thus, each pixel 205 of the pixel array 225 may be associated with a given viewing direction at any instance in time. Based on this association, it is possible to determine which rendered pixel of the rendered frame will be associated with a given pixel 205 of the pixel array 225. From this association, the subroutine 1030 may retrieve a color and intensity of the rendered pixel to determine the color and intensity of light that a given pixel of the light field sub-display 101 will emit based on the viewing direction of the rendered frame.

The subroutine 1030 continues to the block 1060, where each light field sub-display is illuminated based on the determined color and intensity, as well as on the rotation angle of the rotatable structure. For example, as the light field sub-display 101 is rotated through a rotation path 103, the rendered frame to be displayed by the light field sub-display 101 may change based on the change in position. Accordingly, the pixels 205 of a light field sub-display 1010 may be illuminated or strobed (e.g., alternated or switched between different rendered frames of the light field image) based on the rendered frame to be displayed by a light field sub-display 101 as the light field sub-display 101 is rotated. Thereafter, at the block 1080, the routine 1000 ends.

Example Planar Light Field Display Apparatus

Figure 11:
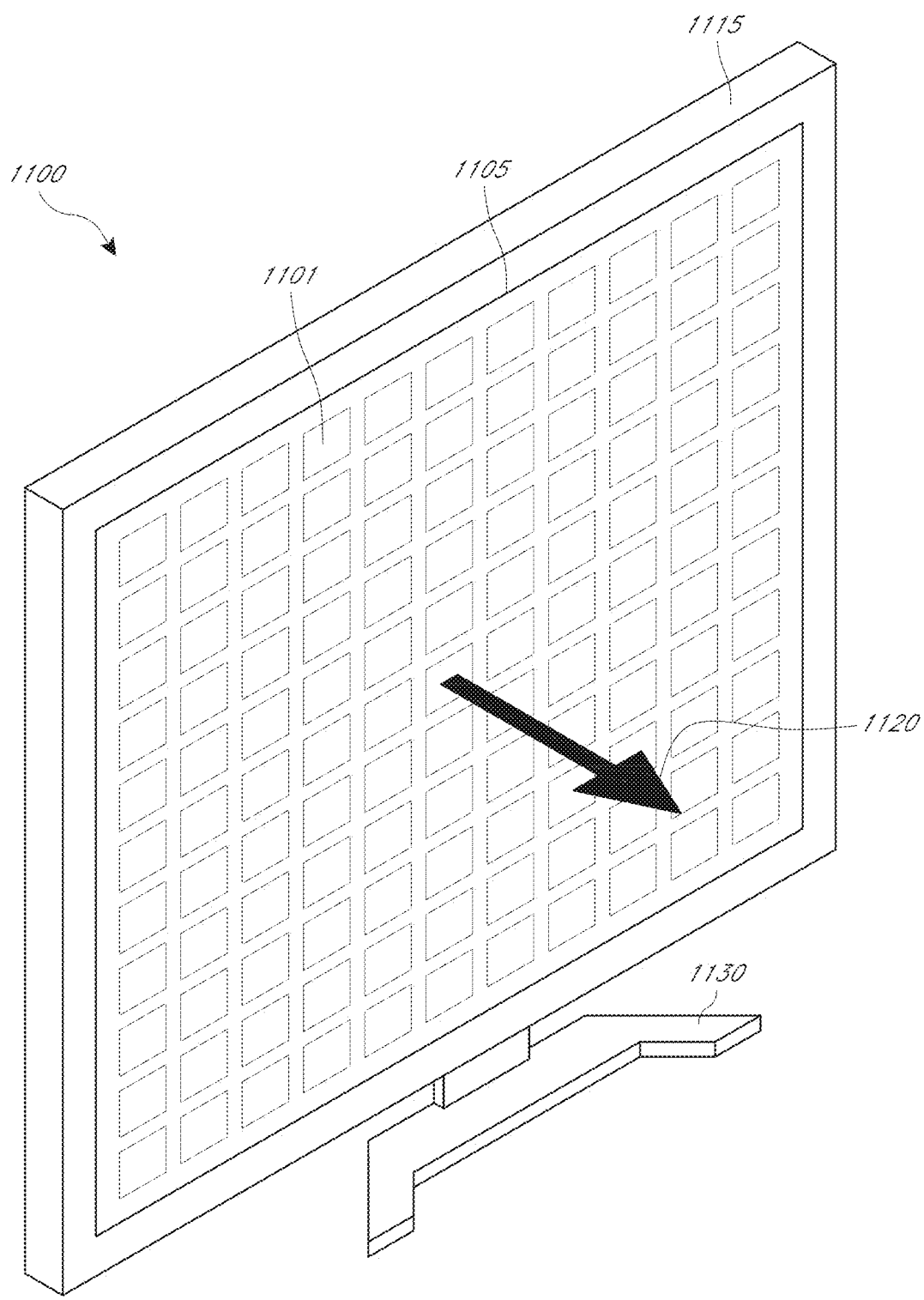
FIG. 11 is a perspective view that schematically illustrates an example display apparatus.

FIG. 11 illustrates an example of a display apparatus 1100 (e.g., a flat screen or planar television, in this example) configured to display an image observable as a 3-D representation of an object. The display apparatus 1100 includes a display panel 1105 and a control system 1110. In the embodiment illustrated in FIG. 11, the display apparatus 1100 may also include a bezel 1115 and a stand 1130 (or other manner of securing the display apparatus to either a vertical or horizontal surface). The display panel 1105 may include an array of light field sub-displays 1101 disposed on a viewing surface of the display panel and configured to be viewed at a fiducial viewing direction 1120. The fiducial viewing direction 1120 can be perpendicular to the plane of the display panel 1105. The fiducial viewing direction 1120 thus points in the direction of a viewer who is positioned directly in front of the display. The light field sub-displays 1101 may be controlled by the control system 1110 to generate and display the 3-D representation of the object. One possible manner in which displaying a 3-D representation of an object can be accomplished is that the multiple light field sub-displays 1101 may anisotropically direct light into an array of light beams that propagate at different outgoing angles to generate a light field image. For example, light field sub-displays 1101 may be substantially similar to light field sub-displays 101 described in connection with FIGS. 2A-3C. However, other configurations are possible.

Figure 12A:
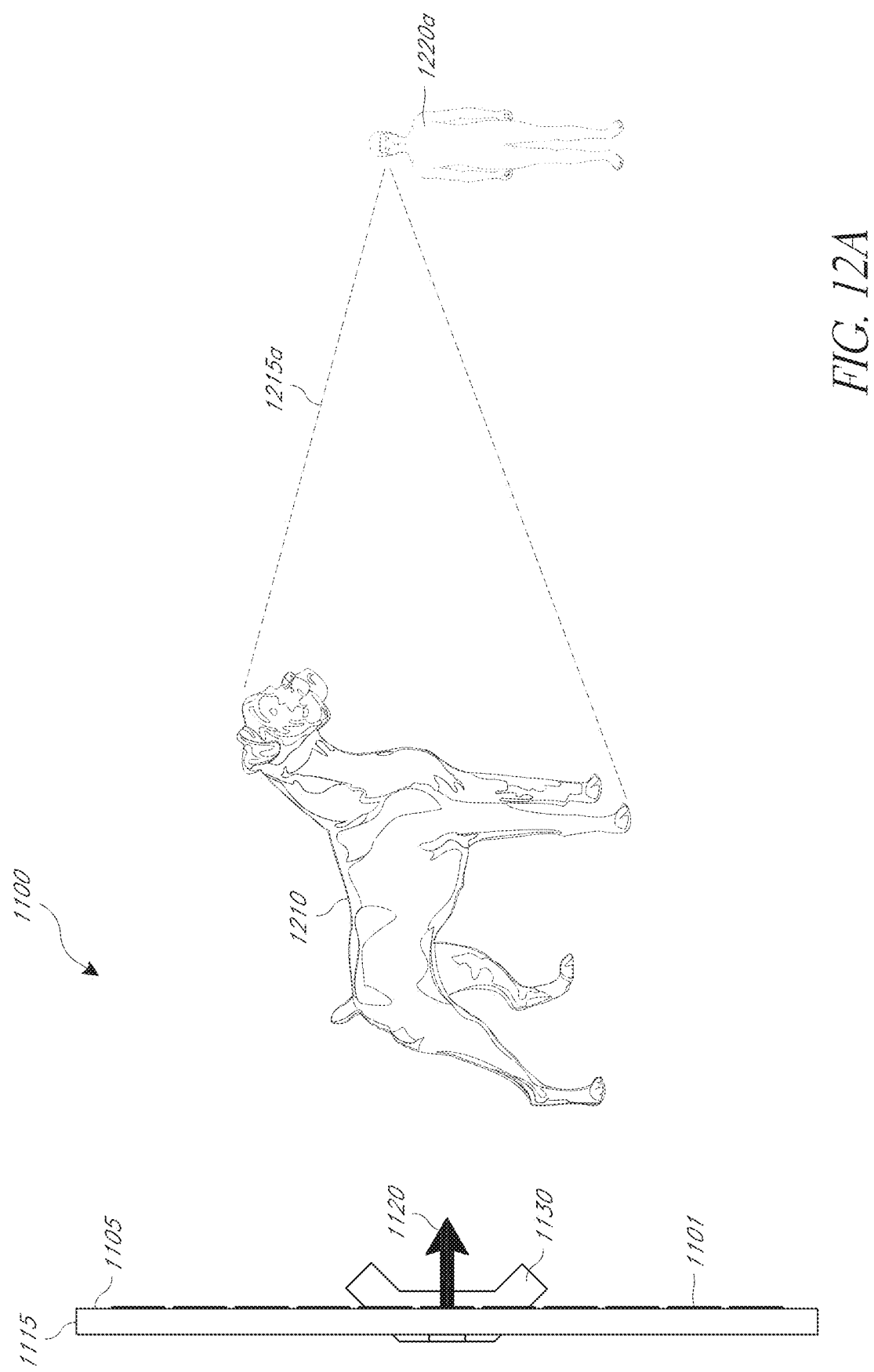
FIGS. 12A and 12B are top views that schematically illustrate the example display apparatus of FIG. 11 that is displaying a 3-D representation of an image (a dog, in this example) viewed by multiple observers.
Figure 12B:
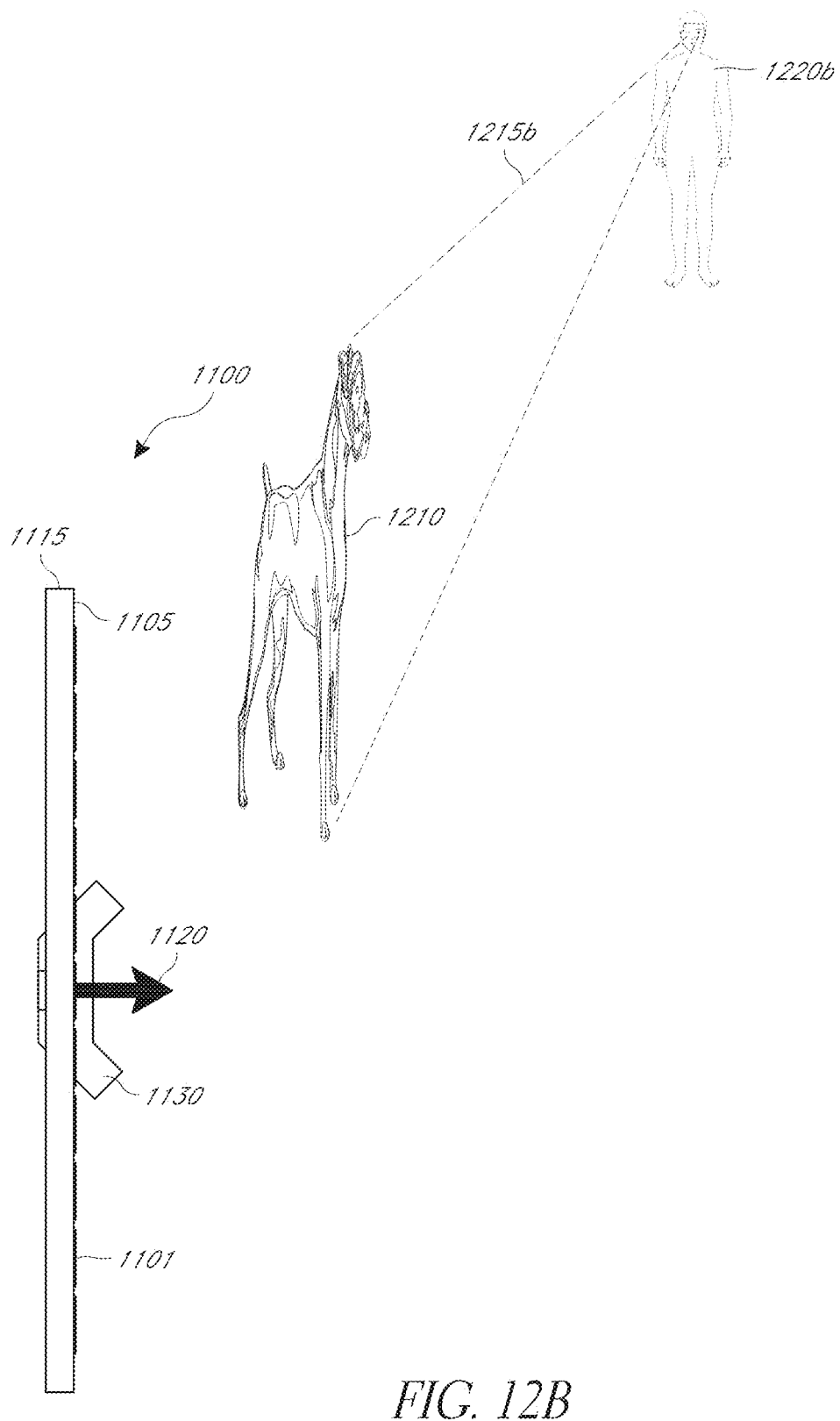

FIGS. 12A and 12B are top down views of an example of display apparatus 1100 and multiple observers 1220a, 1220b viewing an example image 1210 (of a dog, in this example) displayed by the display apparatus 1100 at different viewing directions. The display apparatus 1100 illustrated in FIGS. 12A and 12B may be substantially similar to the display apparatus 1100 of FIG. 11.

FIG. 12A illustrates an observer 1220a positioned approximately in front of the display apparatus 1100, e.g., at a small angle relative to the fiducial viewing direction 1120. The field of view of the display apparatus 1100 for observer 1220a is illustrated as dotted lines 1215a. For observer 1220a, the field of view 1215a is wide enough to fully view the image displayed by display apparatus 1100.

In contrast, FIG. 12B illustrates an observer 1220b positioned such that the observer 1220b is viewing the image 1210 projected by display apparatus 1100 at an angle off from the fiducial viewing direction 1120. As the observer 1220b views the image 1210 at increasingly greater angles from the fiducial viewing direction 1120, the field of view 1215b may become increasingly narrow. The narrow field of view 1215b may result in a distorted image, a flattened image, or even an unviewable image. Is some embodiments, this may be due to the light field sub-displays 1101 being viewed from increasingly large oblique angles, and the light field sub-displays 1101 are unable to direct light at increasing greater angles from the fiducial viewing direction 1120. Due to the 3-D light field nature of the light projected from the display apparatus 1100, the observers who are off-axis (e.g., the observer 1220b) will perceive a different perspective of the image 1210 being projected from the display.

Example Non-Planar Light Field Display Apparatus

Figure 13A:
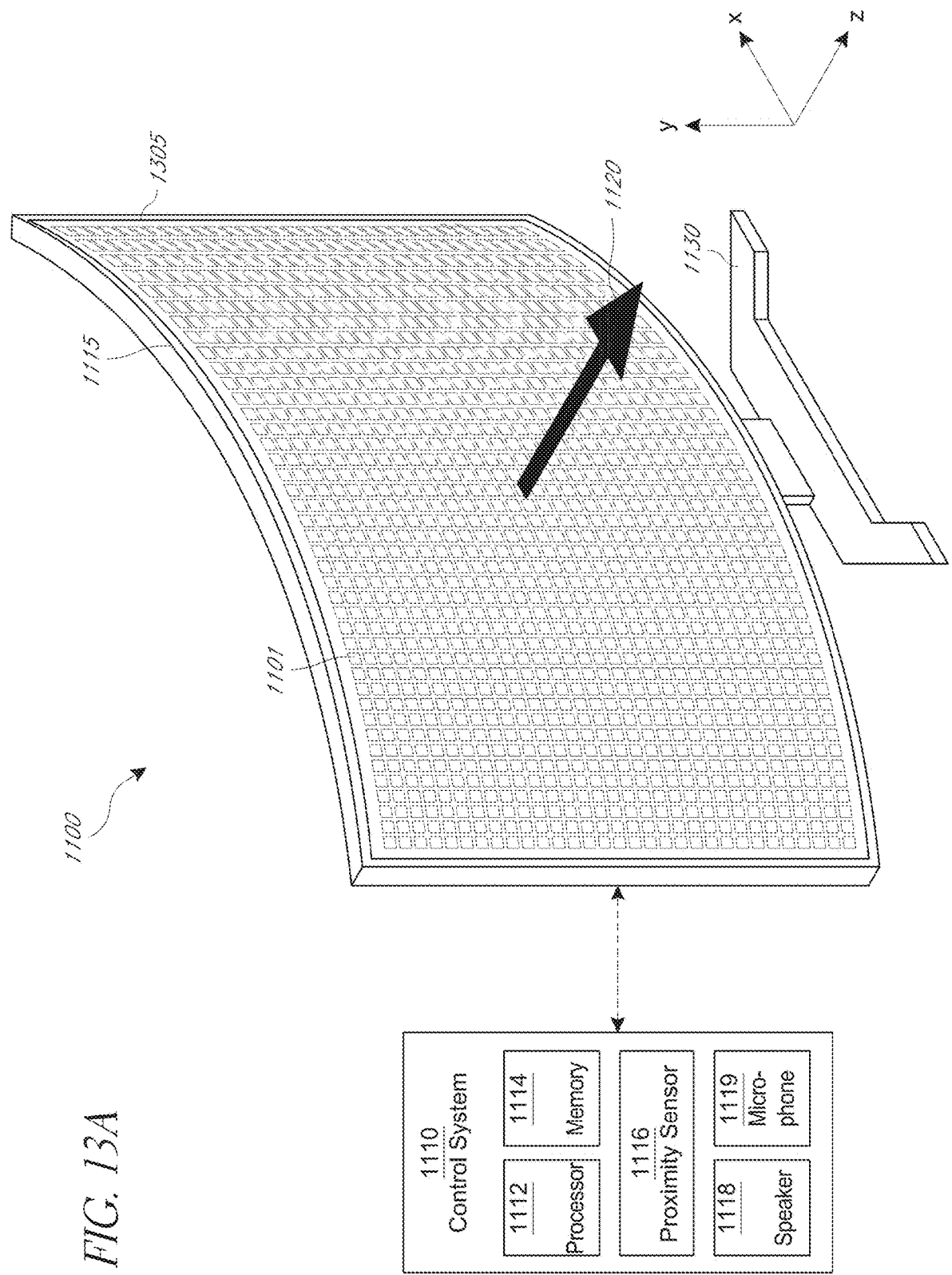
FIG. 13A is a perspective view that schematically illustrates another example display apparatus.

FIG. 13A illustrates an example of a display apparatus 1100 configured to display an image observable as a 3-D representation of an object. The display apparatus 1100 includes a display panel 1305 and a control system 1110. The control system 1110 may be operatively coupled to the display apparatus 1100 which may be mounted in a variety of configurations, such as fixedly attached to the display apparatus 1100 or located elsewhere in relation to the display apparatus 1100 (e.g., in a separate part of a room or central control room). The display panel 1305 be configured to be viewed from a viewing direction and may include an array of light field sub-displays 1101 disposed on a viewing surface. FIG. 13A depicts an example of the display apparatus 1100 having a curved display panel 1305 configured to display the 3-D representation of an object at greater angles from the fiducial viewing direction 1120 (e.g., greater angles from the viewing direction as compared to the planar display 1100 of FIG. 11). As described with reference to FIG. 11, the fiducial viewing direction can be perpendicular to a plane that is tangent to the center of the display (see, e.g., FIG. 13A). The fiducial view direction 1120 generally points in the direction of a viewer positioned directly in front of the display apparatus 1100. In some embodiments, the control system 1110 may be configured to control the actuation of each light field sub-display 1101 (e.g., the timing, intensity, and color of illumination of each light field sub-display 1101) based on a desired image to be projected by display apparatus 1100.

In the embodiment illustrated in FIG. 13A, the display apparatus 1100 is depicted as a television, which may be operated in a manner similar to an liquid crystal display (LCD) television, light emitting diode (LED) television, or other flat screen televisions. Such configurations may include a bezel 1115 and a stand 1130. Stand 1130 may be configured to support display apparatus 1100 on a horizontal surface (e.g., a table or shelf). In another embodiment, stand 1130 may be configured as a hanging device configured to attach the display apparatus to a vertical surface (e.g., a wall) or hang the display apparatus 1100 from an attachment above the display apparatus 1100. The bezel 1115 may comprise the control system 1110 and other electronic and driving circuitry for operating the display apparatus 100.

As illustrated in FIG. 13A, the display panel 1305 has a curve applied thereto. For example, the display panel 1305 may be configured to be viewed from the fiducial viewing direction 1120 and curved out of a plane that is perpendicular to the fiducial viewing direction 1120. The radius of curvature may be any desired curvature configured to provide the greater angle from the viewing direction as compared to the planar display 1100 of FIG. 11, as described below in connection with FIG. 13B. FIG. 13A illustrates an example of the display apparatus 1100 in which the display panel 1305 is curved out of the plane that is perpendicular to the fiducial viewing direction 1120 so as to be convex relative to the fiducial viewing direction 1120. For example, FIG. 13A depicts imaginary axes shown as X, Y, and Z axes. These axes are for illustrative purposes only. In the embodiment of FIG. 13A, the Z axis may be parallel to the fiducial viewing direction 1120. The X and Y axes may form a plane that is perpendicular to the X axis and, e.g., the fiducial viewing direction 120. The X and Y axes may also be perpendicular to each other, where the X axis is horizontal and the Y axis is vertical. As shown in FIG. 13A, the display panel 1305 may be curved out of the plane that is perpendicular to the viewing direction and convexly curved about the vertical (e.g., Y) axis. The display panel 1305 may have a shape that is cylindrical, for example, the display panel 1305 may be similar to a portion of a cylinder that has been stood up on one end. FIG. 13A illustrates one example of display panel 1305, however, other configurations are possible, for example, as shown in FIGS. 14A-14E.

With continued reference to FIG. 13A, the display panel 1305 may include an array of light field sub-displays 101 disposed thereon. Although, FIG. 13A shows 121 light field sub-displays 1101 disposed on the display panel, other embodiments are possible. For example, the number of light field sub-displays 1101 on the display panel 1305 can be as few as 1, 2, 3, 4, 5, 6, or more or as many as needed to provide the desired image resolution, as described below. In some embodiment, the display panel 1305 may comprise a single light-field sub-display 1101 disposed thereon. The light field sub-displays 1101 may be any display configured to produce a light field. In some embodiments, the light field sub-displays 1101 may comprise one or more pixels configured to emit anisotropic light (e.g., directionally emitted). For example, as described in more detail in connection with FIGS. 2A-3C, the light field sub-displays 1101 may comprise a micro-lens array disposed adjacent to a pixel array that emits light isotropically toward the micro-lens array. The micro-lens array redirects the light from the pixel array into an array of beams that propagate at different outgoing angles to generate a light field image. In some embodiments, each micro-lens of the micro-lens array may be configured as a pixel of the light field sub-display 1101. In another embodiment, the light field sub-displays 1101 may include a waveguide stack assembly that produces a light field, as described below in connection with FIGS. 4A and 4B.

In some implementations, the light field sub-displays 1101 may be controlled by the control system 1110 to generate and display the 3-D representation of the object. For example, the control system 1110 may be configured to drive the illumination of the light field sub-displays 1101 to display an image that is observable by a bystander as a 3-D representation of the object to be displayed. In some embodiments, the multiple light field sub-displays 1101 may each comprise one or more pixels, as described below, which can be illuminated according to light field image data stored in the digital memory 1112 (e.g., non-transitory data storage) of the controller 1110 to display the 3-D representation of the object. The illumination of each light field sub-display 1101 may project a representation of an image that can be viewed by observers. The image can include objects, graphics, text, and so forth. The image may be part of a series of image frames that project an object or thing that appears to be moving or changing, as in a video. The representation may appear to be 3-D and might be mistaken by observers to be a natural object rather than a projection. Because the light is emitted directionally from the light field sub-displays 1101, the image may appear to hover in mid-air and thereby attract attention from passers-by. Accordingly, the display apparatus 1100 can advantageously be used in advertising, marketing, or sales, for presentations, or to otherwise generate interest or convey information to viewers. The display apparatus 1100 may be placed in a store front or viewable area where a person, located at a viewable distance from the display apparatus 1100, is able to view the image displayed by the display apparatus 1100 by looking toward the display panel 1305.

The local data processing module of the computerized control system 1110 may comprise a hardware processor 1112 and a digital memory 1114. In some embodiments, the digital memory 1114 may be non-volatile memory (e.g., flash memory) or any non-transitory computer readable media. The digital memory 1114 may be configured to store data defining instructions for the hardware processor 1112. These instructions may configure the hardware processor 1112 to perform functions of the display apparatus 1100. For example, the hardware processor 1112 and the digital memory 1114 may both be utilized to assist in the processing, caching, and storage of light field data. The data may include data related to a) a light field image of the object to be displayed, b) the light field sub-display positions on the display panel 1305, or c) a mapping of the light field image to the light field sub-display positions.

In some embodiments, the light field image comprises multiple rendered frames of the object, where each rendered frame is a 2-D representation of the object at a viewing direction (e.g., a direction that an observer may be relative to the display apparatus 1100). Each rendered frame may comprise multiple pixels, referred to hereinafter as rendered pixels, that may be combined to render the image of the object to be displayed. Each rendered pixel may be associated with a position on a rendered frame (e.g., a rendered pixel position). The multiple rendered frames and the rendered pixel positions may be stored in the digital memory 1114 for access and use by the control system 1110. The light field image may include imaging parameters (e.g., color and intensity of light to display the rendered frame), where the imaging parameters are associated with the viewing direction of the rendered frame.

In some embodiments, the light field sub-display positions may be positions of the light field sub-display 1101 on the display panel 1305. In some embodiments, the light field sub-displays 1101 may be arranged in an array or grid like pattern, as illustrated in FIG. 13A. Other configurations are possible. For example, the light field sub-displays 1101 may be arranged in a spiral arrangement extending radially from a central point on the display panel 1305. Or, the light field sub-displays 1101 may be arranged in numerous linear arrangements extending outward from a central point similar to spokes of a bicycle wheel. The light field sub-display positions may also include the positions of the components of each light field sub-display 1101 (e.g., micro-lenses described below) as a function of time.

In some embodiments, the hardware processor 1112 may be operatively coupled to the digital memory 1114 and configured to analyze and process the data in the digital memory 1114. The hardware processor 1112 may also be operably coupled to each light field sub-display 101 and configured to drive the pixels of each light field sub-display 1101 based on the light field image stored in the digital memory 1114. For example, the hardware processor 1112 may drive each light field sub-display 1101 (e.g., the pixels of the light field sub-display 1101) to emit light associated with a rendered pixel position and image parameters stored in the digital memory 1112. In some embodiments, image parameters may be configured as characteristics of the rendered pixel that, when combined with the other rendered pixels of a rendered frame, render an image. As a non-limiting example, image parameters may be configured as a color, intensity, shape, brightness, or any other optical property for rendering an image. The directional aspects of the rendered frame may cause the observer to perceive the illumination from the light field sub-displays 1101 as displaying a 3-D representation of the object.

One possible manner in which displaying a 3-D representation of an object can be accomplished is that a multiplicity of points of view may be rendered in advance by the control system 1110 or another rendering engine. For any given arrangement of light field sub-displays 1101 on the display panel 1305, a mapping may be generated or retrieved that maps a position (z) of the pixel of the light field sub-display 1101 to a rendered pixel (u) of a rendered frame (k) to be displayed. This mapping may be accomplished by the processor 112, which may include a microprocessor or microcontroller, a graphics processing unit (GPU), or special purpose hardware (e.g., a floating point gate array (FPGA) or an application specific integrated circuit (ASIC)).

In one embodiment, the control system 1110 can be configured to map the rendered pixels of the rendered frame. For example, the rendered frame (k) can be associated with a viewing direction of the object to be displayed and the rendered pixel (u) can have a position (e.g., represented by coordinates, for example, an X and a Y coordinate or a positional coordinate) within the rendered frame (k). This mapping may be constant and independent of the object to be displayed and thus may be pre-computed and stored (e.g., in the digital memory 1114) in a data structure (e.g., in a lookup table (LUT)).

In one embodiment, the control system 1110 may also be configured to map the rendered pixel positions to positions of the light field sub-displays 1101. For example, each pixel of the light field sub-displays 1101 can be located at a different position on the display panel 1305. The rendered pixel position for the light emitted by a pixel of a light field sub-display 101 may be translated for the position of the light field sub-display 1101. Accordingly, each rendered pixel position (u) of the rendered frame (k) can be associated with a given position of a pixel of the light field sub-display 1101 based on the position (z) of the pixel on the display panel 1105. Thus, the corresponding rendered pixels of each rendered frame can be collected together and mapped to the pixels of the light field sub-displays 1101. The mapping is configured such that the rendered pixel positions are translated to pixels of the light field sub-display 1101 so that light emitted from the light field sub-displays 1101 is anisotropically directed based on the viewing direction of the rendered frame. This may also be pre-computed and stored (e.g., in the digital memory 1114) in a data structure (e.g., in a lookup table (LUT)) that may be the same data structure as described above or a different data structure. In some embodiments, the pixels of light field sub-display 1101 may be strobed (e.g., alternated or switched between different rendered frames of the light field image) based on the translated rendered pixel positions of the rendered frame, including the image parameters for each rendered pixel, as different images frames are displayed (e.g., image may be part of a series of image frames that project an object or thing that appears to be moving or changing, as in a video).

In some embodiments, the image parameters may be based on the shape of the display panel 305 or the positions of the light field sub-display 1101 (or pixels thereof). For example, due to the curve of the display panel 1305, some light field sub-displays 1101 are farther from an observer as compared with other light field sub-displays 1101. Light field sub-displays 1101 disposed near the center of the display panel 1305 may be physically closer to an observer, while light field sub-displays 101 that are disposed near the edges of the display panel 1305 (e.g., the light field sub-displays on the right or left side of the display panel 1305) are farther away. In some instances, the apparent intensity of light, as viewed by the observer of a displayed object, from the light field sub-displays 1101 away from the observer may tend to be lower than the intensity of light emitted from light field sub-displays 1101 that are closer to observer, because the amount of illumination per distance decreases for light field sub-displays 1101 farther from the observer. Thus, in some implementations, to keep the apparent intensity of the image across the display panel 1305 relatively constant, the brightness of the illumination, can be scaled based on the distance from the observer. For example, the illumination may be scaled based on the difference in distance between the closest light field sub-display 1101 and a particular light field sub-display 1101. In some embodiments, the scaling may be based on the shape of the display panel 1305. In some embodiments, the scaling may be linear or curved in relation to the shape of the display panel 1305. In other implementations, the light field sub-displays 1101 at larger distances may have increased size, increased number of pixels, or both (as compared to the light field sub-displays 1101 closer to the observer). In yet other implementations, more light field sub-displays 1101 may be used at larger distances, e.g., by decreasing a spacing between adjacent light field sub-displays 1101.

The control system 110 can include a connection to a network, for example, to receive images or image display instructions that are to be displayed by the display apparatus 1100. The display apparatus 1100 can include audio capability. For example, the display apparatus 1100 may include or be connected to a speaker system 1118 to project audio in combination with the projected image. In some implementations, the display apparatus 1100 can include a microphone 1119 and voice recognition technology to enable the display apparatus 1100 to receive and process audio commands or comments from viewers. For example, the display apparatus 1100 may be configured to recognize comments from interested viewers and take action to modify the display apparatus 1100 in response to the comments (e.g., by changing the color of the projected image, changing the projected image, outputting an audio response to the comments, etc.). As an example, in a retail store environment, the display may show an image of a product for sale, and in response to a question as to the price of the product, the display may output the price audibly (e.g., "The product is on sale today for two dollars.") or by a change in the displayed image (e.g., text or graphics showing the price).

The display apparatus 1100 may include a proximity sensor 1116 to detect whether an object is nearby and the control system 1110 can take an appropriate action based on the detection. For example, the proximity sensor 1116 may detect a passer-by and activate the display apparatus 1100 to display an object to attract the passer-by. In some embodiments, the proximity sensor 1116 may be configured to detect the absence of an observer and turn off or shut down the display apparatus 1100.

Figure 13B:
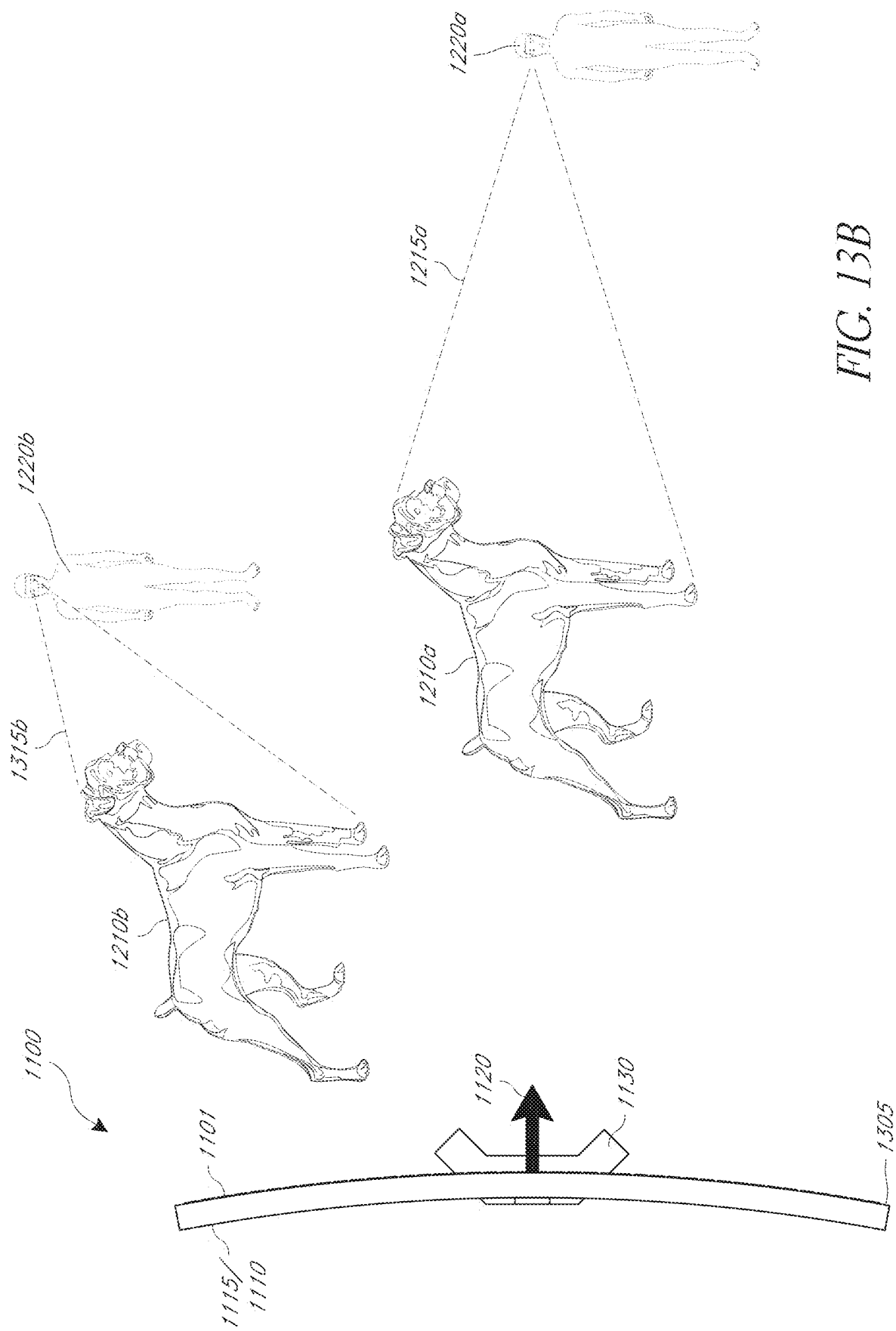
FIG. 13B is a top view that schematically illustrates the display apparatus of FIG. 13A that is displaying a 3-D representation of an image viewed by multiple observes.

Without subscribing to any particular scientific theory, one non-limiting advantage of the embodiments described herein is that an observer that is not directly in front of the display apparatus 1100 can see a substantial field of view of the display apparatus 1100 (e.g., an increased field of view as compared to the planar display panel 1105 of FIGS. 12A and 12B), as depicted in FIG. 13B. FIG. 13B illustrates a top down view of an embodiment of the display apparatus 1100 of FIG. 13A configured to display a 3-D representation of an object at greater angles from the fiducial viewing direction 1120. FIG. 13B illustrates a top down view of an example of the display apparatus 1100 in which the display panel 1305 is curved so as to be convex to observers 1220a, 1220b.

In the embodiment illustrated in FIG. 13B, the display panel 1305 is curved out of the plane that is perpendicular to the fiducial viewing direction 1120 to achieve the convexity, as described above. One non-limiting advantage of the display apparatus 1100 having a convex display panel 1305 is that an observer (e.g., the observer 1220b) that is not directly in front of the display apparatus (e.g., like the observer 1220a) can see a substantial field of view 1315b of the display apparatus 1100 (e.g., an increased field of view as compared to the planar display panel 1105 of FIGS. 12A and 12B). In some embodiments, the field of view of the observer may be increased on a plane that is perpendicular to the plane out of which the display panel 1305 is curved. For example, as illustrated in FIG. 13B, the display panel 1305 is curved out of the plane formed by the X and Y axes and the field of view 1315b of the observer 1220b is increased (relative to field of view 1215b) on a plane formed by the X and Z axis. Other configurations are possible based on the curvature of the display panel 1305, for example, as shown in FIGS. 14A-14E.

The curvature of the display panel 1305 can be selected to provide a desired field of view for the display apparatus 1100. The curvature need not be constant along the display panel 1305 or the same for each axis of the display panel 1305 (e.g., as illustrated in FIGS. 14A-14E). For example, the radius of curvature about the Y axis may be different than the radius of curvature about the X axis. Or, the display panel 1305 may have a radius of curvature that varies about one or both axes. Accordingly, while FIG. 13B illustrates a display apparatus 1100 having a display panel 1305 similar to the display panel 1305 of FIG. 13B, in other embodiments, the display apparatus 1100 can include any display panel as described herein.

While examples of devices for producing a light field are described herein and with reference to FIGS. 2A-4B, it will be understood that no single light field sub-display type is necessary for displaying a 3-D representation of an object in the display apparatuses. Other light field displays are envisioned, such that a plurality of light field sub-displays is disposed on the curved display panel to produce a 3-D representation of an object. For example, any of the light field sub-displays, assemblies, or arrangements described in U.S. Patent Application No. 62/288,680, filed Jan. 29, 2016, entitled "Holographic Propeller," and U.S. Patent Application No. 62/343,722, filed May 31, 2016, entitled "Display for Three-Dimensional Image," each of which is incorporated by reference herein in its entirety for all it discloses, can be implemented for displaying a 3-D representation of an object.

Alternative Embodiments for Displaying a 3-D Representation of an Object

While FIG. 11 shows an example of the display apparatus 1100 comprising a display panel 1305 that is curved out of a plane that is perpendicular to the viewing direction, the display apparatus 1100 can be configured differently in other embodiments. For example, a display apparatus 1100 may comprise any number of light field sub-displays, for example, the display panel 1305 may comprise a single light field sub-display disposed over the entirety of the display panel 1305. In another embodiments, in combination or alternatively, the display panel 1305 may have any shape or size. FIGS. 14A-14E illustrate some of the embodiments of a display apparatus 1100 in accordance with the disclosure herein, however, other configurations are possible. In some embodiments, the various configurations may produce display panels that are shaped as a portion of a cylindrical, spherical, oblate spheroid, or prolate spheroid.

Figure 14A:
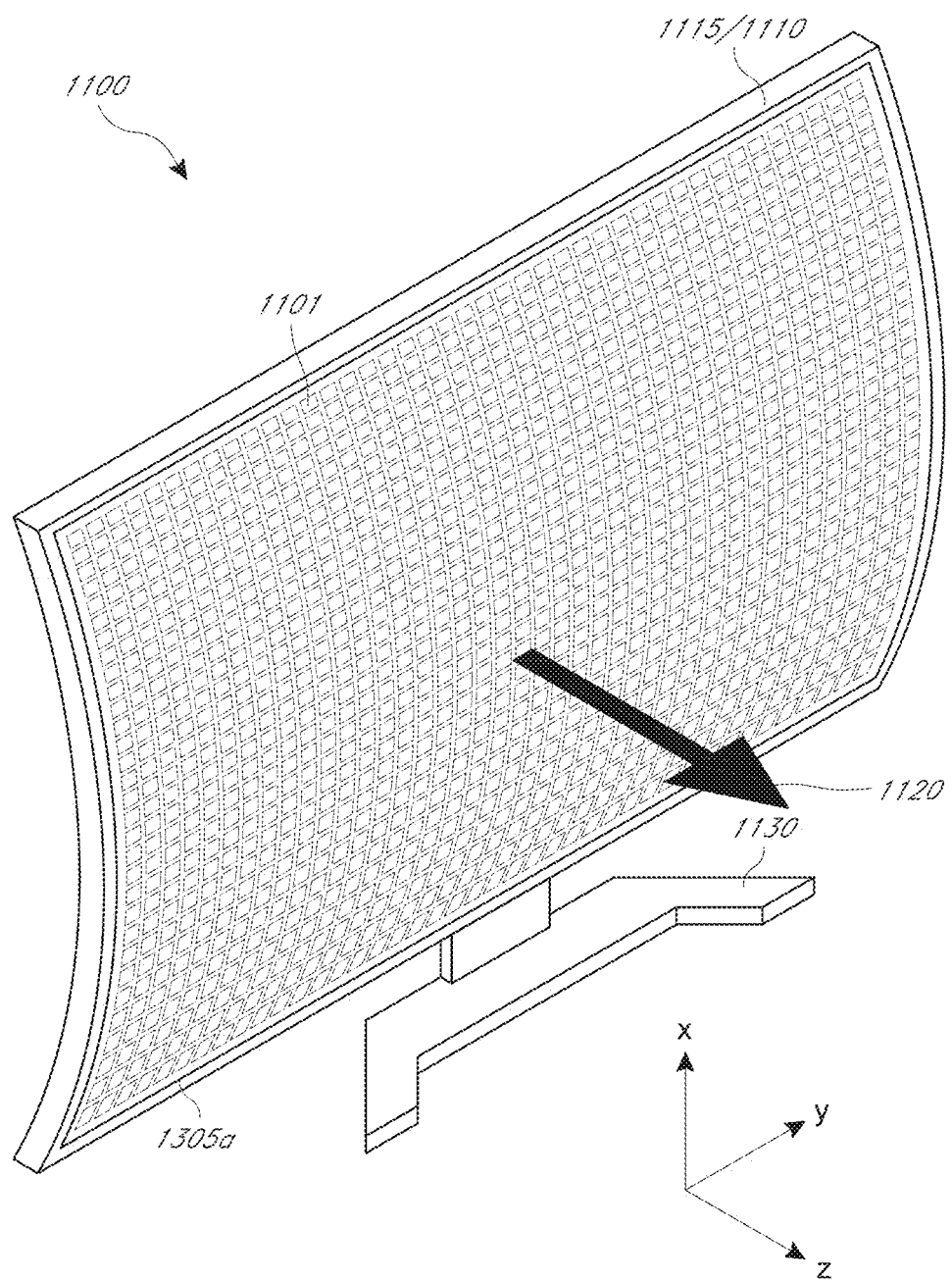
FIGS. 14A-14E are perspective views that schematically illustrate various examples of a display apparatus.

FIG. 14A illustrates the display apparatus 1100 including a display panel 1305a configured with a different curvature than the display panel 1305 of FIG. 13A. For example, FIG. 14A depicts imaginary axes X, Y, and Z for illustrative purposes only, which may be substantially similar to the axes depicted in FIG. 13A. Accordingly, FIG. 14A illustrates a display panel 1305a that is curved out of the plane that is perpendicular to the fiducial viewing direction 1120 (e.g., the Z axis) and convexly curved about a horizontal (e.g., X) axis. The display panel 1305a may have a cylindrical shape, for example, the display panel 1305a may be similar to a portion of a cylinder that is positioned on a curved surface.

Figure 14B:
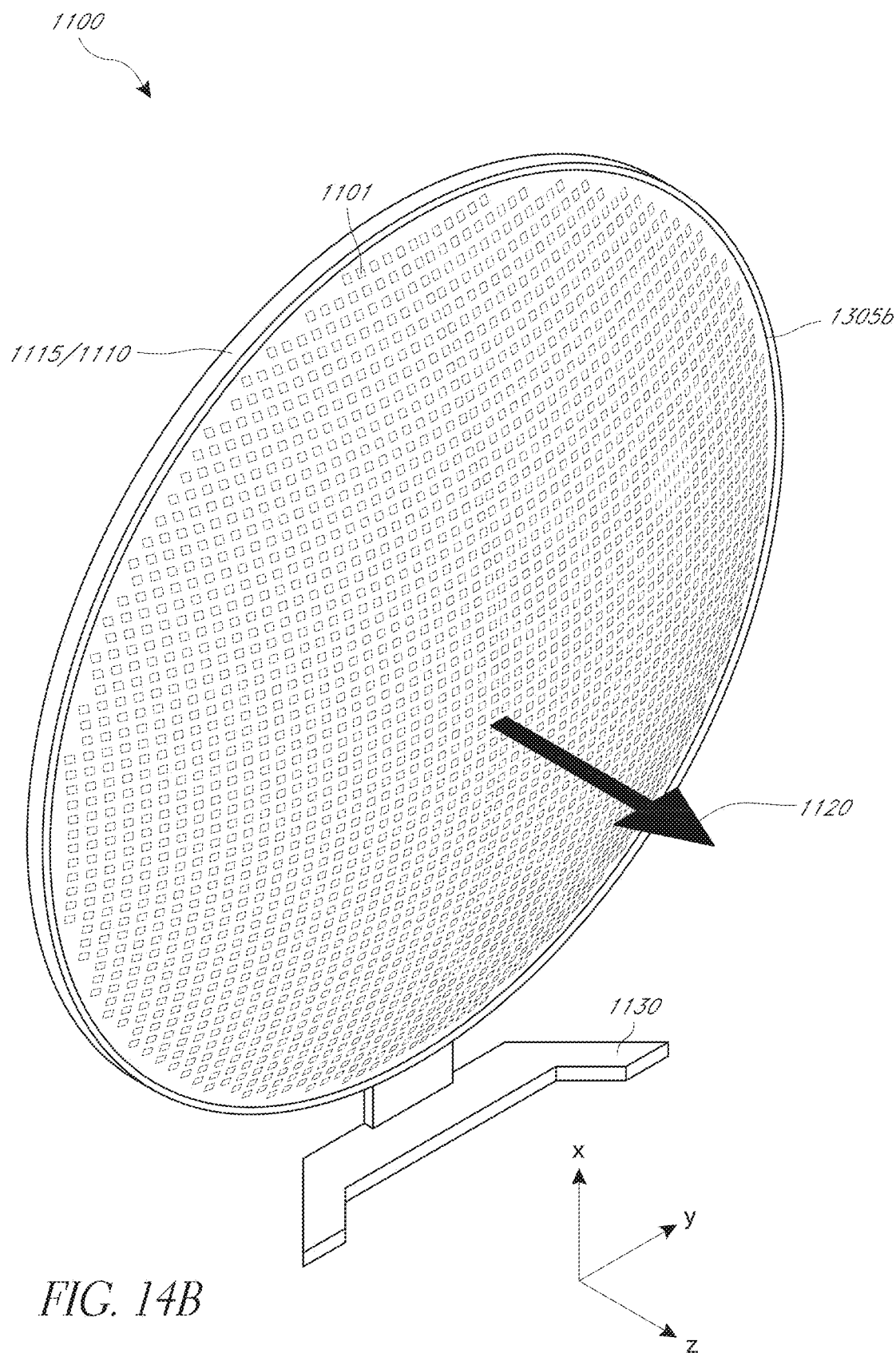
Figure 14C:
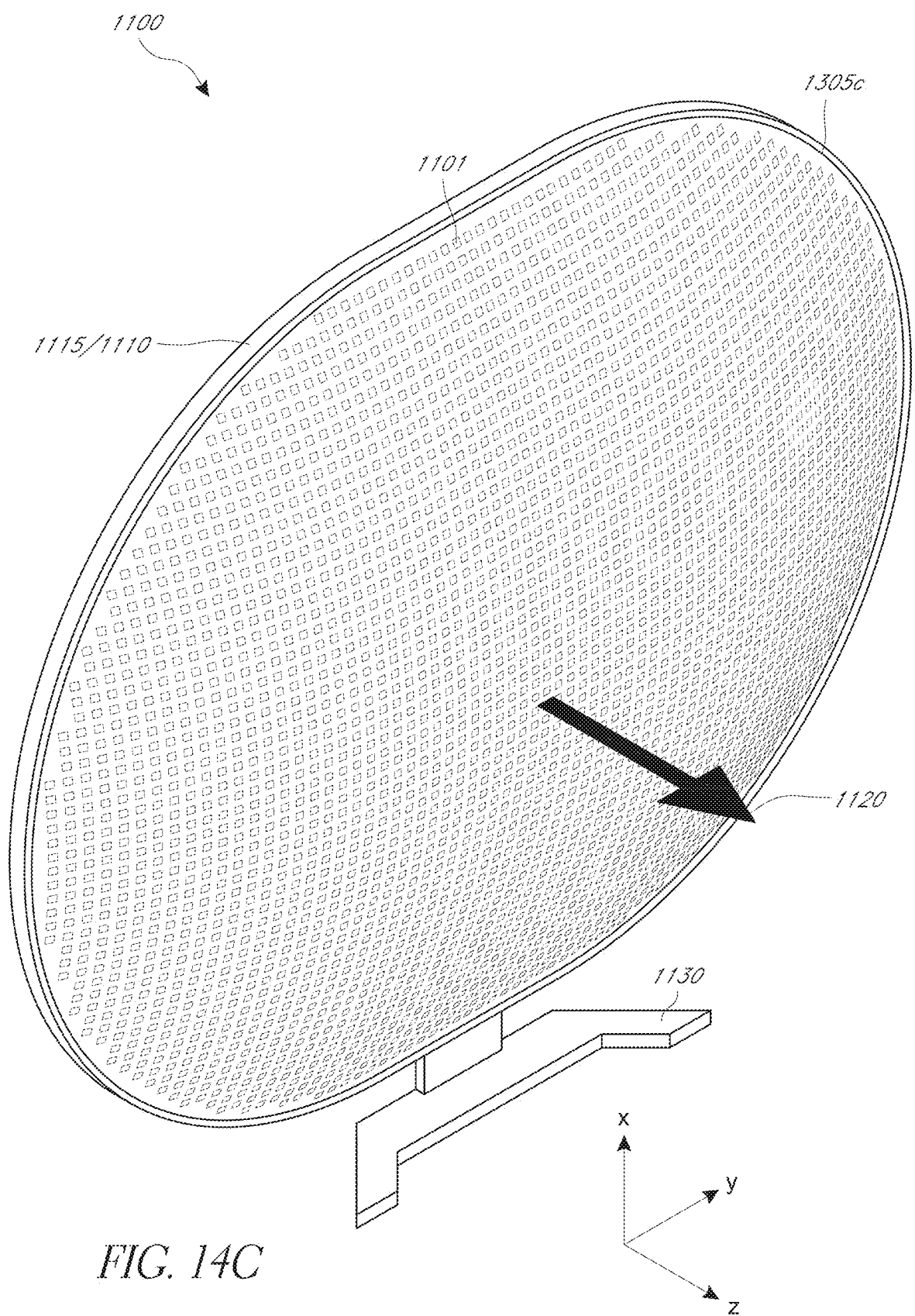

In some embodiments, the display apparatus 1100 may comprise a display panel 1305 that is curved about two axes, for example, as shown in FIGS. 14B and 14C. For example, FIG. 14B illustrates an embodiment of the display panel 1305b that is curved about the horizontal (e.g., X) axis and vertical (e.g., Y) axis. In some embodiments, the radii of curvature about the horizontal and vertical axes may be substantially the same. Similarly dimensioned radii may result in a display panel 1305b that is shaped as a portion of sphere. In other embodiments, the radii of curvature about the horizontal and vertical axes may be different, for example, as shown in FIG. 14C. FIG. 14C depicts an embodiment of a display panel 1305c that is similar to FIG. 14B, however, the radius of curvature about the horizontal (e.g., X) axis may be smaller than the radius of curvature about the vertical (e.g., Y) axis. A radius of curvature about the horizontal axis that is smaller than the radius about the vertical axis may result in a display panel 1305c that is shaped as a portion of an oblate spheroid. However, in some embodiments, the radius of curvature about the horizontal (e.g., X) axis may be larger than the radius of curvature about the vertical (e.g., Y) axis which may result in a display panel (not shown) that is shaped a portion of a prolate spheroid.

Other configurations are possible. For example, the axes may considered to be first, second, and third axes. The third axis may be parallel to the fiducial viewing direction 1120 and the first and second axis may form a plane that is perpendicular to the third axis, similar to the axes described above. However, the first and second axis need not be perpendicular to each other and may be at some angle that is less than or great than 90 degrees relative each axis. In some embodiments, in combination or alternatively, the first and second axis also need not be horizontal or vertical, and may be at any angle relative to the horizontal or vertical arrangement discussed in connection with FIGS. 13A and 14A-14C. Accordingly, the display panel 1305 may be curved out of the plane that is perpendicular the viewing direction, and may be curved about the first axis, second axis, or the first and second axes.

Figure 14D:
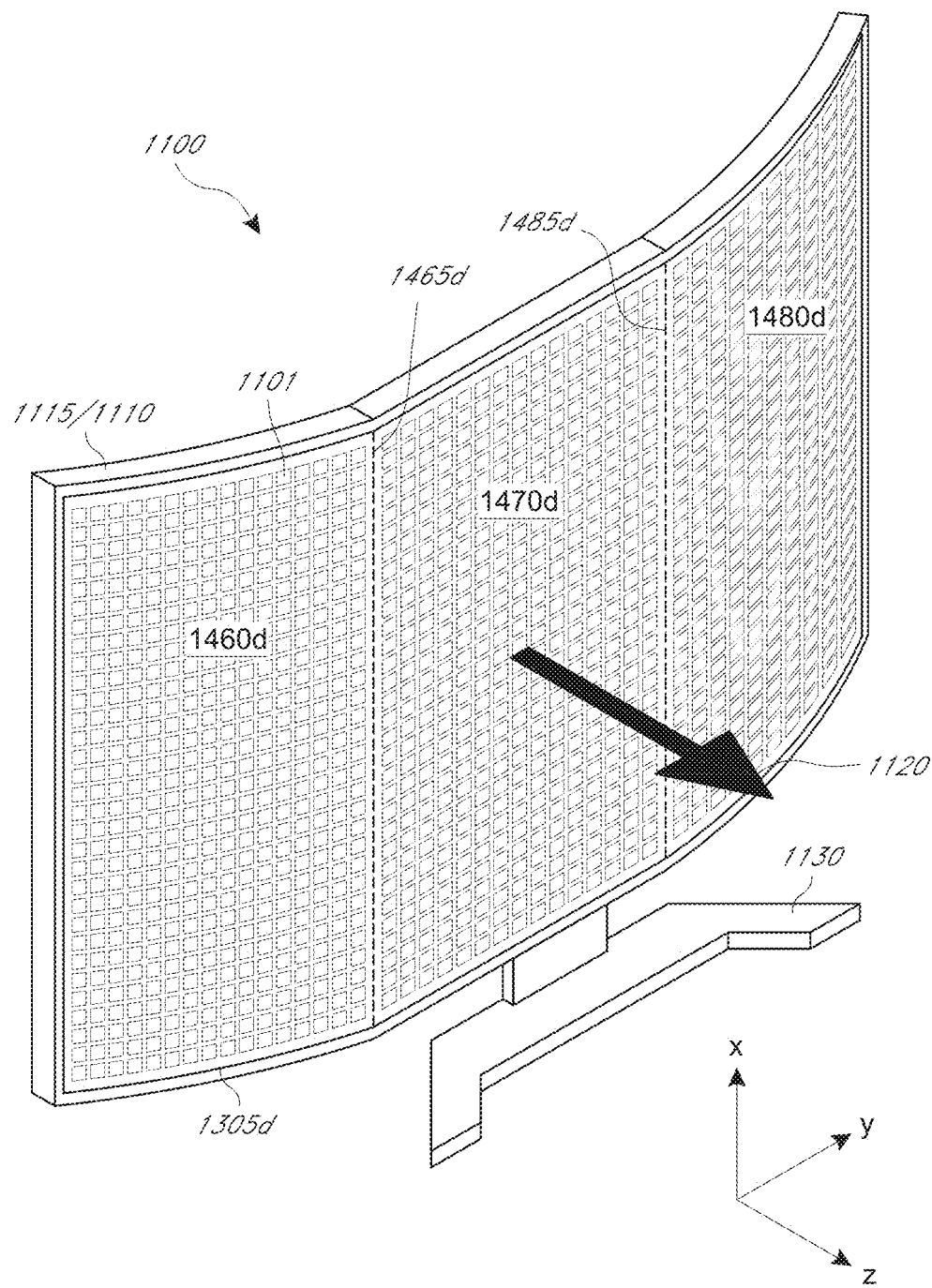
Figure 14E:
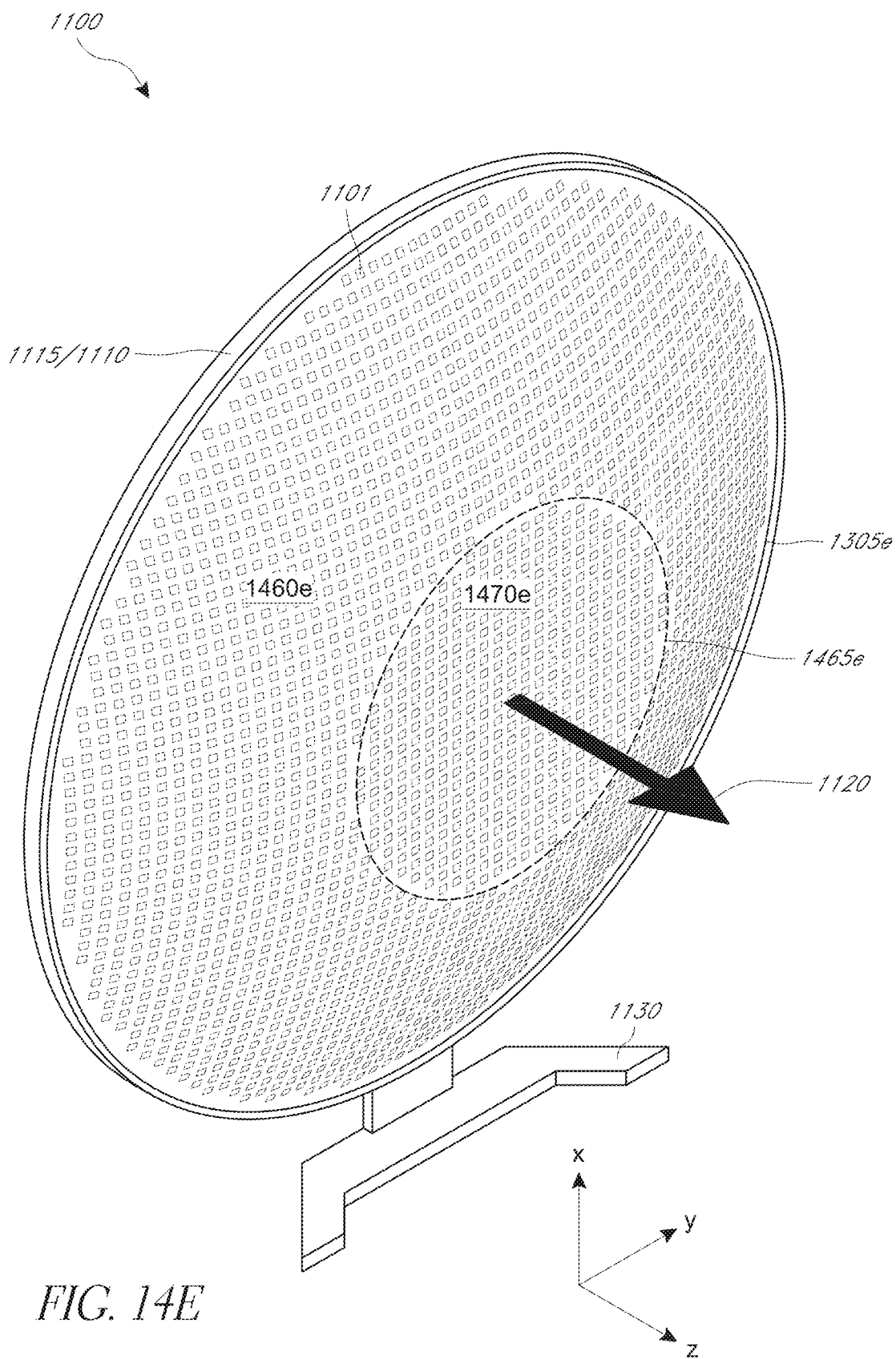

In some embodiments, the display apparatus 1100 may comprise a display panel 1305 that includes a plurality of display regions that may be curved independently of each other (e.g., FIGS. 14D and 14E). For example, the display panel may be figuratively divided into a plurality of display regions, each comprising a portion of the light field sub-display or one or more individual light field sub-displays. Each display region may include a planar surface or a curved surface. For example, FIG. 14D illustrates an embodiment of a display panel 1305d comprising multiple display regions (e.g., the display regions 1460d, 1470d, and 1480d) that are divided along illustrative lines 1465d and 1485e (shown as dotted lines). The display region 1470d may be positioned near or about a central area of the display panel 1305d. In this embodiment, the display region 1470d may not be curved such that the display region 1470d is substantially perpendicular to the fiducial viewing direction 1120. The display regions 1460d and 1480d may be curved out of the plane that is perpendicular to the viewing direction, in a manner that is substantially similar as described herein. Similarly, FIG. 14E illustrates an embodiment of the display panel 1305e comprising two display regions 460e and 1470e divided along illustrative line 1465e (shown as a dotted circular line). The display region 1470e may be similar to the display region 1470d of FIG. 14D, in that the display region 1470e is substantially perpendicular to the fiducial viewing direction 1120. The display region 1460e may be curved out of the plane that is perpendicular to the viewing direction, in a manner that is substantially similar as described herein. According, the display panel 1305e may be a partial sphere (or in some embodiments spheroid) that has a planar surface at the display region 1470e.

While certain embodiments have been described herein, other configurations are possible. For example, the display panel may comprise any number of display regions, for example, 1, 2, 4, 5, 6, etc. In some embodiments, the curve applied to each of the display regions need not be the same and may be different for each display region as compared to other display regions. In other embodiments, the display panel need not be symmetrical in shape or configuration of display regions. In some embodiments, the display region disposed near the central area need not be planar and may be curved, while other display regions at the edge of the display panel or off from the central area may be planar.

Example Routine for Displaying a 3-D Representation of an Object

Figure 15:
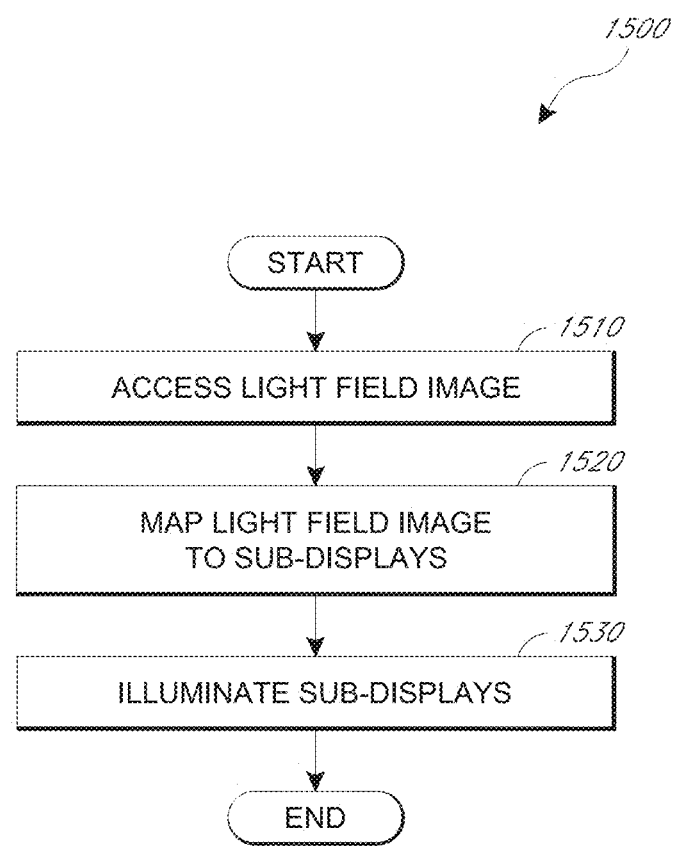
FIG. 15 is a process flow diagram of an example of a method of displaying a 3-D representation of an object using a display apparatus.

FIG. 15 is a flow diagram of an illustrative routine for displaying a 3-D representation of an object using the display apparatus described herein. The routine 1500 is an example flow for processing light field image and illuminating light field sub-displays to display a 3-D representation of an object or image. The routine 1500 may be performed by the control system 1110 of embodiments of the display apparatus 1100.

At the block 1510 the light field image is accessed, for example, from the memory 1114 or another separate or remote storage unit. In some implementations, the image is a light field representation of an object to be displayed. The light field image may be made of multiple rendered frames. Each rendered frame may be a representation of the object to be displayed at different viewing directions. In this way, the multiple rendered frames are each associated with a viewing direction of the object. In other implementations, the images of the object may be sequenced so that the object appears to be moving in space. In this case, the accessed light field image may include multiple light field images, where each light field image is a single frame of a video.

The routine 1500 continues to the block 1520, wherein the light field image is mapped to the light field sub-displays. For example, the control system 1110 of FIG. 13A may execute instructions to generate an association or mapping of the accessed light field image to each of the light field sub-displays 1101 based, in part, on the position of the light field sub-displays 1101 on the display panel 1305. In some embodiments, each rendered frame of the light field image may be mapped to the pixels (e.g., a micro-lens) of the light field sub-displays 1101. The mapping may be based in part on the position of the pixels (e.g., the micro-lenses of FIGS. 2A and 2B) on the display panel 1305. The mapping of the light field image may also include determining a color and intensity of light to be emitted at the viewing direction associated with the rendered frame to be displayed by the mapped pixel (e.g., micro-lens of FIGS. 2A and 2B) of the light field sub-display 1101. In one embodiment, the mapping of the light field image to the light field sub-displays 1101 may be performed according to a routine detailed below in connection with FIG. 16.

The routine 1500 continues to the block 1530, where the light field sub-displays are illuminated. For example, the light field sub-displays may be illuminated based, at least in part, on the mapped light field image. The control system 1110 of FIG. 13A may execute instructions to cause the light field sub-displays 1101 to be illuminate based, in part, on the mapped light field image and the position of the light field sub-displays 1101 on the display panel 1305. In one implementation, the light field sub-displays 1101 may be modulated (e.g., turned on and off) as a function of time based, in part, on the switching between rendered frames of the object configured such that the object appears to be moving in space. In one embodiment, the illumination of the light field sub-displays 1101 may be performed according to a routine detailed below in connection with FIG. 17. Thereafter, the routine 1500 ends.

In various embodiments, the routine 1500 may be performed by a hardware processor (e.g., the hardware processor 1112 of FIG. 13A) of a display apparatus 1100 of FIG. 13A. In other embodiments, a remote computing device (in network communication with the display apparatus) with computer-executable instructions can cause the display apparatus to perform aspects of the routine 1500.

Example Routine for Mapping Light Field Image to Light Field Sub-Displays

Figure 16:
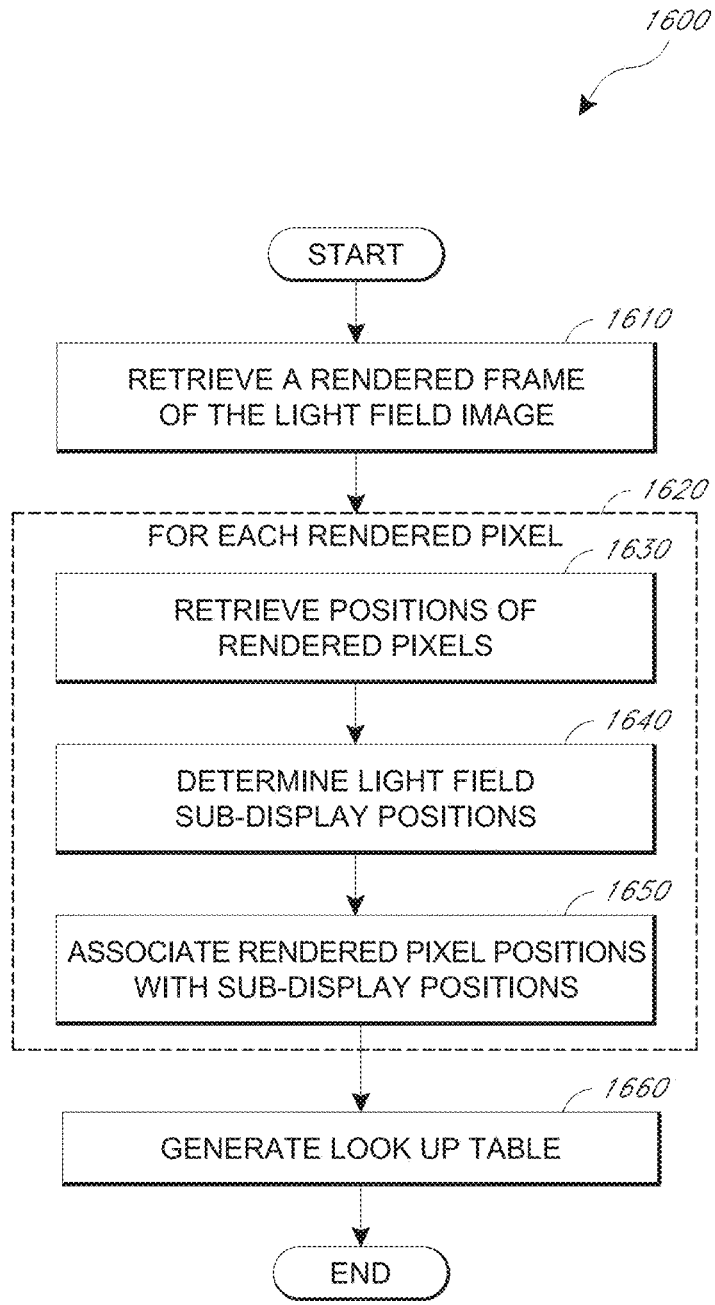
FIG. 16 is a process flow diagram of an example of a method of mapping light field image information to light field sub-displays of a display apparatus.

FIG. 16 is a flow diagram of an illustrative routine for mapping a light field image to light field sub-displays. Routine 1600 may be one example of one method that hardware processor 1112 of control system 1110 of FIG. 13A or a remote computing device may map the light field image to each of the light field sub-displays 1101 based, at least in part, on the position of the light field sub-displays 101 on the display panel 1305.

The routine 1600 starts at the block 1610, where one or more rendered frames of the light field image are retrieved. For example, at the block 1610 the light field image is accessed from the digital memory 1114 of control system 1110, where the light field image may include multiple rendered frames. Each rendered frame may be indicative of a different view of the plurality of different views of the object. Furthermore, the rendered frames may comprise multiple rendered pixels that may be combined to represent the image of the object to be displayed. The routine continues to subroutine 1620 for each rendered pixel of a rendered frame.

For each rendered pixel, the subroutine 1620 proceeds to the block 1630, where the position of each rendered pixel is retrieved. Each rendered pixel may have a position within the rendered frame. For example, the rendered frame may be a 2-D representation of the object for a given viewing direction, and each rendered pixel may have a coordinate (e.g., X and Y coordinates) position within that rendered frame. In some embodiments, each rendered frame of the light field image may include the same number of rendered pixels, such that the positions of rendered pixels are constant from rendered frame to rendered frame.

At the block 1640, light field sub-display positions are determined based on the position of the light field sub-display on the display panel. For example, each light field sub-display 1101 of FIG. 13A may have a location (e.g., an X and Y coordinate) within the display panel 1305. In some embodiments, a distance from a plane perpendicular to the fiducial viewing direction 1120 (e.g., a Z coordinate) of each light field sub-display 1101 (or, e.g., the pixels thereof) may be determined. In some embodiments, the position of the light field sub-displays may remain stationary, thus the determination may be pre-generated or stored in a memory (e.g., memory 1114 or a remote memory device) and retrieved or accessed by a processor (e.g., processor 1112).

At the block 1650, each rendered pixel position is associated with a light field sub-display position. In some embodiments, as described above, the position of a rendered pixel (u) may be associated with a light field sub-display position (z) on the display panel 1305 (e.g., a pixel position of the light field sub-display 1101). In some embodiments, where the number and position of the rendered pixels is unchanged between rendered frames, the association may be constant for any rendered frame of the light field image. At block 1660, the routine 1600 can generate (and store) a data structure (e.g., a look up table (LUT)) that associates rendered pixels with light field sub-display positions. Multiple display apparatuses may be able to access the same lookup table so as to synchronize the image displayed by the multiple display apparatus located apart or physically separate from each other. Thereafter, the routine 1600 ends.

Example Routine for Illuminating the Light Field Sub-Displays

Figure 17:
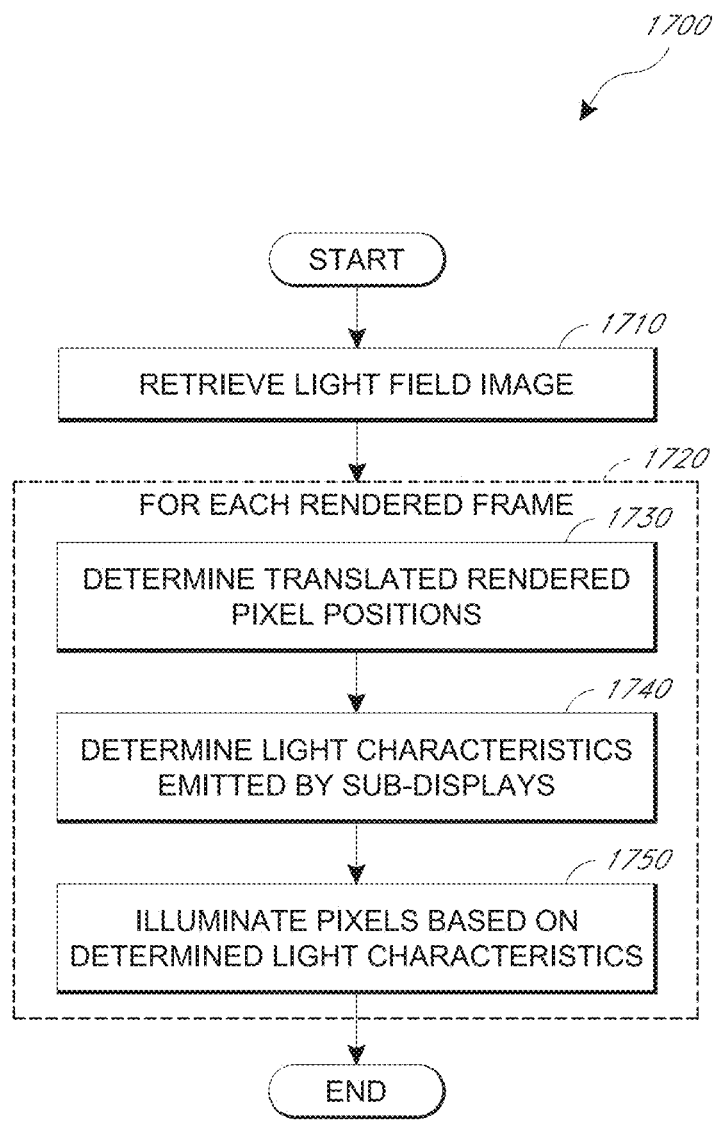
FIG. 17 is a process flow diagram of an example of a method of illuminating light field sub-displays of a display apparatus.

FIG. 17 is a flow diagram of an illustrative routine for illuminating the light field sub-displays of a display apparatus (e.g., the display apparatus 1100 of FIG. 13A). Routine 1700 may be one example of a method that hardware processor 1112 of control system 1110 of FIG. 13A or a remote computing device that can be used to illuminate the light field sub-displays 1101 based at least in part on the mapped light field data.

The routine 1700 starts at the block 1710, where the light field image is retrieved. As described above, the light field image may include multiple rendered frames representing different viewing directions. The multiple rendered frames may include a color and intensity (e.g., image parameters), among other optical properties for rendering an image, associated with each rendered pixel of the rendered frame so as to portray the object at a viewing direction associated with the rendered frame. The routine 1700 continues to subroutine 1720 for each rendered frame.

For each rendered frame, the subroutine 1720 proceeds to the block 1730, where translated rendered pixel positions are determined. The translated rendered pixel positions may relate to the positions of the rendered pixels translated to a position of the associated light field sub-display, for example, as determined in routine 1600 of FIG. 16. In some embodiments, the determination of translated rendered pixel positions may be performed by accessing a data structure (e.g., data structure generated in the block 1660 of FIG. 16).

At the block 1740, a color and intensity of light to be emitted by the light field sub-display is determined based, at least in part, on the rendered frame to be displayed. In one implementation, the color and intensity may be defined by the rendered pixel to be displayed by a light field sub-display 1101. For example, with reference to FIGS. 2A and 2B, each rendered frame is associated with a viewing direction. Each pixel (e.g., pixel 205) in a pixel array 220 of a light field sub-display 101 may be associated with a direction of emitting light based on the association with a micro-lens 215a, which may be mapped to a given rendered pixel. Thus, each pixel 205 of the pixel array 220 may be associated with a given viewing direction at any instance in time. Based on this association, it is possible to determine which rendered pixel of the rendered frame will be associated with a given pixel 205 of the pixel array 220. From this association, the subroutine 1720 may retrieve a color and intensity of the rendered pixel to determine the color and intensity of light that a given pixel of the light field sub-display 1101 will emit based on the viewing direction of the rendered frame.

In some embodiments, at the block 1740, the intensity of light to be emitted by the light field sub-display may be determined based on the position of a light field sub-display relative to an observer. For example, due to the curve of the display panel 1305, some light field sub-displays 1101 are farther from an observe as compared with other light field sub-displays 1101, as described above. Light field sub-displays 1101 disposed near the center of the display panel 1305 may be physically closer to an observer, while light field sub-displays 1101 that are disposed near the edges of display panel 1305 are farther away. In some instances, the apparent intensity of light, as viewed by the observer of a displayed object, from the light field sub-displays 1101 away from the observer of display panel 1305 may tend to be lower than the intensity of light emitted from light field sub-displays 1101 that are closer to observer, because the amount of illumination per distance decreases for light field sub-displays 1101 farther from the observer. Thus, in some implementations, to keep the apparent intensity of the image across the display panel 1305 relatively constant, the brightness of the illumination, can be scaled based on the distance from the observer. For example, the illumination may be scaled based on the difference in distance between the closest light field sub-display 1101 and a particular light field sub-display 1101. In some embodiments, the scaling may be based on the shape of the display panel 1305. In some embodiments, the scaling may be linear or curved in relation to the shape of the display panel 1305.

The subroutine 1720 continues to the block 1750, where each light field sub-display is illuminated based on the determined color and intensity, as well as the position of the light field sub-displays on the display panel. For example, the control system 1110 may execute instructions to illuminate the each light field sub-displays 1101 of display panel 1305 based on the determined color and intensity associated with the translated rendered pixel position. Thereafter, at the block 1750, the routine 1700 ends.

Additional Aspects

In a 1st aspect, a display apparatus for displaying a 3-D representation of an object is disclosed. The display apparatus comprises: a rotatable structure; a motor configured to rotate the rotatable structure; a plurality of light field sub-displays disposed on the rotatable structure; a non-transitory memory configured to store a light field image to be displayed by the display apparatus, the light field image providing a plurality of different views of the object at different viewing directions; and a processor operably coupled to the non-transitory memory, the motor, and the light field sub-displays, the processor programmed with executable instructions to: drive the motor to rotate the rotatable structure about a rotation axis, the rotatable structure positioned at a rotation angle as a function of time, access the light field image, map the light field image to each of the plurality of light field sub-displays based at least in part on the rotation angle, and illuminate the plurality of light field sub-displays based at least in part on the mapped light field image.

In a 2nd aspect, the apparatus of aspect, wherein the rotatable structure comprises a plurality of elongated elements and the plurality of light field sub-displays are disposed along the elongated elements or a transparent rotatable element.

In a 3rd aspect, the apparatus of aspect 1 or 2, wherein the plurality of elongated elements are curved along a plane that is perpendicular to the rotation axis.

In a 4th aspect, the apparatus of any one of aspects 1 to 3, wherein the plurality of elongated elements are curved out of a plane that is perpendicular to the rotation axis.

In a 5th aspect, the apparatus of any one of aspects 1 to 4, wherein the display apparatus is configured to be viewed from a viewing direction, and the plurality of elongated elements are convex from the viewing direction.

In a 6th aspect, the apparatus of any one of aspects 1 to 5, wherein at least a portion of the rotatable structure is transparent.

In a 7th aspect, the apparatus of any one of aspects 1 to 6, wherein the plurality of light field sub-displays are disposed radially from the rotation axis.

In an 8th aspect, the apparatus of any one of aspects 1 to 7, wherein each light field sub-display has a corresponding radius based on its position from the rotation axis, and wherein to illuminate the plurality of light field sub-displays the processor is programmed to scale an intensity or a duration of the illumination of a light field sub-display based on the radius.

In a 9th aspect, the apparatus of any one of aspects 1 to 8, wherein the scaling is linear with radius of the light field sub-display.

In a 10th aspect, the apparatus of any one of aspects 1 to 9, wherein each light field sub-display comprises: a micro-lens array comprising a plurality of micro-lenses, and a pixel array comprising a plurality of pixel subsets, each pixel subset associated with a micro-lens and configured to produce light, wherein each pixel subset and associated micro-lens are arranged to produce outgoing light at a plurality of angles, wherein light from a first pixel of the pixel subset propagates from the light field sub-display at an angle that is different from an angle of a second pixel of the pixel subset.

In an 11th aspect, the apparatus of any one of aspects 1 to 10, wherein the pixel subsets are positioned at approximately the focal point of the associated micro-lens.

In a 12th aspect, the apparatus of any one of aspects 1 to 11, wherein each light field sub-display comprises a stacked waveguide assembly comprising one or more waveguides, wherein each of the one or more waveguides is configured to project light of one or more of the plurality of different views of the object.

In an 13th aspect, the apparatus of any one of aspects 1 to 12, wherein the light field image comprises a plurality of rendered frames, each rendered frame indicative of a different view of the plurality of different views of the object, wherein each rendered frame comprises a plurality of rendered pixels that, when combined, render the rendered frame, each rendered pixel having a position within the rendered frame.

In a 14th aspect, the apparatus of any one of aspects 1 to 13, wherein to map the light field image to the plurality of light field sub-displays based at least in part on the rotation angle, the processor is programmed to associate the position of each rendered pixel with a position of each light field sub-display on the rotatable structure, wherein the position of each light field sub-display is based on the rotation angle as a function of time.

In a 15th aspect, the apparatus of any one of aspects 1 to 14, wherein the rendered pixel positions are unchanged between the plurality of rendered frames.

In a 16th aspect, the apparatus of any one of aspects 1 to 15, wherein to map the light field image to each of the plurality of light field sub-displays further comprises, for each light field sub-display, the processor is programmed to determine a color and intensity based on a rendered frame to be displayed and the association of the position of each rendered pixel with the position of each light field sub-display on the rotatable structure.

In a 17th aspect, the apparatus of any one of aspects 1 to 16, wherein to illuminate the plurality of light field sub-displays, the processor is programmed to: for a given rendered frame, illuminate each light field sub-display based on the determined color and intensity, wherein the direction of illumination is related to the viewing direction of the rendered frame, and strobe the illumination of each light field sub-display based on the rotation of the rotatable structure, the plurality of rendered frame, and the association of the position of each rendered pixel with the position of each light field sub-display on the rotatable structure.

In an 18th aspect, the apparatus of any one of aspects 1 to 17, further comprising a speaker system configured to project audio in combination with the processor programmed to illuminate the plurality of light field sub-displays.

In a 19th aspect, the apparatus of any one of aspects 1 to 18, further comprising a microphone configured to receive audio, and wherein the processor is programmed with executable instructions to: receive an audio input from the microphone; recognize that the audio input is an audio command; and initiate an action to modify the illumination of the plurality of light field sub-displays based on the audio command.

In a 20th aspect, the apparatus of any one of aspects 1 to 19, further comprising a proximity sensor configured to detect an entity within a predetermined distance of the display apparatus, and wherein the processor is programmed with executable instructions to initiate an action based on the proximity sensor detecting the entity.

In a 21st aspect, a method for displaying a 3-D representation of an object is disclosed. The method comprises: driving a motor to rotate a rotatable structure that comprises a plurality of light field sub-displays about a rotation axis, the rotatable structure positioned at a rotation angle as a function of time; accessing a light field image to be displayed by the display apparatus, the light field image providing a plurality of different views of the object at different viewing directions; mapping the light field image to each of the plurality of light field sub-displays based at least in part on the rotation angle; and illuminating the plurality of light field sub-displays based at least in part on the mapped light field image.

In a 22nd aspect, the method of aspects 21, wherein the light field image comprises a plurality of rendered frames, each rendered frame indicative of a different view of the plurality of different views of the object, wherein each rendered frame comprises a plurality of rendered pixels that combine to render the rendered frame, each rendered pixel having a position within the rendered frame.

In a 23rd aspect, the method of aspects 21 or 22, wherein mapping the light field image to the plurality of light field sub-displays is based at least in part on the rotation angle, comprises associating the position of each rendered pixel with a position of each light field sub-display on the rotatable structure, wherein the position of each light field sub-display is based on the rotation angle as a function of time.

In a 24th aspect, the method of any one of aspects 21 to 23, wherein the rendered pixel positions are unchanged between the plurality of rendered frames.

In a 25th aspect, the method of any one of aspects 21 to 24, wherein mapping the light field image to each of the plurality of light field sub-displays further comprises, for each light field sub-display, determining a color and intensity based on a rendered frame to be displayed and the association of the position of each rendered pixel with the position of each light field sub-display on the rotatable structure.

In a 26th aspect, the method of any one of aspects 21 to 25, wherein illuminating the plurality of light field sub-displays comprises: for a given rendered frame, illuminating each light field sub-display based on the determined color and intensity, wherein the direction of illumination is related to the viewing direction of the rendered frame, and strobing the illumination of each light field sub-display based on the rotation of the rotatable structure, the plurality of rendered frame, and the association of the position of each rendered pixel with the position of each light field sub-display on the rotatable structure.

In a 27th aspect, a display apparatus for displaying a 3-D representation of an image is disclosed. The display apparatus comprises: a light field sub-display configured to be rotated, the light field sub-display having a plurality of displaying positions; a non-transitory memory configured to store a light field image to be displayed by the display apparatus, the light field image providing a plurality of different views of the object at different viewing directions; a processor operably coupled to the non-transitory memory and the light field sub-display, the processor programmed with executable instructions to: rotate the light field sub-display about a rotation axis, wherein the plurality of displaying positions are based on a rotation angle as a function of time, access the light field image, map the light field image to the plurality of displaying positions based at least in part on the rotation angle, and illuminate the light field sub-display based at least in part on the mapped light field image.

In a 28th aspect, a display apparatus for displaying a 3-D representation of an image is disclosed. The display apparatus comprises: one or more light field sub-displays, each of the one or more light field sub-displays having a plurality of displaying positions, wherein the one or more light field sub-displays are configured to rotate about one or more rotation axes; a non-transitory memory configured to store a light field image to be displayed by the display apparatus, the light field image providing a plurality of different views of the object at different viewing directions; a processor operably coupled to the non-transitory memory and the one or more light field sub-displays, the processor programmed with executable instructions to: drive a rotation of the one or more light field sub-displays about at least one of the rotation axes, wherein the plurality of displaying positions are based on a rotation angle as a function of time, and illuminate the one or more light field sub-displays based at least in part on the light field image and the plurality of displaying positions.

In a 29th aspect, a display apparatus for displaying a 3-D representation of an object is disclosed. The display apparatus comprises: a display panel configured to be viewed from a fiducial viewing direction, wherein the display panel is curved out of a plane that is perpendicular to the fiducial viewing direction; a plurality of light field sub-displays disposed on the display panel; a non-transitory memory configured to store a light field image to be displayed by the display apparatus, the light field image providing a plurality of different views of the object at different observing directions; and a processor operably coupled to the non-transitory memory and the light field sub-displays, the processor programmed with executable instructions to: access the light field image, map the light field image to each of the plurality of light field sub-displays based at least in part on the position of the light field sub-displays on the display panel, and illuminate the plurality of light field sub-displays based at least in part on the mapped light field image.

In a 30th aspect, the apparatus of aspect 29, wherein the display panel is convex relative to the fiducial viewing direction.

In a 31st aspect, the apparatus of aspect 30, wherein the first axis is horizontal and the display panel is curved about the first axis.

In a 32nd aspect, the apparatus of aspect 30 or 31, wherein the second axis is vertical and the display panel is curved about the second axis.

In a 33rd aspect, the apparatus of any one of aspects 30 to 32, wherein the first and second axes are perpendicular and the display panel is curved about both of the first and second axes.

In a 34th aspect, the apparatus of any one of aspects 30 to 33, wherein the radius of curvature about the first axis is different than the radius of curvature about the second axis.

In a 35th aspect, the apparatus of any one of aspects 30 to 33, wherein the radius of curvature about the first axis is substantially the same as the radius of curvature about the second axis.

In a 36th aspect, the apparatus of any one of aspects 29 to 35, wherein the display panel comprises a first axis and a second axis that are perpendicular to the fiducial viewing direction.

In a 37th aspect, the apparatus of any one of aspects 29 to 36, wherein the display panel comprises a plurality of display regions, at least one display region is curved out of the plane that is perpendicular to the fiducial viewing direction.

In a 38th aspect, the apparatus of aspect 37, wherein at least one of the display regions is substantially perpendicular to the fiducial viewing direction.

In a 39th aspect, the apparatus of any one of aspects 29 to 38, wherein the display panel has a shape that is at least one of cylindrical, spherical, oblate spheroid, and prolate spheroid.

In a 40th aspect, the apparatus of any one of aspects 29 to 39, wherein to illuminate the plurality of light field sub-displays the processor is programmed to scale an intensity or duration of illumination of a light field sub-display based on the position of the light field sub-display on the display panel relative to the position of another light field sub-display.

In a 41st aspect, the apparatus of any one of aspects 29 to 40, wherein each light field sub-display comprises: a micro-lens array comprising a plurality of micro-lenses, and a pixel array comprising a plurality of pixel subsets, each pixel subset associated with a micro-lens and configured to produce light, wherein each pixel subset and associated micro-lens are arranged to produce outgoing light at a plurality of angles, wherein light from a first pixel of the pixel subset propagates from the light field sub-display at an angle that is different from an angle of a second pixel of the pixel subset.

In a 42nd aspect, the apparatus of aspect 41, wherein the pixel subsets are positioned at approximately the focal point of the associated micro-lens.

In a 43rd aspect, the apparatus of any one of aspect 29 to 42, wherein each light field sub-display comprises a stacked waveguide assembly comprising one or more waveguides, wherein each of the one or more waveguides is configured to project light of one or more of the plurality of different views of the object.

In a 44th aspect, the apparatus of any one of aspects 29 to 43, wherein the light field image comprises a plurality of rendered frames, each rendered frame indicative of a different view of the plurality of different views of the object, wherein each rendered frame comprises a plurality of rendered pixels that, when combined, render the rendered frame, each rendered pixel having a position within the rendered frame.

In a 45th aspect, the apparatus of aspect 44, wherein to map the light field image to the plurality of light field sub-displays, the processor is programmed to associate the position of each rendered pixel with a position of each light field sub-display on the display panel.

In a 46th aspect, the apparatus of aspect 45, wherein the rendered pixel positions are unchanged between the plurality of rendered frames.

In a 47th aspect, the apparatus of any one of aspects 44 to 46, wherein to map the light field image to each of the plurality of light field sub-displays further comprises, for each light field sub-display, the processor is programmed to determine a color and intensity based on a rendered frame to be displayed and the association of the position of each rendered pixel with a position of each light field sub-display on the display panel.

In a 48th aspect, the apparatus of aspect 47, wherein to illuminate the plurality of light field sub-displays, the processor is programmed to: for a given rendered frame, illuminate each light field sub-display based on the determined color and intensity, wherein the direction of illumination is related to the viewing direction of the rendered frame and the association of the position of each rendered pixel with a position of each light field sub-display on the display panel.

In a 49th aspect, the apparatus of any one of aspects 29 to 48, further comprising a speaker system configured to project audio in combination with the processor programmed to illuminate the plurality of light field sub-displays.

In a 50th aspect, the apparatus of any one of aspects 29 to 49, further comprising a microphone configured to receive audio, and wherein the processor is programmed with executable instructions to: receive an audio input from the microphone; recognize that the audio input is an audio command; and initiate an action to modify the illumination of the plurality of light field sub-displays based on the audio command.

In a 51st aspect, the apparatus of any one of aspects 29 to 50, further comprising a proximity sensor configured to detect a presence or absence of an entity within a predetermined distance of the display apparatus, and wherein the processor is programmed with executable instructions to initiate an action based on the proximity sensor detecting the presence or absence of the entity.

In a 52nd aspect, a method for displaying a 3-D representation of an object is disclosed. The method comprises: accessing a light field image to be displayed by the display apparatus, the light field image providing a plurality of different views of the object at different observing directions; mapping the light field image to each of a plurality of light field sub-displays based at least in part on the position of the light field sub-displays on a display panel; and illuminating the plurality of light field sub-displays based at least in part on the mapped light field image.

In a 53rd aspect, the method of aspect 52, wherein the light field image comprises a plurality of rendered frames, each rendered frame indicative of a different view of the plurality of different views of the object, wherein each rendered frame comprises a plurality of rendered pixels that combine to render the rendered frame, each rendered pixel having a position within the rendered frame.

In a 54th aspect, the method of aspect 53, wherein mapping the light field image to the plurality of light field sub-displays based at least in part on the position of the light field sub-displays on the display panel, comprises associating the position of each rendered pixel with a position of each light field sub-display on the display panel.

In a 55th aspect, the method of aspect 54, mapping the light field image to each of the plurality of light field sub-displays based at least in part the position of the light field sub-displays on the display panel, further comprises, for each light field sub-display, determining a color and intensity based on a rendered frame to be displayed and the association of the position of each rendered pixel with the position of each light field sub-display on the display panel.

In a 56th aspect, the method of aspect 55, wherein illuminating the plurality of light field sub-displays based at least in part on the mapped light field image further comprises: for a given rendered frame, illuminating each light field sub-display based on the determined color and intensity, wherein the direction of illumination is related to the viewing direction of the rendered frame.

In a 57th aspect, the method of any one of aspects 52 to 56, wherein the rendered pixel positions are unchanged between the plurality of rendered frames.

In a 58th aspect, a display apparatus for displaying a 3-D representation of an image is disclosed. The display apparatus comprises: a display panel configured to be viewed from a fiducial viewing direction, wherein the display panel is curved out of a plane that is perpendicular to the fiducial viewing direction; one or more light field sub-displays, each of the one or more light field sub-displays having a position on the display panel; a non-transitory memory configured to store a light field image to be displayed by the display apparatus, the light field image providing a plurality of different views of the object at different viewing directions; a processor operably coupled to the non-transitory memory and the light field sub-displays, the processor programmed with executable instructions to: access the light field image, and illuminate the one or more light field sub-displays based at least in part on the light field image and the positions of the one or more light field sub-displays on the display panel.

In a 59th aspect, a light field display apparatus is disclosed. The light field display apparatus comprises: a curved panel comprising a plurality of light field sub-displays.

In a 60th aspect, the apparatus of aspect 59, wherein the curved panel is curved along a horizontal direction, curved along a vertical direction, or curved along both the horizontal direction and the vertical direction.

Conclusion

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) or specialized graphics processing units may be necessary to perform the functionality, for example, due to the volume or complexity of the calculations involved or to provide the image display results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. For example, the control system 110 can be in communication with a network environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display apparatus for displaying a 3-D representation of an object, comprising:
   a display panel configured to be viewed from a plurality of different fiducial viewing directions, wherein the display panel is curved out of a plane that is perpendicular to at least one of the fiducial viewing directions;
   a plurality of light field sub-displays disposed on the display panel, the light field sub-displays each configured to output light to form a plurality of pixels of an image, each light field sub-display comprising:
   an array of light emitters comprising a plurality of light emitter subsets;
   a micro-lens array comprising a plurality of micro-lenses spaced apart from the array of light emitters, wherein each micro-lens is configured to output light corresponding to a pixel of the image and different micro-lenses are configured to output light corresponding to different pixels of the image,
   wherein each micro-lens of the micro-lens array is configured to receive light from pixels of a corresponding pixel subset, wherein light from different pixels of a pixel subset exit an associated microlens at different angles compared to the light from other pixels of the pixel subset;
   a non-transitory memory configured to store a light field image to be displayed by the display apparatus, the light field image providing three or more different views of an object that are viewable from three or more different fiducial viewing directions, wherein each of the different views is viewable from a different associated fiducial viewing direction of the three or more different fiducial viewing directions; and
   a processor operably coupled to the non-transitory memory and the light field sub-displays, the processor programmed with executable instructions to:
   access the light field image,
   map the light field image to the plurality of light field sub-displays based at least in part on the position of the light field sub-displays on the display panel, and
   illuminate the plurality of light field sub-displays based at least in part on the mapped light field image,
   wherein the display panel is convex about at least two axes relative to one or more of the fiducial viewing directions.

2. The apparatus of claim 1, wherein the display panel comprises the at least two axes, including a first axis and a second axis that are perpendicular to at least one of the fiducial viewing directions.

3. The apparatus of claim 2, wherein the first axis is horizontal and the display panel is curved about the first axis.

4. The apparatus of claim 2, wherein the second axis is vertical and the display panel is curved about the second axis.

5. The apparatus of claim 2, wherein the first and second axes are perpendicular and the display panel is curved about both of the first and second axes.

6. The apparatus of claim 2, wherein the radius of curvature about the first axis is different than the radius of curvature about the second axis.

7. The apparatus of claim 2, wherein the radius of curvature about the first axis is substantially the same as the radius of curvature about the second axis.

8. The apparatus of claim 1, wherein to illuminate the plurality of light field sub-displays the processor is programmed to scale an intensity or duration of illumination of a light field sub-display based on the position of the light field sub-display on the display panel relative to the position of another light field sub-display.

9. The apparatus of claim 1, wherein the light field image comprises a plurality of rendered frames, different rendered frames indicative of different views of the object, wherein individual rendered frames comprise a plurality of rendered pixels that, when combined, render the rendered frame, different rendered pixels having different positions within the rendered frame.

10. The apparatus of claim 1, further comprising a proximity sensor configured to detect a presence or absence of an entity within a predetermined distance of the display apparatus, and wherein the processor is programmed with executable instructions to initiate an action based on the proximity sensor detecting the presence or absence of the entity.

11. The apparatus of claim 1, wherein the display panel is shaped as a portion of a sphere that is convex relative to at least one of the fiducial view directions.

12. The apparatus of claim 1, wherein one or more of the light field sub-displays are switched to present, at different times, different rendered frames of the different views of the object to be viewable from the different fiducial view directions to display the 3-D representation of the object.

* * * * *